United States Patent [19]
Van Wie et al.

[11] Patent Number: 5,943,422
[45] Date of Patent: Aug. 24, 1999

[54] STEGANOGRAPHIC TECHNIQUES FOR SECURELY DELIVERING ELECTRONIC DIGITAL RIGHTS MANAGEMENT CONTROL INFORMATION OVER INSECURE COMMUNICATION CHANNELS

[75] Inventors: David M. Van Wie, Sunnyvale; Robert P. Weber, Menlo Park, both of Calif.

[73] Assignee: InterTrust Technologies Corp., Sunnyvale, Calif.

[21] Appl. No.: 08/689,606

[22] Filed: Aug. 12, 1996

[51] Int. Cl.$^6$ .................................................... H04N 7/167
[52] U.S. Cl. ........................................................ 380/9; 380/5
[58] Field of Search .............................. 380/9, 20, 4, 5, 380/28; 382/232

[56] References Cited

U.S. PATENT DOCUMENTS

| | | |
|---|---|---|
| 3,573,747 | 4/1971 | Adams et al. . |
| 3,609,697 | 9/1971 | Blevins . |
| 3,796,830 | 3/1974 | Smith . |
| 3,798,359 | 3/1974 | Feistel . |
| 3,798,360 | 3/1974 | Feistel . |
| 3,798,605 | 3/1974 | Feistel . |
| 3,806,882 | 4/1974 | Clarke . |

(List continued on next page.)

FOREIGN PATENT DOCUMENTS

| | | |
|---|---|---|
| 9 004 79 | 12/1984 | Belgium . |
| 0 84 441 | 7/1983 | European Pat. Off. . |
| A0135422 | 3/1985 | European Pat. Off. . |
| 0180460 | 5/1986 | European Pat. Off. . |
| 0 370 146 | 11/1988 | European Pat. Off. . |
| 0 456 386 A2 | 11/1991 | European Pat. Off. . |
| 0 469 864 A2 | 11/1991 | European Pat. Off. . |

(List continued on next page.)

OTHER PUBLICATIONS

Baum, Michael, Worldwide Electronic Commerce: Law, Policy and Controls Conference, program details, Nov. 11, 1993.

Bisbey, II et al., Encapsulation: An Approach to Operating System Security, Oct. 1973, pp. 666–675.

Blom et al., Encryption Methods in Data Networks, Ericsson Technics, No. 2, 1978, Stockholm, Sweden.

Bruner, Rick, E., PowerAgent, NetBot help advertisers reach Internet shoppers, Aug. 1997 (Document from Internet).

Cable Television and America's Telecommunications Infrastructure, National Cable Television Association, Apr. 1993.

Caruso, Technology, Digital Commerce 2 plans for watermarks, which can bind proof of authorship to electronic works, New York Times (Aug. 1995).

CD ROM, Introducing . . . The Workflow CD–ROM Sampler, Creative Networks, MCIMail: Creative Networks, Inc., Palo Alto, California.

(List continued on next page.)

*Primary Examiner*—David Cain
*Attorney, Agent, or Firm*—Nixon & Vanderhye P.C.

[57] ABSTRACT

Electronic steganographic techniques can be used to encode a rights management control signal onto an information signal carried over an insecure communications channel. Steganographic techniques ensure that the digital control information is substantially invisibly and substantially indelibly carried by the information signal. These techniques can provide end-to-end rights management protection of an information signal irrespective of transformations between analog and digital. An electronic appliance can recover the control information and use it for electronic rights management to provide compatibility with a Virtual Distribution Environment. In one example, the system encodes low data rate pointers within high bandwidth time periods of the content signal to improve overall control information read/seek times.

348 Claims, 30 Drawing Sheets

EXAMPLE STEGANOGRAPHICALLY
ENCODING ELECTRONIC CONTENTS IN AN IMAGE

U.S. PATENT DOCUMENTS

| | | |
|---|---|---|
| 3,829,833 | 8/1974 | Freeny, Jr. . |
| 3,906,448 | 9/1975 | Henriques . |
| 3,911,397 | 10/1975 | Freeny, Jr. . |
| 3,924,065 | 12/1975 | Freeny, Jr. . |
| 3,931,504 | 1/1976 | Jacoby . |
| 3,946,220 | 3/1976 | Brobeck et al. . |
| 3,956,615 | 5/1976 | Anderson et al. . |
| 3,958,081 | 5/1976 | Ehrsam et al. . |
| 3,970,992 | 7/1976 | Boothroyd et al. . |
| 4,048,619 | 9/1977 | Forman, Jr. et al. . |
| 4,071,911 | 1/1978 | Mazur . |
| 4,112,421 | 9/1978 | Freeny, Jr. . |
| 4,120,030 | 10/1978 | Johnstone . |
| 4,163,280 | 7/1979 | Mori et al. . |
| 4,168,396 | 9/1979 | Best . |
| 4,196,310 | 4/1980 | Forman et al. . |
| 4,200,913 | 4/1980 | Kuhar et al. . |
| 4,209,787 | 6/1980 | Freeny, Jr. . |
| 4,217,588 | 8/1980 | Freeny, Jr. . |
| 4,220,991 | 9/1980 | Hamano et al. . |
| 4,232,193 | 11/1980 | Gerard . |
| 4,232,317 | 11/1980 | Freeny, Jr. . |
| 4,236,217 | 11/1980 | Kennedy . |
| 4,253,157 | 2/1981 | Kirschner et al. . |
| 4,262,329 | 4/1981 | Bright et al. . |
| 4,265,371 | 5/1981 | Desai et al. . |
| 4,270,182 | 5/1981 | Asija . |
| 4,278,837 | 7/1981 | Best . |
| 4,305,131 | 12/1981 | Best . |
| 4,306,289 | 12/1981 | Lumley . |
| 4,309,569 | 1/1982 | Merkle . |
| 4,319,079 | 3/1982 | Best . |
| 4,323,921 | 4/1982 | Guillou . |
| 4,328,544 | 5/1982 | Baldwin et al. . |
| 4,337,483 | 6/1982 | Guillou . |
| 4,361,877 | 11/1982 | Dyer et al. . |
| 4,375,579 | 3/1983 | Davida et al. . |
| 4,433,207 | 2/1984 | Best . |
| 4,434,464 | 2/1984 | Suzuki et al. . |
| 4,442,486 | 4/1984 | Mayer . |
| 4,446,519 | 5/1984 | Thomas . |
| 4,454,594 | 6/1984 | Heffron et al. . |
| 4,458,315 | 7/1984 | Uchenick . |
| 4,462,076 | 7/1984 | Smith, III . |
| 4,462,078 | 7/1984 | Ross . |
| 4,465,901 | 8/1984 | Best . |
| 4,471,163 | 9/1984 | Donald et al. . |
| 4,484,217 | 11/1984 | Block et al. . |
| 4,494,156 | 1/1985 | Kadison et al. . |
| 4,513,174 | 4/1985 | Herman . |
| 4,528,588 | 7/1985 | Lofberg . |
| 4,528,643 | 7/1985 | Freeny, Jr. . |
| 4,553,252 | 11/1985 | Egendorf . |
| 4,558,176 | 12/1985 | Arnold et al. . |
| 4,558,413 | 12/1985 | Schmidt et al. . |
| 4,562,306 | 12/1985 | Chou et al. . |
| 4,562,495 | 12/1985 | Bond et al. . |
| 4,577,289 | 3/1986 | Comerford et al. . |
| 4,584,641 | 4/1986 | Guglielmino . |
| 4,588,991 | 5/1986 | Atalla . |
| 4,589,064 | 5/1986 | Chiba et al. . |
| 4,593,353 | 6/1986 | Pickholtz . |
| 4,593,376 | 6/1986 | Volk . |
| 4,595,950 | 6/1986 | Lofberg . |
| 4,597,058 | 6/1986 | Izumi et al. . |
| 4,634,807 | 1/1987 | Chorley et al. . |
| 4,644,493 | 2/1987 | Chandra et al. . |
| 4,646,234 | 2/1987 | Tolman et al. . |
| 4,652,990 | 3/1987 | Pailen et al. . |
| 4,658,093 | 4/1987 | Hellman . |
| 4,670,857 | 6/1987 | Rackman . |
| 4,677,434 | 6/1987 | Fascenda . |
| 4,680,731 | 7/1987 | Izumi et al. . |
| 4,683,553 | 7/1987 | Mollier . |
| 4,685,056 | 8/1987 | Barnsdale et al. . |
| 4,688,169 | 8/1987 | Joshi . |
| 4,691,350 | 9/1987 | Kleijne et al. . |
| 4,696,034 | 9/1987 | Wiedemer . |
| 4,701,846 | 10/1987 | Ikeda et al. . |
| 4,712,238 | 12/1987 | Gilhousen et al. . |
| 4,713,753 | 12/1987 | Boebert et al. . |
| 4,740,890 | 4/1988 | William . |
| 4,747,139 | 5/1988 | Taaffe . |
| 4,757,533 | 7/1988 | Allen et al. . |
| 4,757,534 | 7/1988 | Matyas et al. . |
| 4,768,087 | 8/1988 | Taub et al. . |
| 4,791,565 | 12/1988 | Dunham et al. . |
| 4,796,181 | 1/1989 | Wiedemer . |
| 4,807,288 | 2/1989 | Ugon et al. . |
| 4,817,140 | 3/1989 | Chandra et al. . |
| 4,827,508 | 5/1989 | Shear . |
| 4,858,121 | 8/1989 | Barber et al. . |
| 4,864,494 | 9/1989 | Kobus . |
| 4,868,877 | 9/1989 | Fischer . |
| 4,903,296 | 2/1990 | Chandra et al. . |
| 4,924,378 | 5/1990 | Hershey et al. . |
| 4,930,073 | 5/1990 | Cina, Jr. . |
| 4,949,187 | 8/1990 | Cohen . |
| 4,977,594 | 12/1990 | Shear . |
| 4,999,806 | 3/1991 | Chernow et al. . |
| 5,001,752 | 3/1991 | Fischer . |
| 5,005,122 | 4/1991 | Griffin et al. . |
| 5,005,200 | 4/1991 | Fischer . |
| 5,010,571 | 4/1991 | Katznelson . |
| 5,023,907 | 6/1991 | Johnson et al. . |
| 5,047,928 | 9/1991 | Wiedemer . |
| 5,048,085 | 9/1991 | Abraham et al. . |
| 5,050,213 | 9/1991 | Shear . |
| 5,091,966 | 2/1992 | Bloomberg et al. . |
| 5,103,392 | 4/1992 | Mori . |
| 5,119,493 | 6/1992 | Janis et al. . |
| 5,128,525 | 7/1992 | Stearns et al. . |
| 5,136,643 | 8/1992 | Fischer . |
| 5,136,646 | 8/1992 | Haber et al. . |
| 5,136,647 | 8/1992 | Haber et al. . |
| 5,136,716 | 8/1992 | Harvey et al. . |
| 5,146,575 | 9/1992 | Nolan, Jr. . |
| 5,148,481 | 9/1992 | Abraham et al. . |
| 5,155,680 | 10/1992 | Wiedemer . |
| 5,168,147 | 12/1992 | Bloomberg . |
| 5,185,717 | 2/1993 | Mori . |
| 5,201,046 | 4/1993 | Goldberg et al. . |
| 5,201,047 | 4/1993 | Maki et al. . |
| 5,208,748 | 5/1993 | Flores et al. . |
| 5,214,702 | 5/1993 | Fischer . |
| 5,216,603 | 6/1993 | Flores et al. . |
| 5,221,833 | 6/1993 | Hecht . |
| 5,222,134 | 6/1993 | Waite et al. . |
| 5,224,160 | 6/1993 | Paulini et al. . |
| 5,235,642 | 8/1993 | Wobber et al. . |
| 5,245,165 | 9/1993 | Zhang . |
| 5,247,575 | 9/1993 | Sprague et al. . |
| 5,260,999 | 11/1993 | Wyman . |
| 5,263,158 | 11/1993 | Janis . |
| 5,265,164 | 11/1993 | Matyas et al. . |
| 5,276,735 | 1/1994 | Boebert et al. . |
| 5,280,479 | 1/1994 | Mary . |
| 5,285,494 | 2/1994 | Sprecher et al. . |
| 5,301,231 | 4/1994 | Abraham et al. . |
| 5,311,591 | 5/1994 | Fischer . |
| 5,337,360 | 8/1994 | Fischer . |
| 5,341,429 | 8/1994 | Stringer et al. . |

| | | |
|---|---|---|
| 5,347,579 | 9/1994 | Blandford . |
| 5,351,293 | 9/1994 | Michener et al. . |
| 5,355,474 | 10/1994 | Thuraisngham et al. . |
| 5,373,561 | 12/1994 | Haber et al. . |
| 5,390,247 | 2/1995 | Fischer . |
| 5,390,330 | 2/1995 | Talati . |
| 5,392,220 | 2/1995 | van den Hamer et al. . |
| 5,392,390 | 2/1995 | Crozier . |
| 5,394,469 | 2/1995 | Nagel et al. . |
| 5,410,598 | 4/1995 | Shear . |
| 5,412,717 | 5/1995 | Fischer . |
| 5,421,006 | 5/1995 | Jablon . |
| 5,422,953 | 6/1995 | Fischer . |
| 5,428,606 | 6/1995 | Moskowitz . |
| 5,438,508 | 8/1995 | Wyman . |
| 5,442,645 | 8/1995 | Ugon . |
| 5,444,779 | 8/1995 | Daniele . |
| 5,449,895 | 9/1995 | Hecht et al. . |
| 5,449,896 | 9/1995 | Hecht et al. . |
| 5,450,493 | 9/1995 | Maher . |
| 5,453,601 | 9/1995 | Rosen . |
| 5,453,605 | 9/1995 | Hecht et al. . |
| 5,455,407 | 10/1995 | Rosen . |
| 5,455,861 | 10/1995 | Faucher et al. . |
| 5,455,953 | 10/1995 | Russell . |
| 5,457,746 | 10/1995 | Dolphin . |
| 5,463,565 | 10/1995 | Cookson et al. . |
| 5,473,687 | 12/1995 | Lipscomb et al. . |
| 5,473,692 | 12/1995 | Davis . |
| 5,479,509 | 12/1995 | Ugon . |
| 5,485,622 | 1/1996 | Yamaki . |
| 5,491,800 | 2/1996 | Goldsmith et al. . |
| 5,497,479 | 3/1996 | Hornbuckle . |
| 5,497,491 | 3/1996 | Mitchell et al. . |
| 5,499,298 | 3/1996 | Narasimhalu et al. . |
| 5,504,757 | 4/1996 | Cook et al. . |
| 5,504,818 | 4/1996 | Okano . |
| 5,504,837 | 4/1996 | Griffeth et al. . |
| 5,508,913 | 4/1996 | Yamamoto et al. . |
| 5,509,070 | 4/1996 | Schull . |
| 5,513,261 | 4/1996 | Maher . |
| 5,530,235 | 6/1996 | Stefik et al. . |
| 5,530,752 | 6/1996 | Rubin . |
| 5,533,123 | 7/1996 | Force et al. . |
| 5,534,975 | 7/1996 | Stefik et al. . |
| 5,537,526 | 7/1996 | Anderson et al. . |
| 5,539,735 | 7/1996 | Moskowitz . |
| 5,539,828 | 7/1996 | Davis . |
| 5,550,971 | 8/1996 | Brunner et al. . |
| 5,553,282 | 9/1996 | Parrish et al. . |
| 5,557,518 | 9/1996 | Rosen . |
| 5,563,946 | 10/1996 | Cooper et al. . |
| 5,568,552 | 10/1996 | Davis . |
| 5,572,673 | 11/1996 | Shurts . |
| 5,592,549 | 1/1997 | Nagel et al. . |
| 5,606,609 | 2/1997 | Houser et al. . |
| 5,613,004 | 3/1997 | Cooperman et al. ............... 380/28 |
| 5,621,797 | 4/1997 | Rosen . |
| 5,629,980 | 5/1997 | Stefik et al. . |
| 5,633,932 | 5/1997 | Davis et al. . |
| 5,634,012 | 5/1997 | Stefik et al. . |
| 5,636,292 | 6/1997 | Rhoads ............................. 382/232 |
| 5,638,443 | 6/1997 | Stefik . |
| 5,638,504 | 6/1997 | Scott et al. . |
| 5,640,546 | 6/1997 | Gopinath et al. . |
| 5,655,077 | 8/1997 | Jones et al. . |
| 5,687,236 | 11/1997 | Moskowitz et al. ............... 380/28 |
| 5,689,587 | 11/1997 | Bender et al. ..................... 382/232 |
| 5,692,180 | 11/1997 | Lee . |
| 5,710,834 | 1/1998 | Rhoads . |
| 5,740,549 | 4/1998 | Reilly et al. . |
| 5,745,604 | 4/1998 | Rhoads . |
| 5,748,763 | 5/1998 | Rhoads . |
| 5,748,783 | 5/1998 | Rhoads . |
| 5,748,960 | 5/1998 | Fischer . |
| 5,754,849 | 5/1998 | Dyer et al. . |
| 5,757,914 | 5/1998 | McManis . |
| 5,758,152 | 5/1998 | LeTourneau . |
| 5,765,152 | 1/1998 | Erickson . |
| 5,768,426 | 6/1998 | Rhoads . |

FOREIGN PATENT DOCUMENTS

| | | |
|---|---|---|
| 0 469 864 A3 | 2/1992 | European Pat. Off. . |
| 0 593 305 A2 | 4/1994 | European Pat. Off. . |
| 0 651 554 A1 | 5/1995 | European Pat. Off. . |
| 0 668 695 A2 | 8/1995 | European Pat. Off. . |
| 0 695 985 A1 | 2/1996 | European Pat. Off. . |
| 0 696 798 A1 | 2/1996 | European Pat. Off. . |
| 0715243A1 | 6/1996 | European Pat. Off. . |
| 0715244A1 | 6/1996 | European Pat. Off. . |
| 0715245A1 | 6/1996 | European Pat. Off. . |
| 0715246A1 | 6/1996 | European Pat. Off. . |
| 0715247A1 | 6/1996 | European Pat. Off. . |
| 0 725 376 | 9/1996 | European Pat. Off. . |
| 0749081A1 | 12/1996 | European Pat. Off. . |
| 0 778 513 A2 | 6/1997 | European Pat. Off. . |
| 0 795 873 A2 | 9/1997 | European Pat. Off. . |
| 3803982A1 | 1/1990 | Germany . |
| 57-726 | 5/1982 | Japan . |
| 62-241061 | 10/1987 | Japan . |
| 1-068835 | 3/1989 | Japan . |
| 64-68835 | 3/1989 | Japan . |
| 2-242352 | 9/1990 | Japan . |
| 2-247763 | 10/1990 | Japan . |
| 2-294855 | 12/1990 | Japan . |
| 4-369068 | 12/1992 | Japan . |
| 5-181734 | 7/1993 | Japan . |
| 5-257783 | 10/1993 | Japan . |
| 5-268415 | 10/1993 | Japan . |
| 6-175794 | 6/1994 | Japan . |
| 6-215010 | 8/1994 | Japan . |
| 6225059 | 8/1994 | Japan . |
| 7-056794 | 3/1995 | Japan . |
| 7-084852 | 3/1995 | Japan . |
| 7-141138 | 6/1995 | Japan . |
| 7-200317 | 8/1995 | Japan . |
| 7-200492 | 8/1995 | Japan . |
| 7-244639 | 9/1995 | Japan . |
| 8-137795 | 5/1996 | Japan . |
| 8-152990 | 6/1996 | Japan . |
| 8-185298 | 7/1996 | Japan . |
| A2136175 | 9/1984 | United Kingdom . |
| 2294348 | 4/1996 | United Kingdom . |
| 2295947 | 6/1996 | United Kingdom . |
| WO A8502310 | 5/1985 | WIPO . |
| WO 85/03584 | 8/1985 | WIPO . |
| WO 92/06438 | 4/1992 | WIPO . |
| WO 93/01550 | 1/1993 | WIPO . |
| WO 94/01821 | 1/1994 | WIPO . |
| WO 94/16395 | 7/1994 | WIPO . |
| WO 94/18620 | 8/1994 | WIPO . |
| WO 94/22266 | 9/1994 | WIPO . |
| WO 94/27406 | 11/1994 | WIPO . |
| WO 96/00963 | 1/1996 | WIPO . |
| WO 96/03835 | 2/1996 | WIPO . |
| WO 96/05698 | 2/1996 | WIPO . |
| WO 96/06503 | 2/1996 | WIPO . |
| WO 96/13013 | 5/1996 | WIPO . |
| WO 96/21192 | 7/1996 | WIPO . |
| WO 97/03423 | 1/1997 | WIPO . |
| WO97/07656 | 3/1997 | WIPO . |
| WO97/32251 | 9/1997 | WIPO . |
| WO97/48203 | 12/1997 | WIPO . |

OTHER PUBLICATIONS

Choudhury, et al., Copyright Protection for Electronic Publishing over Computer Networks, AT&T Bell Laboratores, Murray Hill, New Jersey 07974 (Jun. 1994).

Clark, Tim, Ad service gives cash back, www.news.com, Aug. 4, 1997, 2 pages (Document from Internet).

Codercard, Spec Sheet—Basic Coder Subsystem, No date given.

Communications of the ACM, Intelligent Agents, Jul. 1994, vol. 37, No. 7.

Communications of the ACM, Jun. 1996, vol. 39, No. 6.

Computer Systems Policy Project (CSSP), Perspectives on the National Information Infrastructure: Ensuring Interoperability (Feb. 1994), Feb. 1994.

Cunningham, Donna, et al., News Release, AT&T, Jan. 31, 1995, AT&T, VLSI Technology join to improve info highway security, 3 pages.

Data Sheet, About the Digital Notary Service, Surety Technologies, Inc., 1994–95, 6 pages.

Dempsey, et al., *D–Lib Magazine, Jul./Aug. 1996* The Warwick Metadata Workshop: A Framework for the Deployent of Resource Description, Jul. 15, 1966.

Denning et al., Data Security, 11 Computing Surveys No. 3, Sep. 1979.

Diffie, Whitfield and Martin E. Hellman, IEEE Transactions on Information Theory, vol. 22, No. 6, Nov. 1976, New Directions in Cryptography, pp. 644–651.

Diffie, Whitfield and Martin E. Hellman, Proceedings of the IEEE, vol. 67, No. 3, Mar. 1979, Privacy and Authentication: An Introduction to Cryptography, pp. 397–427.

Digest of Papers, VLSI: New Architectural Horizons, Feb. 1980, Preventing Software Piracy With Crypto–Microprocessors, Robert M. Best, pp. 466–469.

*DiscStore* (Electronic Publishing Resources 1991).

Document from Internet, cgi@ncsa.uiuc.edu, CGI Common Gateway Interface, 1 page, 1996.

DSP56000/DSP56001 Digital Signal Processor User's Manual, Motorola, 1990, p. 2—2.

Dusse, Stephen R. and Burton S. Kaliski A Cryptographic Library for the Motorola 56000 in Damgard, I.M., Advances in Cryptology–Proceedings EUROCRYPT 90, Springer–Verlag, 1991, pp. 230–244.

Dyson, Esther, Intellectual Value, Wired Magazine, Jul. 1995, pp. 136–141 and 182–184.

Effector Online vol. 6 No. 6, A Publication of the Electronic Frontier Foundation, 8 pages, Dec. 6, 1993.

EIA and TIA White Paper on National Information Infrastructure,published by the Electronic Industries Association and the Telecommunications Industry Association, Washington, D.C., no date.

Electronic Currency Requirements, XIWT (Cross Industry Working Group), no date.

Electronic Publishing Resources Inc. Protecting Electronically Published Properties Increasing Publishing Profits (Electronic Publishing Resources 1991).

*Firefly Network Inc.,* www.ffly.com, What is Firefly? Firefly revision: 41.4 Copyright 1995, 1996.

First CII Honeywell Bull International Symposium on Computer Security and Confidentiality, Jan. 26–28, 1981, Conference Text, pp. 1–21.

Framework for National Information Infrastructure Services, Draft, U.S. Department of Commerce, Jul. 1994.

Framework for National Information Infrastructure Services, NIST, Jul. 1994, 12 slides.

Garcia, D. Linda, testimony before a hearing on science, space and technology, May 26, 1994.

Gleick, James, "Dead as a Dollar" *The New York Times Magazine,* Jun. 16, 1996, Section 6, pp. 26–30, 35, 42, 50, 54.

Green paper, Intellectual Property and the National Information Infrastructure, a Preliminary Draft of the Report of the Working Group on Intellectual Property Rights, Jul. 1994.

Greguras, Fred, Softic Symposium '95, Copyright Clearances and Moral Rights, Nov. 30, 1995 (as updated Dec. 11, 1995), 3 pages.

Guillou, L.: Smart Cards and Conditional Access, pp. 480–490 Advances in Cryptography, Proceedings of Euro-Crypt 84 (Beth et al, Ed., Springer–Verlag 1985).

Harman, Harry H. *Modern Factor Analysis,* Third Edition Revised, University of Chicago Press Chicago and London, Third revised published 1976.

Herzberg, Amir et al., Public Protection of Software, *ACM Transactions on Computer Systems,* vol. 5, No. 4, Nov. 1987, pp. 371–393.

Hofmann, Jud, Interfacing the NII to User Homes, Electronic Industries Association, Consumer Electronic Bus Committee, 14 slides, no date.

Holt, Stannie, Start–up promises user confidentiality in Web marketing service, *Info World Electric,* Aug. 13, 1997 (Document from Internet).

HOTJAVA™: The Security Story, 4 pages.

IISP Break Out Session Report for Group No. 3, Standards Development and Tracking System, no date.

Information Infrastructure Standards Panel: NII 'The Information Superhighway', Nations Bank –HGDeal –ASC X9, 15 pages.

Invoice? What is an Invoice? *Business Week,* Jun. 10, 1996.

JAVASOFT, Frequently Asked Questions—Applet Security, What's Java™? Products and Services, Java/Soft News, Developer's Cornier,Jun. 7, 1996, 8 pages.

Jiang, et al, A concept–Based Approach to Retrieval from an Electronic Industrialn Directory, *International Journal of Electronic Commerce,* vol. 1, No. 1, Fall 1996, pp. 51–72.

Jones, Debra, Top Tech Stories, PowerAgent Introducts First Internet 'Infomediary' to Empower and Protect Consumers, Aug. 13, 1997 3 pages (Document from Internet).

Kelly, Kevin, Whole Earth Review, E–Money,pp. 40–59, Summer 1993.

Kent, Protecting Externally Supplied Software in Small Computers (MIT/LCS/TR–255 Sep. 1980).

Kristol et al., Anonymous Internet Mercantile Protocol, AT&T Bell Laboratories, Murray Hill, New Jersey, Draft: Mar. 17, 1994.

Lagoze, Carl, *D–Lib Magazine, Jul./Aug. 1996,* The Warwick Framework, A Container Architecture for Diverse Sets of Metadata.

Lanza, Mike, electronic mail, George Gilder's Fifth Article –Digital Darkhorse –Newspapers, Feb. 21, 1994.

Levy, Steven, Wired, E–Money, That's What I Want, 10 pages, Dec. 1994.

Low et al., Anonymous Credit Cards and its Collusion Analysis, AT&T Bell Laboratories, Murray Hill, New Jersey, Oct. 10, 1994.

Low et al., Anonymous Credit Cards, AT&T Bell Laboratories, Proceedings of the 2nd ACM Conference on Computer and Communications Security, Fairfax, Virginia, Nov. 2–4, 1994.

Low et al., Document Marking and Identification using both Line and Word Shifting, AT&T Bell Laboratories, Murray Hill, New Jersey, Jul. 29, 1994. Maclachlan, Malcolm, PowerAgent Debuts Spam–Free Marketing, *TechWire*, Aug. 13, 1997, 3 pages (Document from Internet).

Maxemchuk, Electronic Document Distribution, AT&T Bell Laboratories, Murray Hill, New Jersey 07974.

Micro Card—Micro Card Technologies, Inc., Dallas, Texas, No date given.

Mossberg, Walter S., Personal Technology, Threats to Privacy On–Line Become More Worrisome, *Wall Street Journal*, Oct. 24, 1996.

Negroponte, Electronic Word of Mouth, *Wired* Oct. 1996, p. 218.

Negroponte, Nicholas, Telecommunications, Some Thoughts on Likely and expected Communications scenarios: A Rebuttal, pp. 41–42, Jan. 1993.

Neumann, et al., A Provably Secure Operating System: The System, Its Applications, and Proofs, Computer Science Laboratory Report CSL–116, Second Edition, SRI International (05/80).

News Release, Premenos Announces Templar 2.0—Next Generation Software for Secure Internet EDI, webmaster@templar.net, 1 page, Jan. 17, 1996.

News Release, The Document Company Xerox, Xerox Announces Software Kit for Creating Working Documents With Dataglyphs, Nov. 6, 1995, Minneapolis, MN, 13 pages.

News Release, The White House, Office of the President, Background on the Administration's Telecommunications Policy Reform Initiative, Jan. 11, 1994.

NII, Architecture Requirements, XIWT, no date.

Open System Environment Architectural Framework for National Information Infrastructure Services and Standards, in Support of National Class Distributed Systems, Distributed System Engineering Program Sponsor Group, Draft 1.0, Aug. 5, 1994.

Pelton, Dr. Joseph N., Telecommunications, Why Nicholas Negroponte is Wrong About the Future of Telecommunication, pp. 35–40, Jan. 1993.

Portland Software's ZipLock, Internet Information, Copyright Portland Software 1996–1997, 12 pages.

PowerAgent Inc., Proper Use of Consumer Information on the Internet White Paper, Jun. 1997, Document from Internet, 9 pages (Document from Internet).

PowerAgent Press Release, What the Experts are Reporting on PowerAgent, Aug. 13, 1997, 6 pages (Document from Internet).

PowerAgent Press Release, What the Experts are Reporting on PowerAgent, Aug. 4, 1997, 5 pages (Document from Internet).

PowerAgent Press Release, What the Experts are Reporting on PowerAgent, Aug. 13, 1997, 3 pages (Document from Internet).

Premenos Corp. White Paper: The Future of Electronic Commerce, A Supplement to Midrange Systems, Interent webmaster@premenos.com, 4 pages.

Press Release, National Semiconductor and EPR Partner For Information Metering/Data Security Cards (Mar. 4, 1994).

Rankine, G., Thomas—A Complete Single–Chip RSA Device, Advances in Cryptography, Proceedings of CRYPTO 86, pp. 480–487 (A.M. Odlyzko Ed., Springer–Verlag 1987).

Reilly, Arthur K., Standards committee T1–Telecommunications, Input to the 'International Telecommunications Hearings,' Panel 1: Component Technologies of the NII/GII, no date.

Resnick, et al., Recommender Systems, *Communications of the ACM*, vol. 40, No. 3, Mar. 1997, pp. 56–89.

ROI (Personal Library Software, 1987 or 1988).

ROI–Solving Critical Electronic Publishing Problems (Personal Library Software, 1987 or 1988).

Rose, Lance, Cyberspace and the Legal Matrix: Laws or Confusion?, 1991.

Rosenthal, Steve, New Media, Interactive Network: Viewers Get Involved, pp. 30–31, Dec. 1992.

Rosenthal, Steve, New Media, Interactive TV: The Gold Rush Is On, pp. 27–29, Dec. 1992.

Rosenthal, Steve, New Media, Mega Channels, pp. 36–46, Sep. 1993.

Rothstein, Edward, *The New York Times*, Technology, Connections, Making th eInternet come to you, through 'push' technology.. p. D5, Jan. 20, 1997.

Rutkowski, Ken, PowerAgent Introduces First Internet 'Infomediary' to Empower and Protect Consumers, *Tech Talk New Story*, Aug. 4, 1997 (Document from Internet).

Sager, Ira (Edited by), Bits & Bytes, *Business Week*, Sep. 23, 1996, p. 142E.

Schlossstein, Steven, International Economy, America: The G7's Comeback Kid, Jun./Jul. 1993.

Schurmann, Jurgen, *Pattern Classification, A Unified View of Statistical and Neural Approaches*, John Wiley & Sons, Inc., 1996.

Scnaumueller–Bichl et al., A Method of Software Protection Based on the Use of Smart Cards and Cryptographic Techniques, No date given.

Serving the Community: A Public–Interest Vision of the National Information Infrastructure, Computer Professionals for Social Responsibility, Executive Summary, no date.

Shear, Solutions for CD–Rom Pricing and Data Security Problems, pages 530–533, *CD Rom Yearbook 1988–1989* (Microsoft Press 1988 or 1989).

Smith et al., Signed Vector Timestamps: A Secure Protocol for Parital Order Time, CMU–93–116, School of Computer Science Carnegie Mellon University, Pittsburgh, Pennsylvania, Oct. 1991; version of Feb. 1993.

Special Report, The Internet:Fulfilling the Promise The Internet: Bring Order From Chaos; Lynch, Clifford, Search the Internet; Resnick, Paul, Filtering Information on the Internet; Hearst, Marti A., Interfaces for Searching the Web; Stefik, Mark, Trusted Systems; *Scientific American*, Mar. 1997, pp. 49–56, 62–64, 68–72, 78–81.

Stefik, Internet Dreams: Archetypes, Myths, and Metaphors, Letting Loose the Light: Igniting Commerce in Electronic Publication, pp. 219–253, (1996) Massachusetts Institute of Technology.

Stefik, Mark, *Introduction to Knowledge Systems*, Chapter 7, Classification, pp. 543–607, 1995 by Morgan Kaufmann Publisher, Inc.

Stefik, Mark, Letting Loose the Light, Igniting Commerce in Electronic Publication (1994, 1995) Palo Alto, California.

Stephenson, Tom, Advanced Imaging, The Info Infrastructure Initiative: Data SuperHighways and You, pp. 73–74, May 1993.

Sterling, Bruce, Literary freeware: Not for Commercial Use, remarks at Computers, Freedom and Privacy Conference IV, Chicago, Mar. 26, 1994.

Struif, Bruno The Use of Chipcards for Electronic Signatures and Encryption in: Proceedings for the 1989 Conference on VSLI and Computer Peripherals, IEEE Computer Society Press, 1989, pp. 4/155–4/158.

Templar Overview,: Prementos, Internet info@templar.net, 4 pages.

Templar Software and Services: Secure, Reliable, Standards–Based EDI Over the Internet, Prementos, Internet info@templar.net, 1 page.

The 1:1 Future of the Electronic Marketplace: Return to a Hunting and Gathering Society, 2 pages, no date.

The Benefits of ROI For Database Protection and Usage Based Billing (Personal Library Software, 1987 or 1988).

The New Alexandria No. 1, Alexandria Institute, pp. 1–12, Jul./Aug. 1986.

Tygar et al., Cryptography: It's Not Just For Electronic Mail Anymore, CMU–CS–93–107, School of Computer Science Carnegie Mellon University, Pittsburgh, Pennsylvania, Mar. 1, 1993.

Tygar et al., Dyad: A System for Using Physically Secure Coprocessors, School of Computer Science, Carnegie Mellon University, Pittsburgh, PA 15213 (May 1991).

Valovi, T., Telecommunications, The Role of Computer Networking in the Emerging Virtual Marketplace, pp. 40–44.

Voight, Joan, Beyond the Banner, *Wired,* Dec. 1996, pp. 196, 200, 204.

Vonder Haar, Steven, PowerAgent Launches Commercial Service, Inter@ctive Week, Aug. 4, 1997 (Document from Internet).

Weber, Dr. Robert, Digital Rights Management Technologies, Oct. 1995, 21 pages.

Weber, Metering Technologies for Digital Intellectual Property, A Report to the International Federation of Reproduction Rights Organisations, pp. 1–29, Oct. 1994, Boston, MA, USA.

Weder, Adele, Life on the Infohighway, 4 pages, no date.

Weingart, Physical Security for the :ABYSS System, IBM Thomas J. Watson Research Center, Yorktown Heights, New York 10598 (1987).

Weitzner, Daniel J., A Statement on EFF's Open Platform Campaign as of Nov., 1993, 3 pages.

WEPIN Store, Stenography (Hidden Writing) (Common Law 1995).

White, ABYSS: A Trusted Architecture for Software Protection, IBM Thomas J. Watson Research Center, Yorktown Heights, New York 10598 (1987).

Wired 1.02, Is Advertising Really dead?, Part 2, 1994.

World Wide Web FAQ, How can I put an access counter on my home page?, 1 page, 1996.

XIWT Cross Industry Working Team, 5 pages, Jul. 1994.

Yee, Using Secure Coprocessors, CMU–CS–94–149, School of Computer Science, Carnegie Mellon University Pittsburgh, PA15213.

Yellin, F. Low Level Security in Java, 8 pages.

E. Milbrandt, "Stenography Info and Archive", 1996.

M. Kohntopp, "Sag's durch die Blume", Apr. 1996, marit@schulung.netuse.de.

EXAMPLE MEDIA PLAYER WITH STEGANOGRAPHIC RIGHTS MANAGEMENT

EXAMPLE SET TOP BOX WITH STEGANOGRAPHIC RIGHTS MANAGEMENT

EXAMPLE RADIO RECEIVER WITH
STEGANOGRAPHIC RIGHTS MANAGEMENT

EXAMPLE VCR WITH
STEGANOGRAPHIC RIGHTS MANAGEMENT

EXAMPLE CAMERA AND RECORDER WITH STEGANOGRAPHIC RIGHTS MANAGEMENT

EXAMPLE STEGANOGRAPHICALLY
ENCODING ELECTRONIC CONTENTS IN AN IMAGE

EXAMPLE STEGANOGRAPHIC
DECODER AND RIGHTS MANAGEMENT PROCESSOR

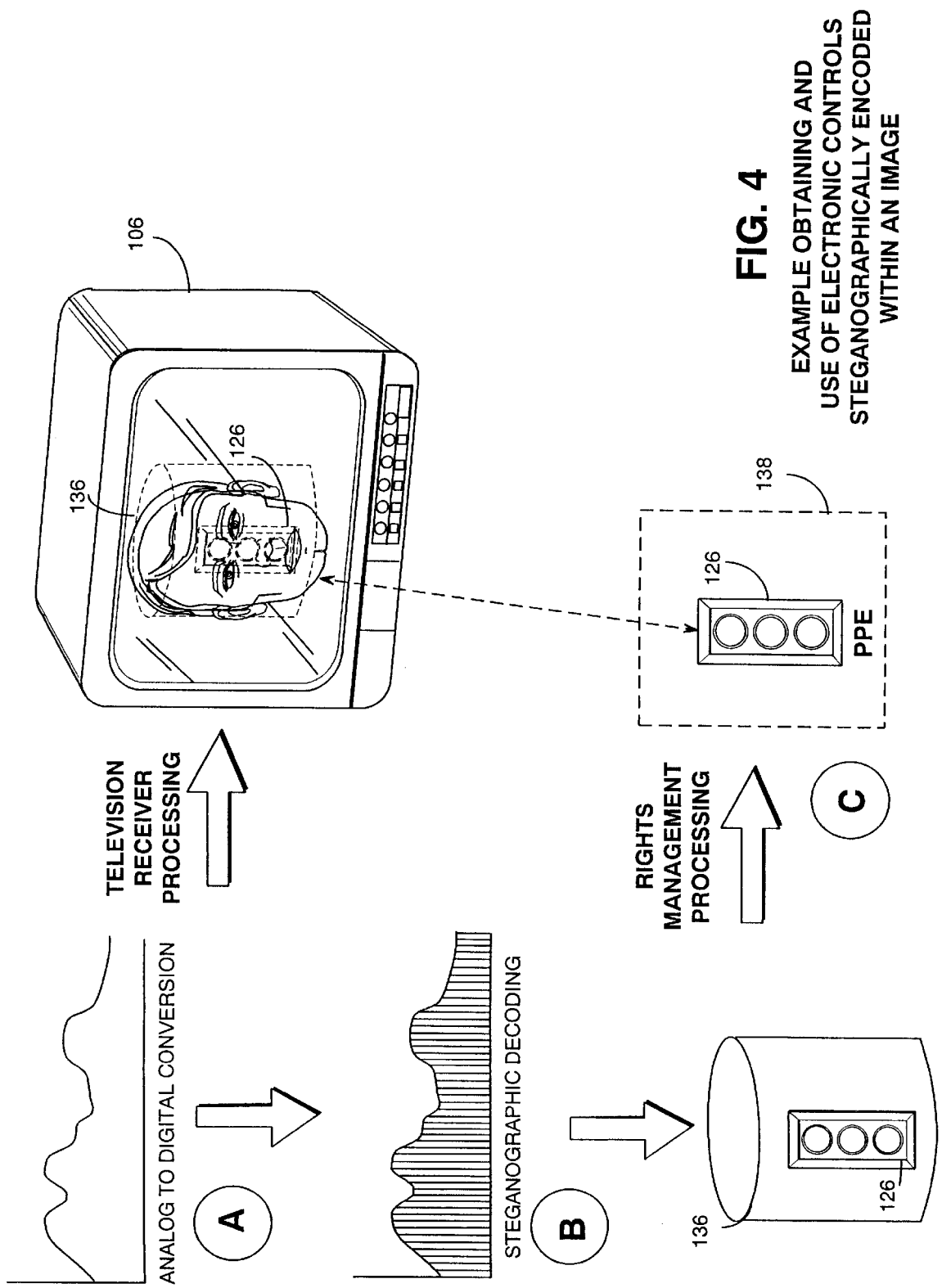

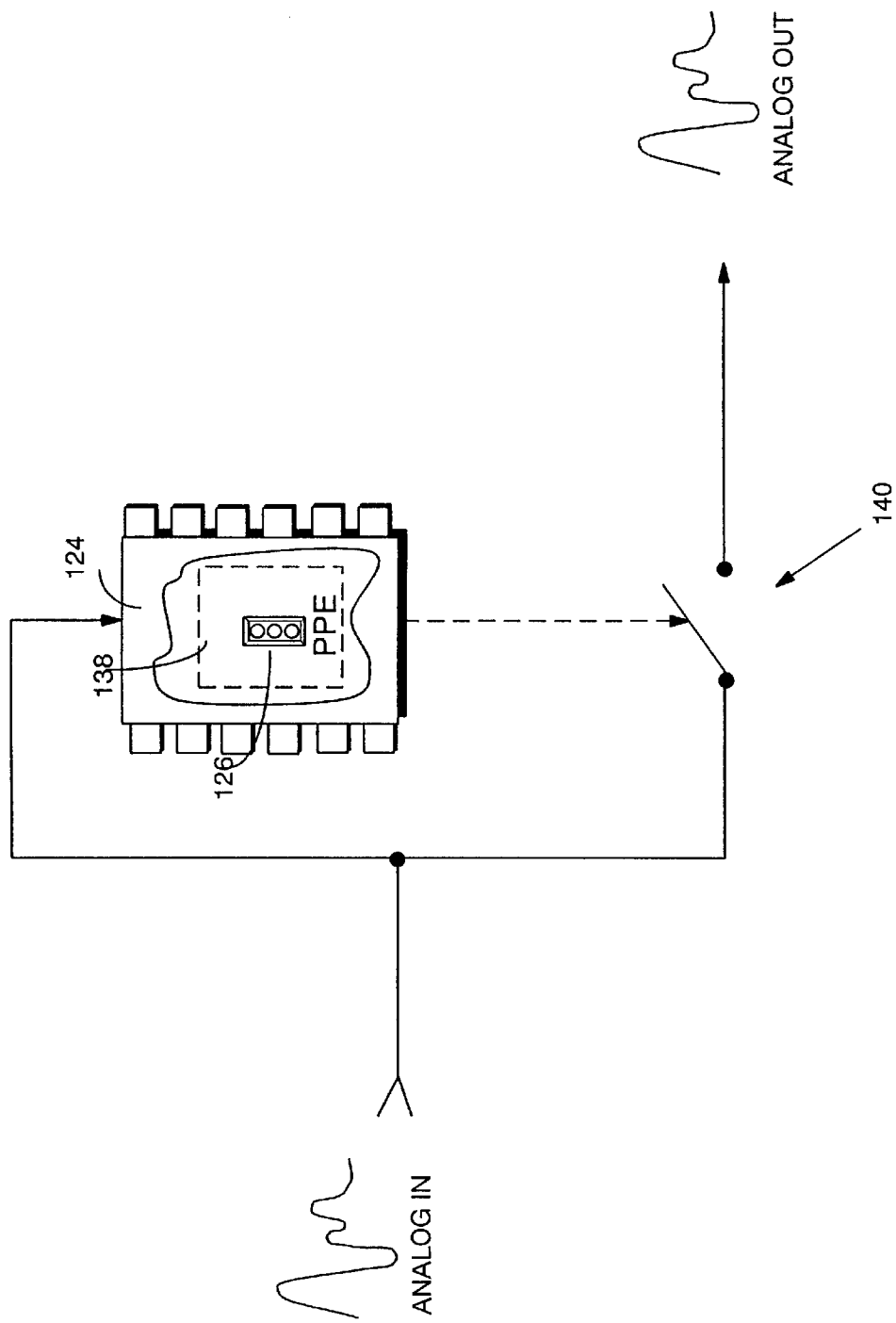

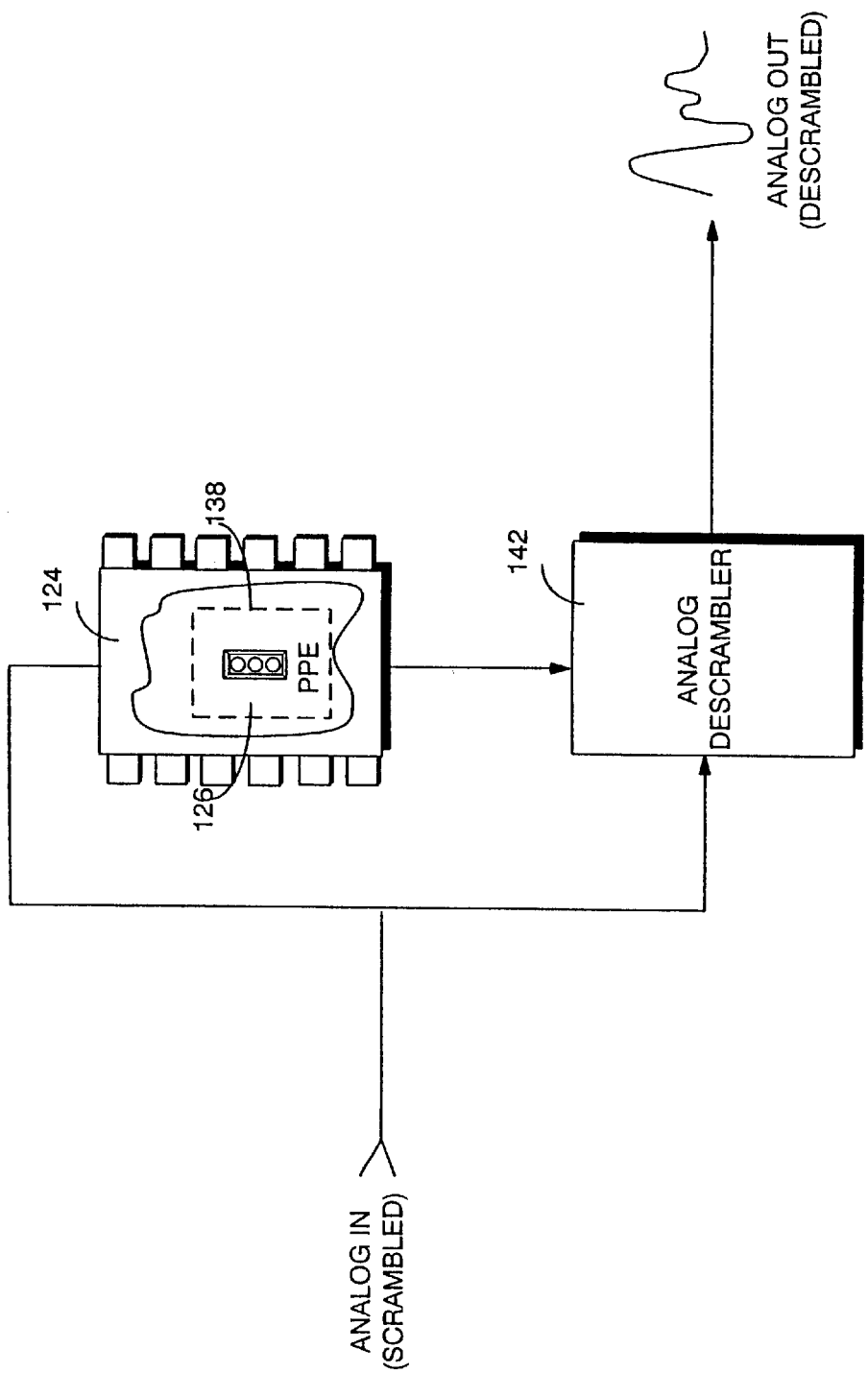
FIG. 5B  EXAMPLE ANALOG DESCRAMBLING CONTROL

USE OF CERTIFICATES TO ENFORCE END-TO-END SECURITY

USE OF FINGERPRINTING FOR ENFORCING STEGANOGRAPHICALLY ENCODED RIGHTS MANAGEMENT CONTROLS

EXAMPLE ANALOG-TO-DIGITAL-TO-ANALOG DISTRIBUTION

EXAMPLE DIGITAL-TO-ANALOG-TO DIGITAL DISTRIBUTION

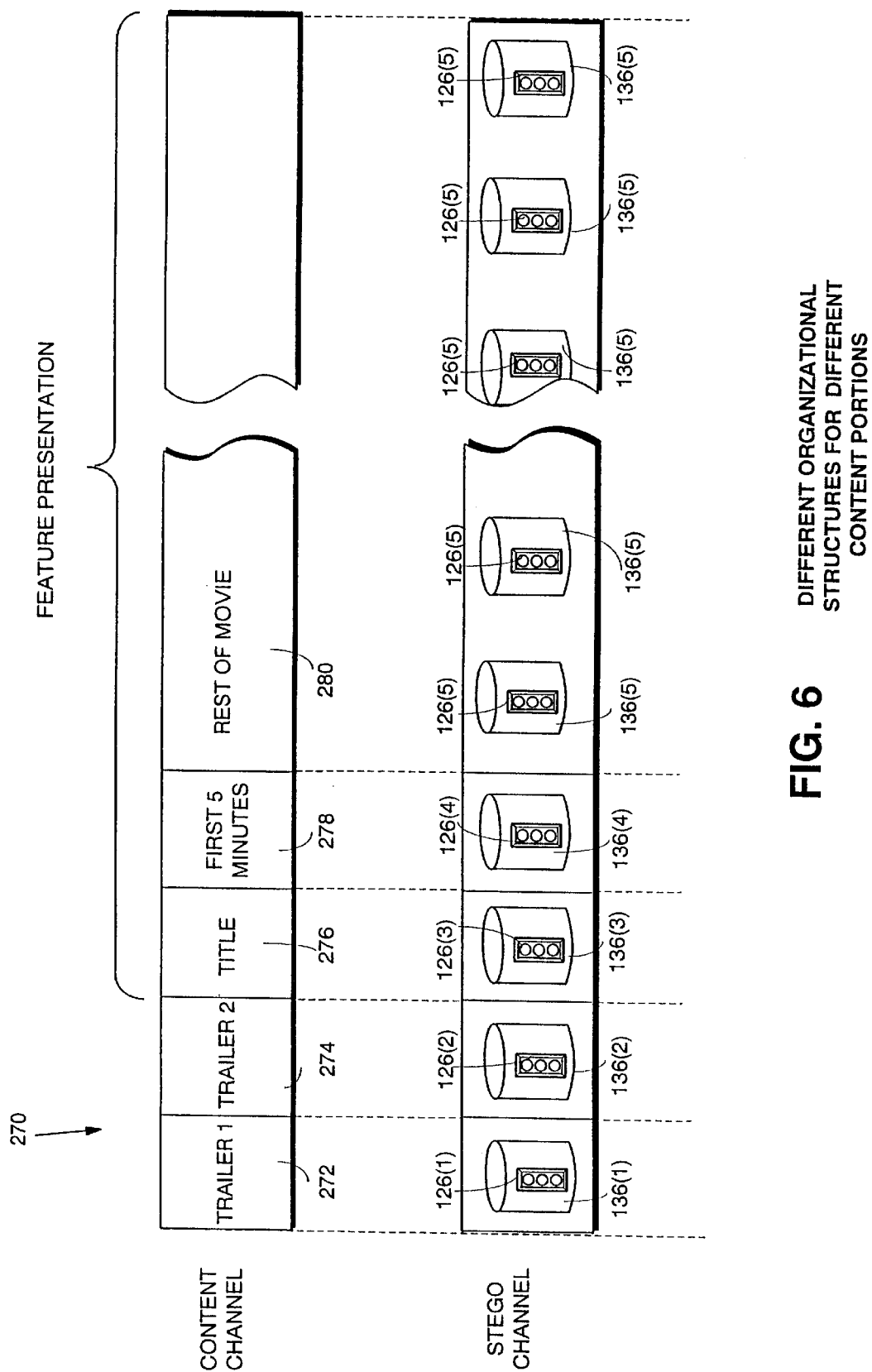
FIG. 6  DIFFERENT ORGANIZATIONAL STRUCTURES FOR DIFFERENT CONTENT PORTIONS

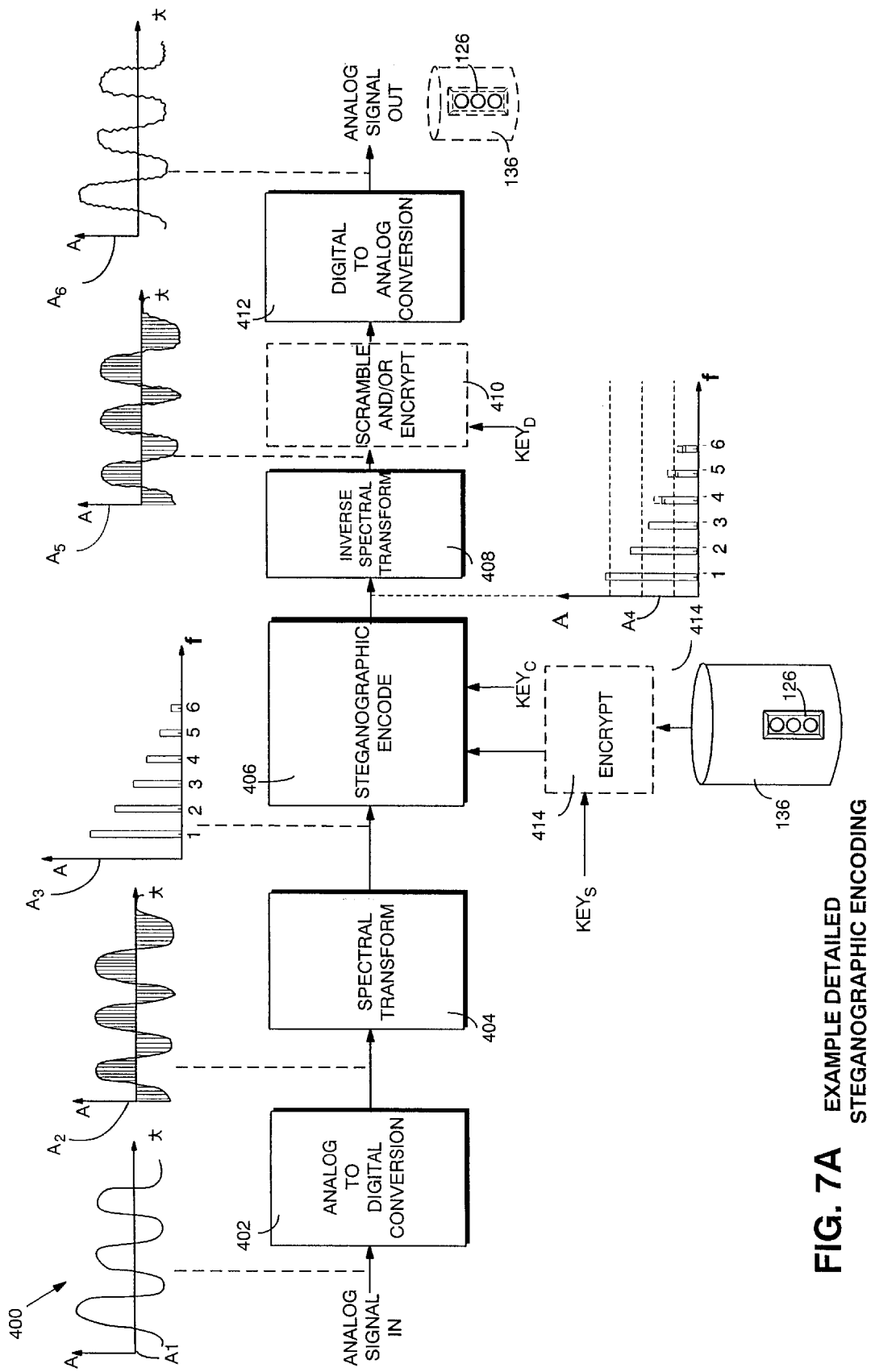
FIG. 7A  EXAMPLE DETAILED STEGANOGRAPHIC ENCODING

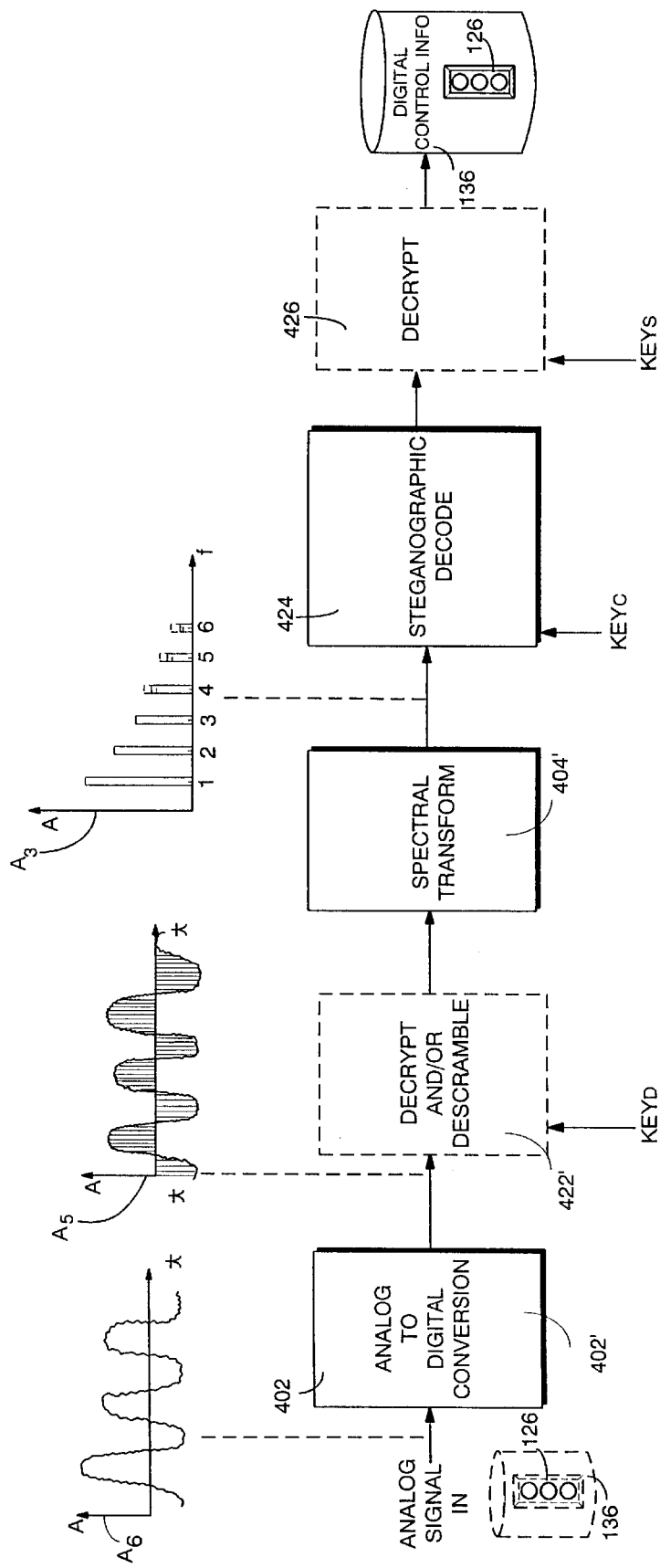
FIG. 7B  EXAMPLE DETAILED STEGANOGRAPHIC DECODING

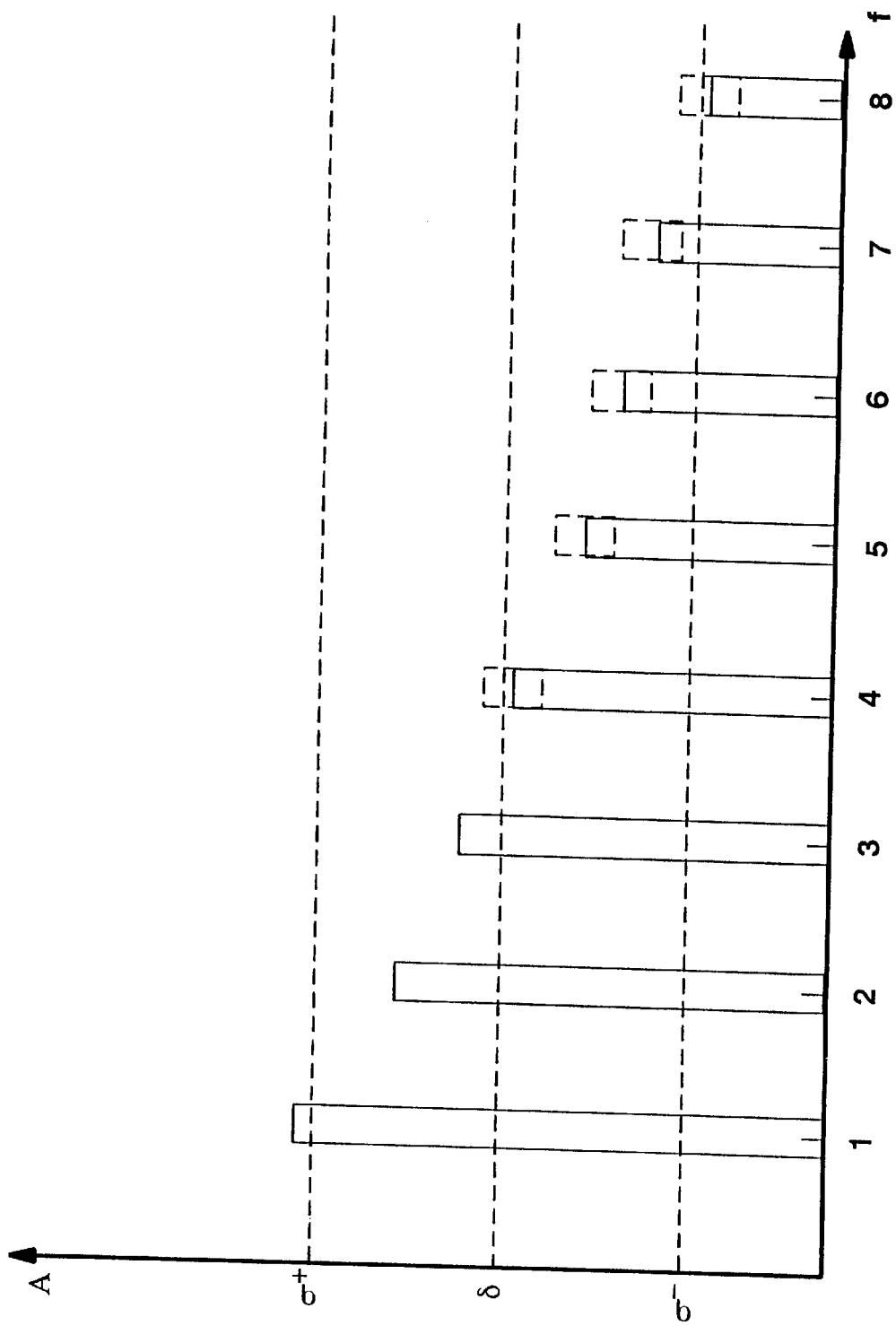
FIG. 8 EXAMPLE FREQUENCY DOMAIN VIEW OF STEGANOGRAPHICALLY ENCODED SIGNAL

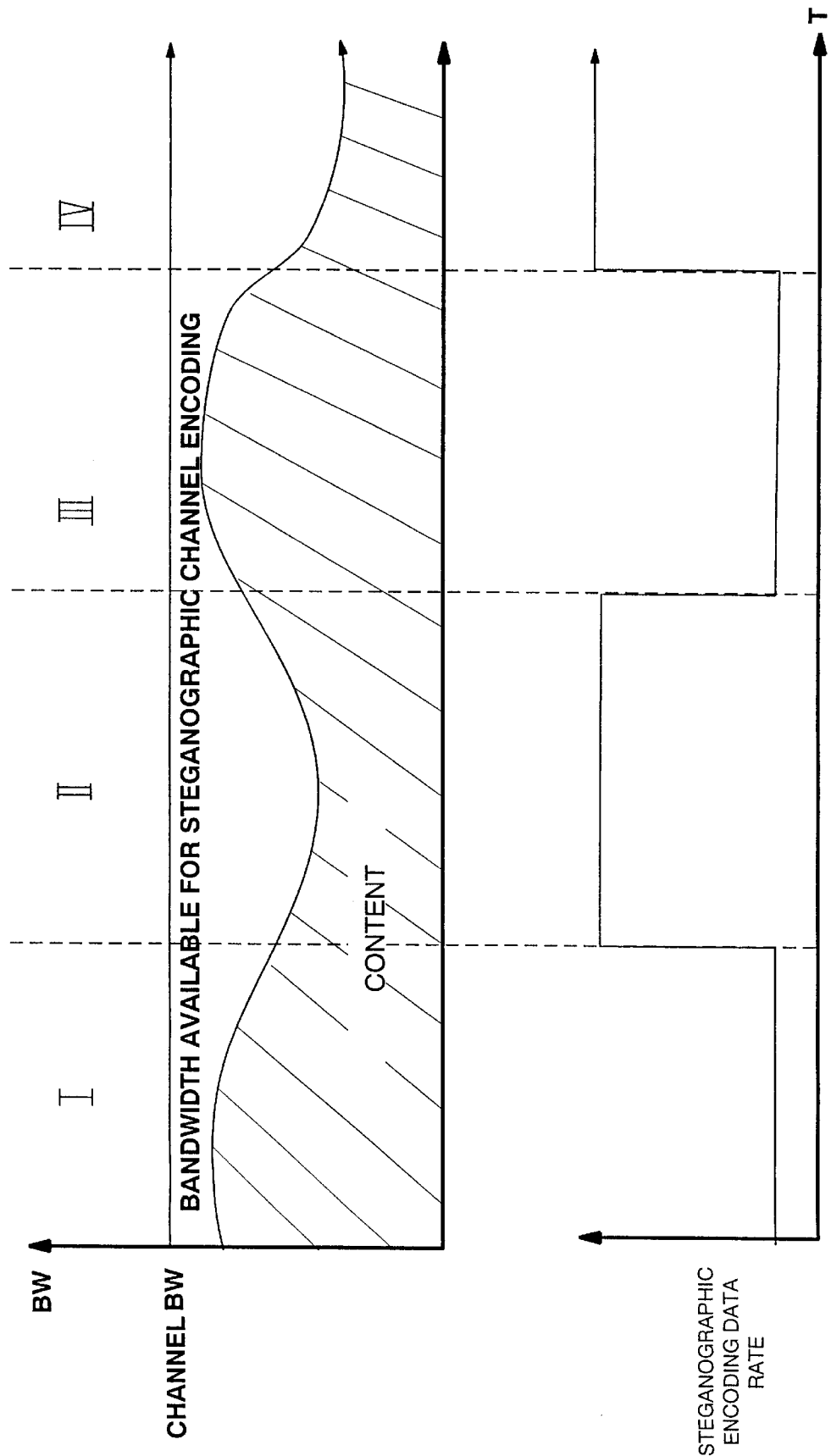
FIG. 9 EXAMPLE VARIABLE DATA RATE STEGANOGRAPHIC ENCODING WITHIN A LIMITED BANDWIDTH CHANNEL

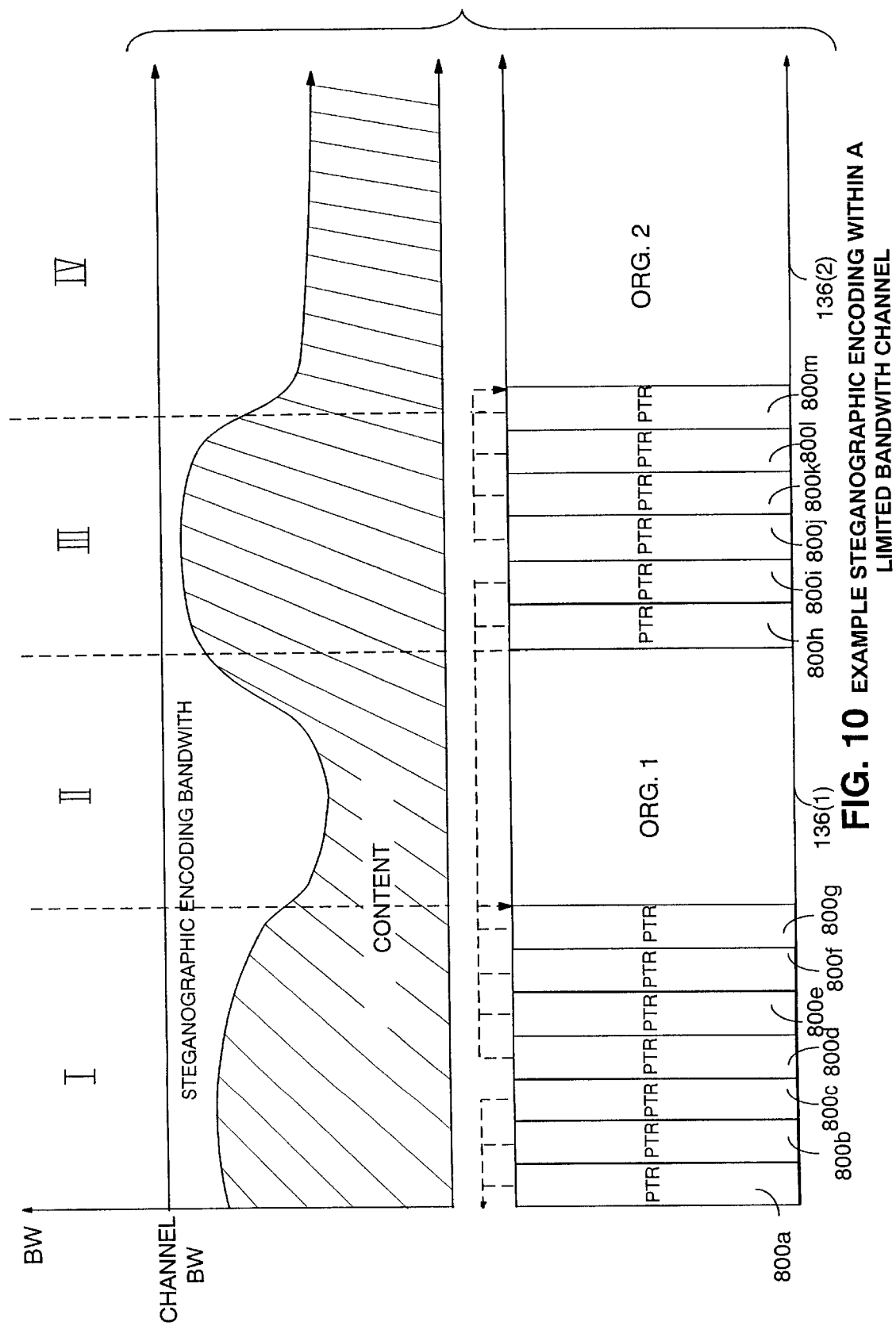

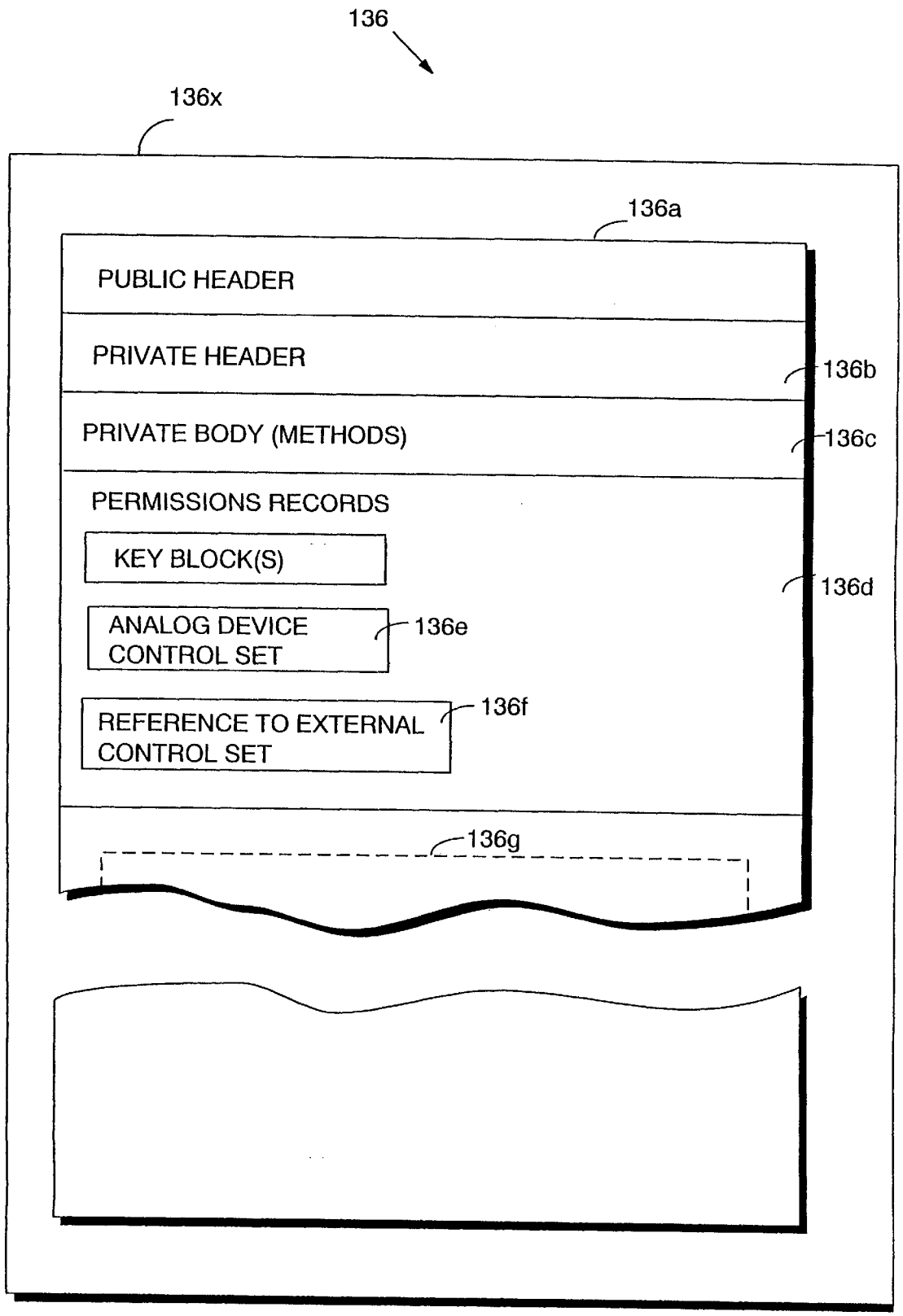
FIG. 11 EXAMPLE STEGANOGRAPHICALLY ENCODED ORGANIZATIONAL STRUCTURE

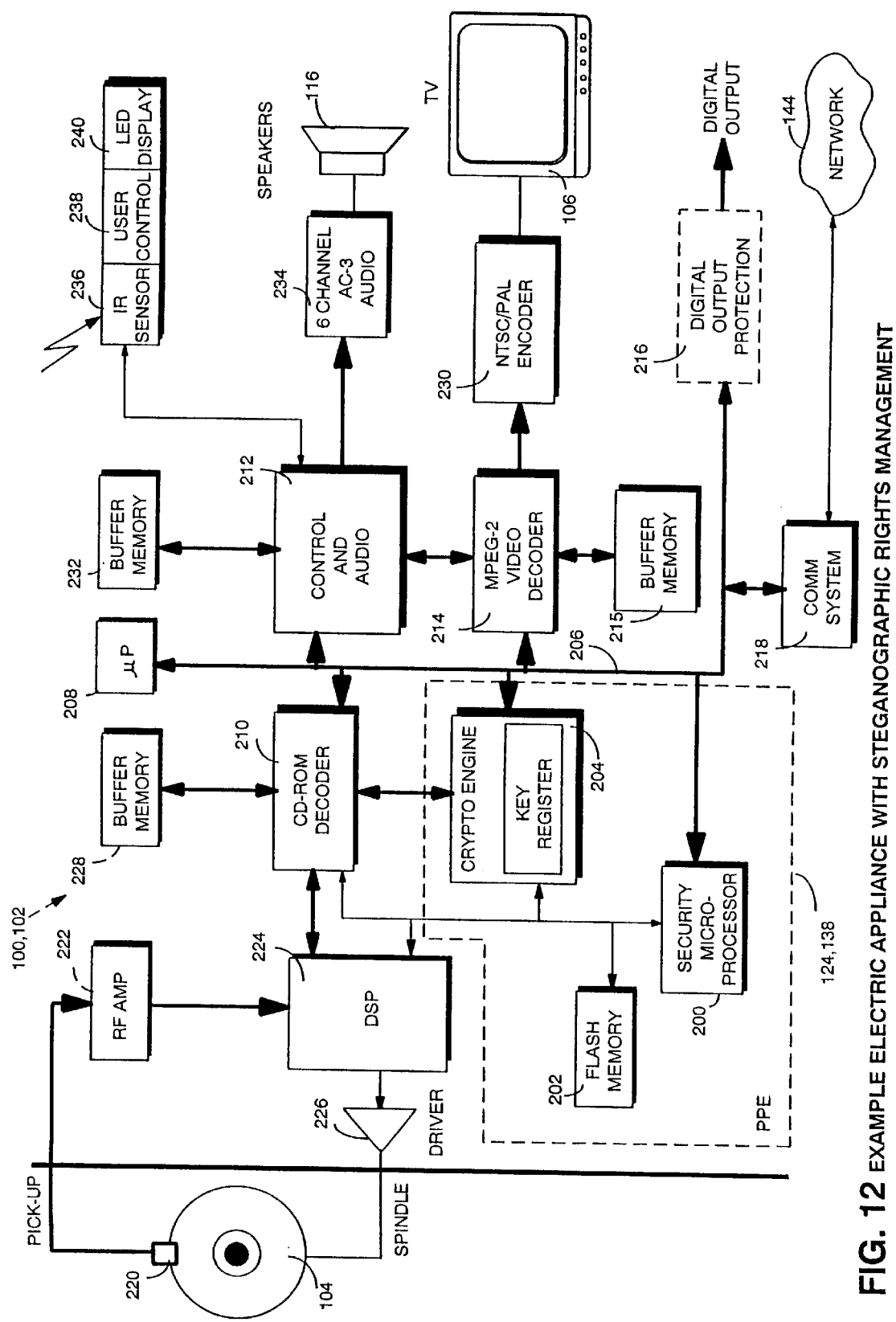
FIG. 12 EXAMPLE ELECTRIC APPLIANCE WITH STEGANOGRAPHIC RIGHTS MANAGEMENT

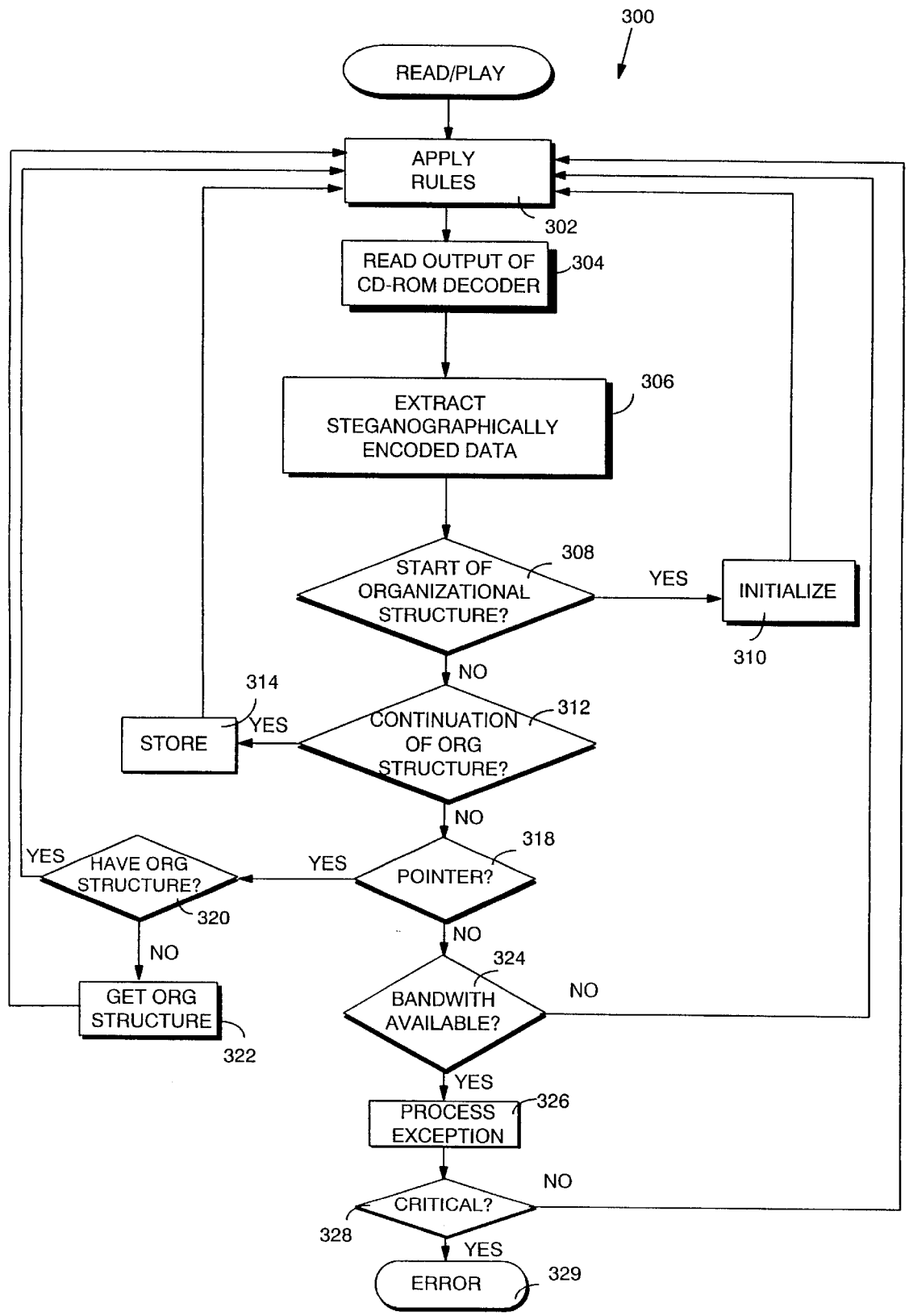
FIG. 13 EXAMPLE CONTROL STEPS

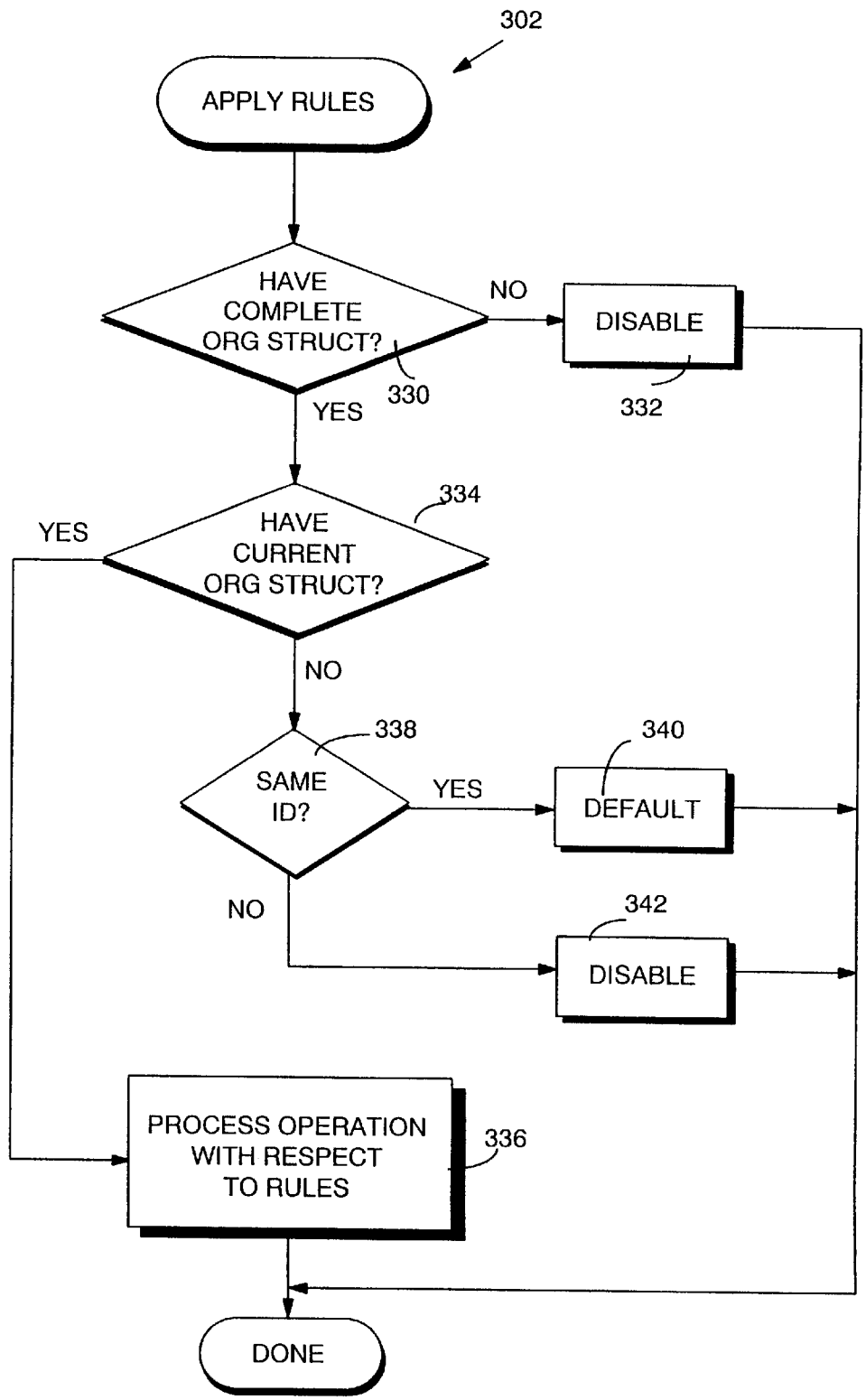
FIG. 13A EXAMPLE APPLY RULES ROUTINE

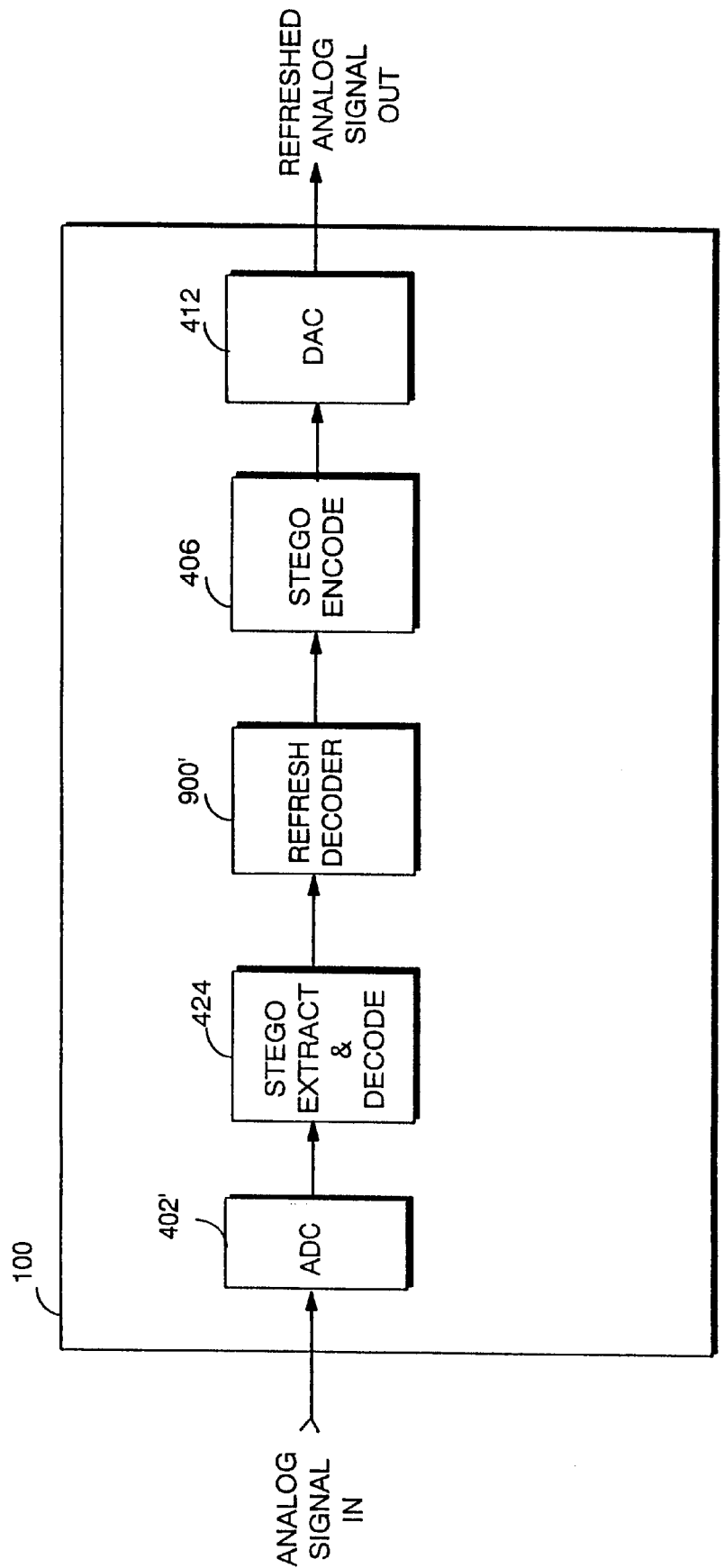
FIG. 14 EXAMPLE REFRESH ARRANGEMENT

EXAMPLE ANALOG SIGNAL DISTRIBUTION

EXAMPLE ANALOG SIGNAL DISTRIBUTION

EXAMPLE ANALOG-TO-DIGITAL DISTRIBUTION

EXAMPLE ANALOG-TO-DIGITAL DISTRIBUTION

EXAMPLE DIGITAL-TO-ANALOG DISTRIBUTION

DIGITAL - TO -ANALOG DISTRIBUTION

STEGANOGRAPHIC TECHNIQUES FOR SECURELY DELIVERING ELECTRONIC DIGITAL RIGHTS MANAGEMENT CONTROL INFORMATION OVER INSECURE COMMUNICATION CHANNELS

CROSS REFERENCE TO RELATED APPLICATION

This application is related to commonly assigned application Ser. No. 08/388,107 of Ginter et al., filed Feb. 13, 1995, entitled "SYSTEMS AND METHODS FOR SECURE TRANSACTION MANAGEMENT AND ELECTRONIC RIGHTS PROTECTION" (attorney reference number 895-13) now abandoned. We incorporate by reference, into this application, the entire disclosure of this prior-filed Ginter et al. patent application just as if its entire written specification and drawings were expressly set forth in this application.

FIELD OF THE INVENTION

The present inventions relate generally to computer security, and more particularly to steganographic techniques for hiding or encoding electronic control information within an information signal carried by an insecure communications channel. Still more particularly, the present inventions relate to systems, methods and techniques that substantially invisibly and/or indelibly convey, over analog or other insecure communications channels, digital rights management control information for use within a virtual distribution environment electronic rights management system.

BACKGROUND AND SUMMARY OF THE INVENTION

The world is becoming digital. Digital signals are everywhere—in our computers, television sets, VCRs, home stereos, and CD players. Digital processing—which operates on information "bits" (numerical "on" or "off" values)—provides a degree of precision and protection from noise that cannot be matched by the older, "analog" formats we have used since the beginning of the electronic age.

Despite the clear advantage of digital communications, the older "analog" domain remains significant. Many of our most important information delivery mechanisms continue to be based on analog—not digital—signaling. In fact, most of our electronic entertainment, news, sports and music program material comes to us in the form of analog signals. For example:

Television remains largely analog. Although the distribution of television programming to local cable systems is increasingly digital and most modern television sets include digital signal processing circuits, the local cable television "head end" continues to send television signals to the subscriber's set top box and television in analog—not digital—form. It will cost a great deal to convert local cable distribution from analog to digital. In the United States, for example, the widespread conversion from analog to digital television is projected to take no less than 15 years and perhaps even longer.

In radio broadcasting, too, analog communication continues to reign supreme. Thousands of radio stations broadcast music, news and other programs every day in analog form. Except for a few experimental digital systems, practically all radio broadcasting is carried over analog communications channels.

The movies and videos we rent at the local video tape rental store are analog.

Commercially available music tape cassettes are recorded in analog formats.

Moreover, the "real world" is analog. Everything digital must ultimately be turned into something analog if we are to experience it; and conversely, everything analog must be turned into something digital if the power of modern digital technology will be used to handle it. Modern digital technology also allows people to get better quality for less money.

Despite the pervasiveness of analog signals, existing methods for managing rights and protecting copyright in the analog realm are primitive or non-existent. For example:

Quality degradation inherent in multigenerational analog copying has not prevented a multi-billion dollar pirating industry from flourishing.

Some methods for video tape copy and pay per view protection attempt to prevent any copying at all of commercially released content, or allow only one generation of copying. These methods can generally be easily circumvented.

Not all existing devices respond appropriately to copy protection signals.

Existing schemes are limited for example to "copy/no copy" controls.

Copy protection for sound recordings has not been commercially implemented.

A related problem relates to the conversion of information between the analog and digital domains. Even if information is effectively protected and controlled initially using strong digital rights management techniques, an analog copy of the same information may no longer be securely protected.

For example, it is generally possible for someone to make an analog recording of program material initially delivered in digital form. Some analog recordings based on digital originals are of quite good quality. For example, a Digital Versatile Disk ("DVD") player may convert a movie from digital to analog format and provide the analog signal to a high quality analog home VCR. The home VCR records the analog signal. A consumer now has a high quality analog copy of the original digital property. A person could re-record the analog signal on a DVD-R (a Digital Versatile Disk appliance and media supporting both read and write operations). This recording will in many circumstances have substantial quality—and would no longer be subject to "pay per view" or other digital rights management controls associated with the digital form of the same content.

Since analog formats will be with us for a long time to come, rightsholders such as film studios, video rental and distribution companies, music studios and distributors, and other value chain participants would very much like to have significantly better rights management capabilities for analog film, video, sound recordings and other content. Solving this problem generally requires a way to securely associate rights management information with the content being protected.

People have for many years been using various techniques allowing digital information to, in effect, ride "piggyback" on analog information signals. For example, since the 1960s, it has been common to digitally encode text information such as subtitles into otherwise unused portions of analog television signals (e.g., within the so-called "Vertical Blanking Interval").

Unfortunately, sending digital information using such known digital encoding techniques is problematic because the digital information is not persistent. It is relatively easy to strip out or eliminate digital information encoded using prior techniques commonly employed for superimposing digital signals onto an analog information signal. Analog communications channels may commonly be subjected to various signal processing that may (intentionally or unintentionally) strip out digital information added to the analog signal—defeating any downstream system, process or technique that depends on the presence and readability of the digital information. For example, the television vertical blanking signal—along with any signal components disposed within the vertical blanking interval—is typically routinely eliminated whenever a video signal is processed by a computer.

Attempting to use insecure techniques for providing rights management is at best ineffective, and can be worse than no rights management at all. Unscrupulous people can strip out insecure control information altogether so that the corresponding information signal is subject to no controls at all—for example, defeating copy protection mechanisms and allowing users to avoid paying for rights usage. More nefariously, an unscrupulous person could alter an insecure system by substituting false control information in place of the proper information. Such substitutions could, for example, divert payments to someone other than legitimate rights holders—facilitating electronic fraud and theft.

Prior, insecure techniques fail to solve the overall problem of how to provide and securely manage advanced automatic electronic rights management for analog and other information signals conveyed over an insecure communications channel. The lack of strong rights management for analog signals creates a huge gap in any comprehensive electronic rights management strategy, and makes it possible for consumers and others to circumvent—to at least some extent—even the strongest digital rights management technologies. Consequently, there is a real need to seamlessly integrate analog delivery models with modern electronic digital rights management techniques.

The present inventions solve these and other problems by providing "end to end" secure rights management protection allowing content providers and rights holders to be sure their content will be adequately protected—irrespective of the types of devices, signaling formats and nature of signal processing within the content distribution chain. This "end to end" protection also allows authorized analog appliances to be easily, seamlessly and cost-effectively integrated into a modern digital rights management architecture.

The present inventions may provide a Virtual Distribution Environment ("VDE") in which electronic rights management control information may be delivered over insecure (e.g., analog) communications channels. This Virtual Distribution Environment is highly flexible and convenient, accommodating existing and new business models while also providing an unprecedented degree of flexibility in facilitating ad hoc creation of new arrangements and relationships between electronic commerce and value chain participants—regardless of whether content is distributed in digital and/or analog formats.

The present inventions additionally provide the following important and advantageous features:

An indelible and invisible, secure technique for providing rights management information.

An indelible method of associating electronic commerce and/or rights management controls with analog content such as film, video, and sound recordings.

Persistent association of the commerce and/or rights management controls with content from one end of a distribution system to the other—regardless of the number and types of transformations between signaling formats (for example, analog to digital, and digital to analog).

The ability to specify "no copy/one copy/many copies" rights management rules, and also more complex rights and transaction pricing models (such as, for example, "pay per view" and others).

The ability to fully and seamlessly integrate with comprehensive, general electronic rights management solutions (such as those disclosed in the Ginter et al. patent specification referenced above).

Secure control information delivery in conjunction with authorized analog and other non-digital and/or non-secure information signal delivery mechanisms.

The ability to provide more complex and/or more flexible commerce and/or rights management rules as content moves from the analog to the digital realm and back.

The flexible ability to communicate commerce and/or rights management rules implementing new, updated, or additional business models to authorized analog and/or digital devices.

Briefly, the present inventions use "steganography" to substantially indelibly and substantially invisibly encode rights management and/or electronic commerce rules and controls within an information signal such as, for example, an analog signal or a digitized (for example, sampled) version of an analog signal.

The Greek term "steganography" refers to various "hidden writing" secret communication techniques that allow important messages to be securely carried over insecure communications channels. Here are some examples of steganography:

In ancient Persia an important message was once tattooed on a trusted messenger's shaved scalp. The messenger then allowed his hair to grow back—completely hiding the message. Once the messenger made his way to his destination, he shaved his hair off again—exposing the secret message so the recipient could read it on the messenger's shaved scalp. See Kahn, David, The Codebreakers page 81 et seq. and page 513 et seq. (Macmillan 1967). This unusual technique for hiding a message is one illustration of "steganography."

Another "steganographic" technique encodes a secret message within another, routine message. For example, the message "Hey Elmer, Lisa Parked My Edsel" encodes the secret message "HELP ME"—the first letter of each word of the message forming the letters of the secret message ("Hey Elmer, Lisa Parked My Edsel"). Variations on this technique can provide additional security, but the basic concept is the same—finding a way to hide a secret message within information that can or will be sent over an insecure channel.

Invisible ink is another commonly used "steganography" technique. The secret message is written using a special disappearing or invisible ink. The message can be written on a blank piece of paper, or more commonly, on the back or front of the piece of paper carrying a routine-looking or legitimate letter or other written communication. The recipient performs a special process on the received document (e.g., exposing it to a chemical or other process that makes the invisible ink visible) so that he or she can read the message. Anyone intercepting the paper will be unable to detect the secret message—or even know that it is there—unless the interceptor knows to look for the invisible message and also knows how to treat the paper to make the invisible ink visible The present inventions use steganography to ensure that encoded control information is both substantially invisible and substantially indelible as it passes over an insecure communications channel. At the receiving end, a secure, trusted component (such as a protected processing environment described in Ginter et al.) recovers the steganographically-encoded control information, and uses the recovered information to perform electronic rights management (for example, on analog or other information signals carried over the same channel).

One specific aspect provided by the present inventions involve steganographically encoding digital rights management control information onto an information signal such as, for example, an analog or digitized television, video or radio signal. The steganographic encoding process substantially inextricably intertwines the digital control information with images, sounds and/or other content the information signal carries—but preferably without noticeably degrading or otherwise affecting those images, sounds and/or other content. It may be difficult to detect (even with educated signal processing techniques) that the analog signal has been steganographically encoded with a rights management control signal, and it may be difficult to eliminate the steganographically encoded control signal without destroying or degrading the other information or content the signal carries.

The present inventions also provide a secure, trusted protected processing environment to recover the steganographically-encoded control signal from the information signal, and to enforce rights management processes based on the recovered steganographically encoded control signal. This allows the information signal delivery mechanism to be fully integrated (and made compatible) with a digital virtual distribution environment and/or other electronic rights management system.

In accordance with yet another aspect provided by this invention, steganographically encoded, digital rights management control information may be used in conjunction with a scrambled and/or encrypted information signal. The scrambling and/or encryption can be used to enforce the rights management provided in accordance with the steganographically encoded rights management control information. For example, the control signal can be steganographically decoded and used to control, at least in part, under what circumstances and/or how the information signal is to be descrambled and/or decrypted.

In accordance with yet another feature provided by the invention, digital certificates can be used to securely enforce steganographically encoded rights management control information.

In accordance with still another feature provided by the invention, steganography is used to encode an information signal with rights management control information in the form of one or more protected organizational structures having association with electronic controls. The electronic controls may, for example, define permitted and/or required operation(s) on content, and consequences of performing and/or failing to perform such operations. The organizational structure(s) may identify, implicitly or explicitly, the content the electronic controls apply to. The organizational structure(s) may also define the extent of the content, and semantics of the content.

The type, amount and characteristics of the steganographically encoded rights management control information are flexible and programmable—providing a rich, diverse mechanism for accommodating a wide variety of rights management schemes. The control information can be used to securely enforce straightforward secure rights management consequences such as "copy/no copy/one copy" type controls—but are by no means limited to such models. To the contrary, the present invention can be used to enable and enforce much richer, more complex rights management models—including for example those involving usage auditing, automatic electronic payment, and the use of additional electronic network connections. Moreover, the rights management control arrangements provided by the present invention are infinitely extensible and scaleable—fully accommodating future models as they are commercially deployed while preserving full compatibility with different (and possibly more limited) rights management models deployed during earlier stages.

The organizational structure(s) may be steganographically encoded in such a way that they are protected for purposes of secrecy and/or integrity. The employed steganographic techniques may provide some degree of secrecy protection—or other security techniques (e.g., digital encryption, digital seals, etc.) may be used to provide a desired or requisite degree of security and/or integrity protection for the steganographically encoded information.

In one example, the organizational structure(s) may comprise digital electronic containers that securely contain corresponding digital electronic control information. Such containers may, for example, use cryptographic techniques. In other examples, the organizational structure(s) may define associations with other electronic control information. The other electronic control information may be delivered independently over the same or different communications path used to deliver the organizational structure(s).

In one example, the steganographic techniques employed may involve applying the organizational structure information in the form of high frequency "noise" to an analog information signal. Spectral transforms may be used to apply and recover such steganographically-encoded high frequency "noise." Since the high frequency noise components of the information signal may be essentially random, adding a pseudo-random steganographically encoded control signal component may introduce substantially no discernible information signal degradation, and may be difficult to strip out once introduced (at least without additional knowledge of how the signal was incorporated, which may include a shared secret).

In accordance with another aspect provided by the invention, a steganographic encoding process analyzes an information signal to determine how much excess bandwidth is available for steganographic encoding. The steganographic encoding process may use variable data rate encoding to apply more control information to parts of an information signal that use much less than all of the available communications channel bandwidth, and to apply less control information to parts of an information signal that use nearly all of the available communications channel bandwidth.

In accordance with still another aspect provided by the invention, multiple organizational structures may be steganographically encoded within a given information signal. The multiple organizational structures may apply to different corresponding portions of the information signal, and/or the multiple organizational structures may be repetitions or copies of one another to ensure that an electronic appliance has "late entry" and/or error correcting capability and/or can rapidly locate a pertinent organizational structure(s) starting from any arbitrary portion of the information signal stream.

In accordance with yet another aspect provided by this invention, an organizational structure may be steganographically encoded within a particular portion of a content-carrying information signal to which the organizational structure applies—thereby establishing an implicit correspondence between the organizational structure and the identification and/or extent and/or semantics of the information content to which the organizational structure applies. The correspondence may, for example, include explicit components (e.g., internally stated start/end points), with the storage or other physical association determined by convenience (i.e., it may make sense to put the organizational structure close to where it is used, in order to avoid seeking around storage media to find it).

In accordance with yet another aspect provided by this invention, pointers can be steganographically encoded into parts of an information signal stream that has little excess available bandwidth. Such pointers may be used, for example, to direct an electronic appliance to portions of the information signal stream having more available bandwidth for steganographic encoding. Such pointers may provide improved steganographic decode access time—especially, for example, in applications in which the information signal stream is stored or otherwise available on a random access basis.

BRIEF DESCRIPTION OF THE DRAWINGS

These and other features and advantages provided by this invention may be better and more completely understood by referring to the following detailed description of presently preferred example embodiments in conjunction with the drawings, of which:

FIG. 1 shows a virtual distribution environment providing steganographic encoding of digital rights management control information;

FIG. 4 shows an example of how steganographically encoded electronic control signals can be extracted and used for digital rights management;

FIGS. 5A–5D show example techniques for enforcing steganographically encoded rights management control information;

FIG. 6 shows an example of multiple sets of digital rights management control information steganographically encoded onto different parts of the same information signal stream;

FIG. 7A shows an example detailed steganographic encoding process;

FIG. 7B shows an example detailed steganographic decoding process;

FIG. 8 shows an example frequency domain view of an example steganographic signal encoding technique;

FIG. 9 shows an example use of a variable steganographic encoding rate to avoid exceeding channel bandwidths;

FIGS. 10 and 10A show how steganographically encoded pointers can be used to minimize access times to control signals steganographically encoded onto information signal streams available on a random access basis;

FIG. 11 shows an example steganographically encoded organizational structure;

FIG. 12 shows an example electronic appliance architecture having electronic rights management capabilities based at least in part on steganographically encoded control information;

FIGS. 13 and 13A show example control steps that may be performed by the FIG. 12 appliance;

FIG. 14 shows an example steganographic refresh arrangement; and

FIGS. 15A–5F show example distribution systems using steganographic encoding of rights management control information along at least one leg of an information distribution path.

DETAILED DESCRIPTION OF PRESENTLY PREFERRED EXAMPLE EMBODIMENTS

Figure 1A:
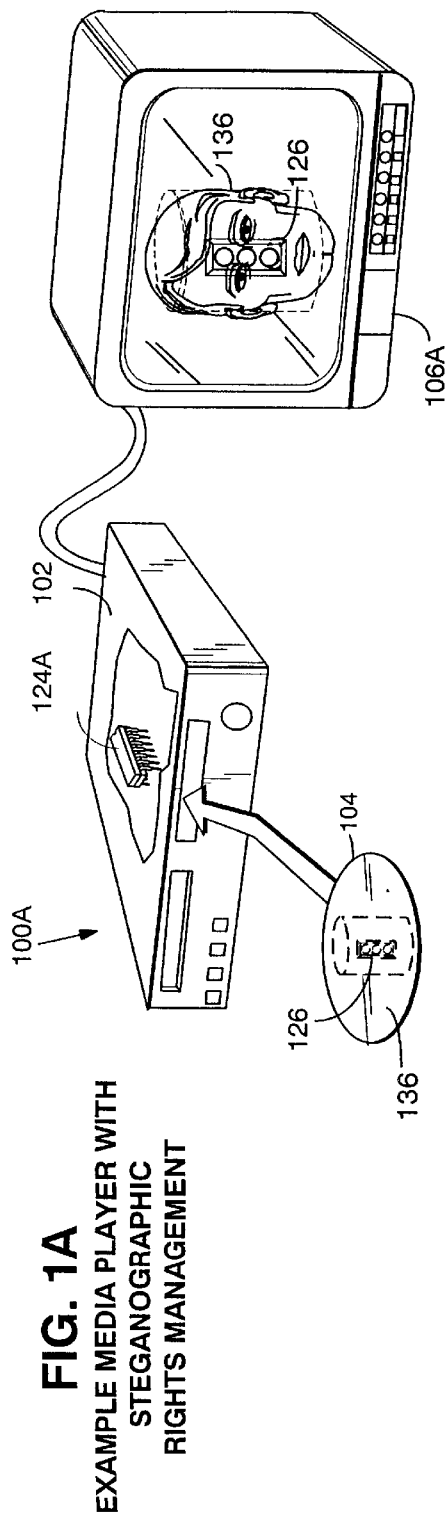
FIGS. 1A–1E show example electronic appliances embodying aspects of this invention.

FIG. 1 shows an example Virtual Distribution Environment (VDE) 50 employing steganography to deliver electronic digital rights management control information over an insecure (e.g., analog) communications channel.

In this example, a provider 60 delivers an information signal 70 to multiple electronic appliances 100(1), . . . , 100(N). In this particular example, provider 60 is shown as being a television broadcaster that delivers an analog television information signal 70 over a wireless or cable communications path, and appliances 100(1), . . . , 100(N) are shown as being home color television sets 106. As made clear by FIGS. 1A–1E, the present inventions may be used by a variety of different types of electronic appliances 100 receiving a variety of different types of information signals via a variety of different types of communications channels.

In the FIG. 1 example, provider 60 steganographically encodes electronic rights management control information 126 into the information signal 70. This control information 126 is represented in this diagram as a traffic light because it may define permitted and/or required operation(s), and consequences of performing or failing to perform such operations. For example, control information 126 could specify that a viewer or class of viewers has permission to watch a particular program, is forbidden to watch a program, or may watch a program only under certain conditions (for example, based on paying a certain amount, being over a certain age, etc.). In this example the control information 126 is shown as being packaged within an electronic "container" 136. Container 136 (which in at least one example is provided by steganographic encoding techniques) is used to protect the integrity of the control information 126.

The provider 60 encodes the electronic rights management control information 126 onto information signal 70 using steganographic techniques that make the control information both:

substantially invisible, and substantially indelible.

The control information 126 is substantially indelibly encoded because, in this example, it is substantially inextricably intertwined with the television images and/or sound—and can't easily be eliminated from information signal 70 without destroying the images, sound or other information carried by the information signal. For example, steganographically encoding rights management control information will generally survive compression and decompression of a digitized analog signal, and will also survive repeated analog/digital/analog conversion sequences.

Even though the steganographically encoded control information 126 is substantially indelible, the television viewer is not bothered by the steganographically encoded information because the steganographically encoded rights management control information is, in this example, also encoded substantially invisibly. In fact, the viewer may not be able to see the steganographic control information at all—and it may have no effect whatsoever on his or her viewing experience (other than in terms of the effect is has on associated rights management processes). The control information 126 is shown in dotted lines on the FIG. 1 screens of television sets 106 to emphasize that the control information is substantially inextricably intertwined with the television images and/or sounds—and yet can't really be seen or noticed by the television viewer.

Figure 2:
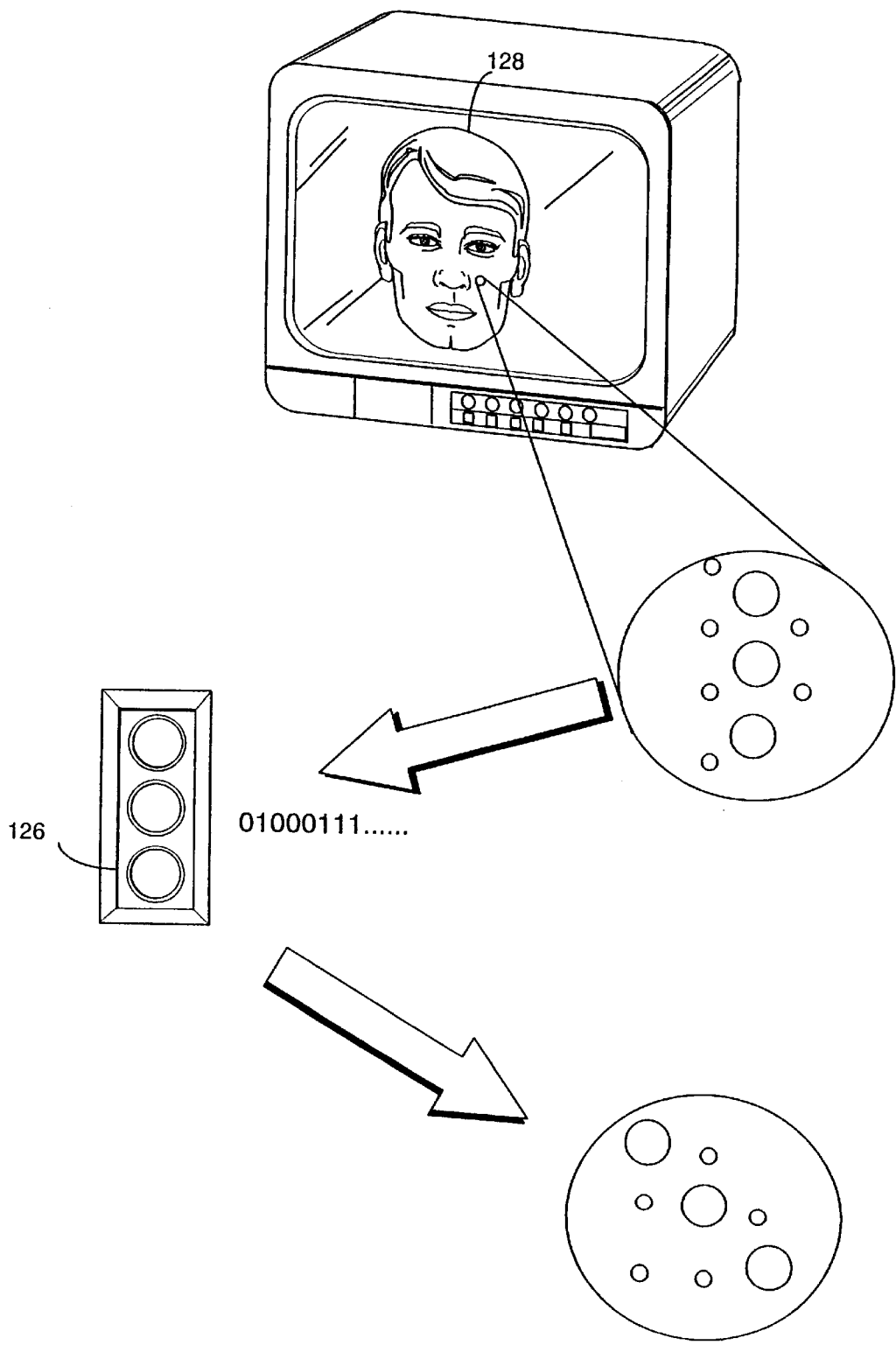
FIG. 2 shows an example of how electronic control information can be steganographically encoded within an image.

FIG. 2 shows an example of how digital control information 126 may be encoded within an image 128 so that, in one particular example, it is both substantially invisible and substantially indelible. In this specific image context, for example, "substantially invisible" may refer to the characteristic of the encoded control information as not substantially interfering with or adversely affecting the viewer's experience in viewing image 128 or otherwise using the content carried by the information signal 70 and/or that it is difficult to detect using various types of signal processing techniques, for example. For example, invisibility can be a measurable quantity (measured in a number of processor instructions, such as MIPS years, for example), and can be related to signal processing as opposed to the naked eye. In this context, "substantially indelible" can mean, for example, that the encoded digital control information is substantially inextricably intertwined with the content information, making it difficult for example to strip out the encoded digital control information without also damaging or degrading the content. Degree of indelibility may, for example, be measured by the number of processor instructions required to strip the information out.

FIG. 2 shows that a slight rearrangement of picture element configuration in a small portion of image 128 is one way to steganographically encode electronic control information into the image to provide a substantially indelible, substantially invisible encoding. This encoding may be unnoticeable to the viewer, and yet it may be difficult to strip out or eliminate without also damaging the image. Steganographically encoding digital control information into the information signal 70 may effectively merge, from a practical standpoint, the digital control information with the other information carried by the signal (for example, television programming or other content). The steganographic techniques make it difficult for someone to intentionally or unintentionally eliminate the encoded control information without damaging the content, but may (in one example) nevertheless hide the encoded control information so that it does not unduly detract from the content.

Since indelibility of the steganographic encoding provides persistence, indelibility may be more important than invisibility in at least some applications. For example, it may be desirable in some applications to use a shared secret to decode and then remove the steganographically encoded control information 126 before presenting the information signal (or its content) to the user. The steganographically encoded information need not be particularly invisible in this scenario. Even though someone with knowledge of the shared secret can remove the steganographically encoded information, it may nevertheless remain substantially indelible to anyone who doesn't know the shared secret required to remove it.

Organization Structures

FIG. 1 shows that control information 126 may be packaged within one or more organizational structures such as secure digital containers 136. Containers 136 may be, for example, of the type described in the Ginter et al. patent specification in connection with FIGS. 17–26B. The organizational structure(s) may identify, implicitly or explicitly, the content the electronic controls apply to. The organizational structure(s) may also define the extent of the content, and semantics of the content.

The organizational structure(s) may be encoded in such a way that they are protected for purposes of secrecy, authenticity and/or integrity. The employed steganographic technique may provide such protection, or another security technique may be used in conjunction with steganography to provide a desired or requisite degree of protection depending on the application. Containers 136 may, for example, use mathematical techniques called "encryption" that help guarantee the integrity and/or secrecy of the control information 126 they contain.

Example Rights Management Component

Each of the FIG. 1 example appliances 100 may include a electronic digital rights management component 124. Rights management component 124 may, for example, comprise one or more tamper-resistant integrated circuit "chips". Components 124 may, for example, be of the general type described in detail at FIG. 9 and following of the Ginter et al. patent specification. Briefly, Ginter et al. describes a Virtual Distribution Environment ("VDE") including multiple electronic appliances coupled together through a communications capability. Each electronic appliance has such a secure, tamper-resistant "protected processing environment" in which rights management processes may securely take place. The Virtual Distribution Environment delivers digital control information to the protected processing environments by packaging the control information within secure electronic digital containers. This delivered control information provides at least part of the basis for performing electronic rights management functions within the protected processing environments.

The ability to securely deliver digital control information to such protected processing environments as embodied with components 124 is important at least because it increases flexibility and enhances functionality. For example, different digital control information can be delivered for the same or different electronic content. As one specific example, one set of rules may apply to a particular television program, another set of rules might apply to a particular film, and a still different set of rules could apply to a particular musical work. As yet another example, different classes of users of the same electronic content can receive different control information depending upon their respective needs.

Rights management components 124 are able to steganographically decode the control information 126 carried by the information signal 70. Components 124 use the decoded control information 126 to electronically manage rights. For example, components 126 may use the decoded control information 126 to control how the images and/or sound carried by information signal 70 may be used.

Figure 3:
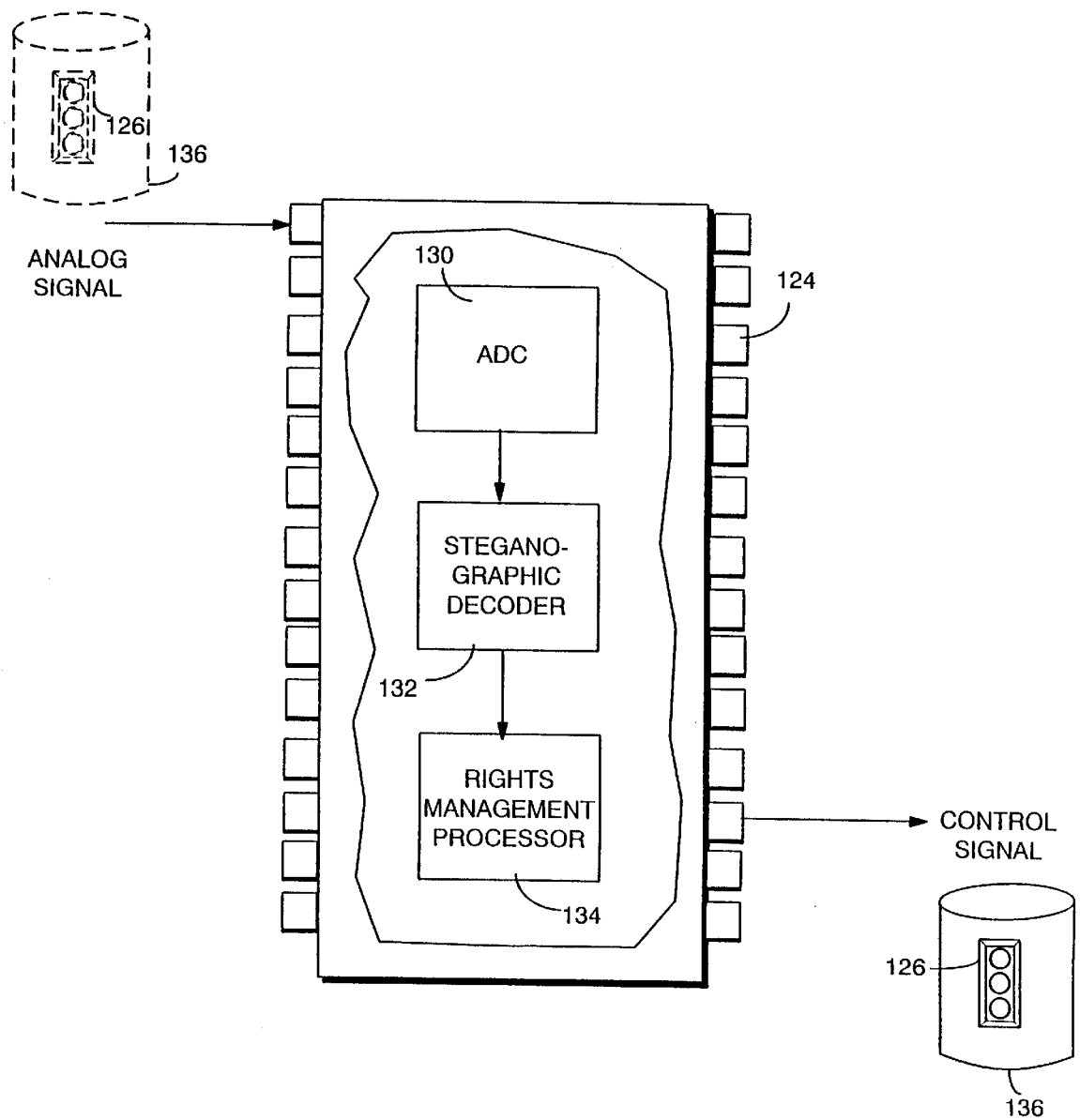
FIG. 3 shows an example rights management component providing a steganographic decoding function.

In one example, digital rights management component 124 may comprise or include one or more integrated circuit chips as shown in FIG. 3. The FIG. 3 example rights management component 124 includes an analog-to-digital converter 130, a steganographic decoder 132, and a rights management processor 134. Rights management processor 134 may include or comprise a protected processing environment 138 as described in Ginter et al. FIGS. 8–12, for example, providing a tamper-resistant execution environment for effecting the operations provided by electronic controls 126. Rights management component 124 may also include a steganographic encoder and a digital-to-analog converter (not shown).

The analog-to-digital converter (ADC) 130 shown in FIG. 3 takes the incoming information signal 70 and—if it is in analog form—converts it to a digital signal (see FIG. 4, step "A"). Steganographic decoder 132 obtains the digital control information 126 from the resulting digital signal (FIG. 4, step "B"). As mentioned above, digital control information 126 may define permitted and/or required operation(s) on the content carried by signal 70, and may further define consequences of performing and/or failing to perform such operations. Rights management processor 134 may manage these rights and/or permissions and associated consequences (FIG. 4, step "C").

Example Electronic Appliances

The present inventions may be used with all sorts of different kinds of electronic appliances 100 each of which may include a rights management component 124. FIGS. 1A–1E show various example electronic appliances 100 embodying aspects of the present invention. For example:

- FIG. 1A shows an example media player 102 capable of playing Digital Versatile Disks (DVDs) 104 on a home color television set 106. For example, media player 102 may provide analog output signals to television set 106, and may also process digitized video and/or audio analog signals stored on optical disk 104. Rights management component 124A provides digital rights protection based on steganographically encoded controls 126.

Figure 1B:
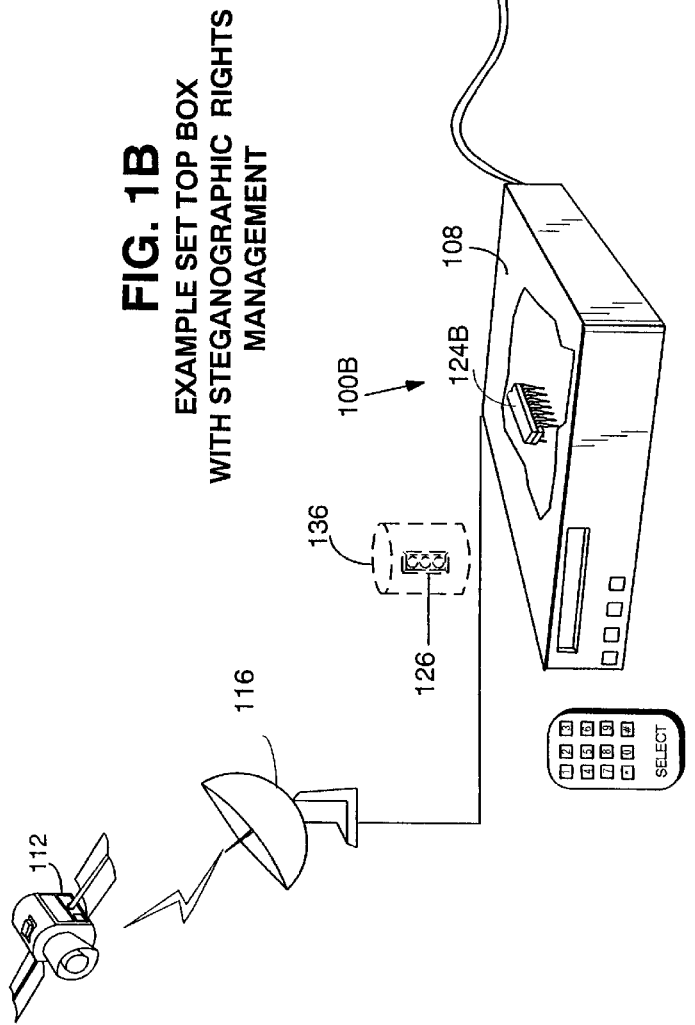

- FIG. 1B shows an example set top box 108 that can receive cable television signals (for example, via a satellite dish antenna 110 from a satellite 112) for performance on home television set 106. Set top box 108 shown in FIG. 1B may receive television signals from antenna 110 in analog scrambled or unscrambled form, and provide analog signals to television 106. Rights management component 124B provides digital rights protection based on steganographically encoded controls 126.

Figure 1C:
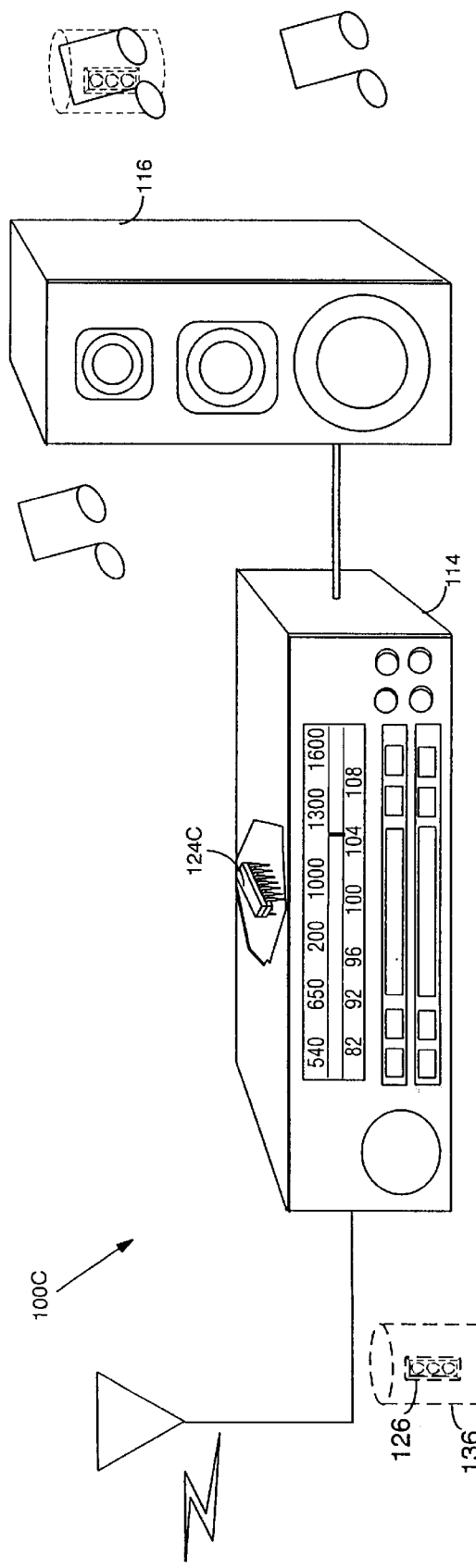

- FIG. 1C shows an example radio receiver 114 that receives radio signals and plays the radio sound or music on a loud speaker 116. The radio receiver 114 of FIG. 1C may receive analog radio signals, and provide analog audio signals to loud speaker 116. Rights management component 124C provides digital rights protection based on steganographically encoded controls 126.

Figure 1D:
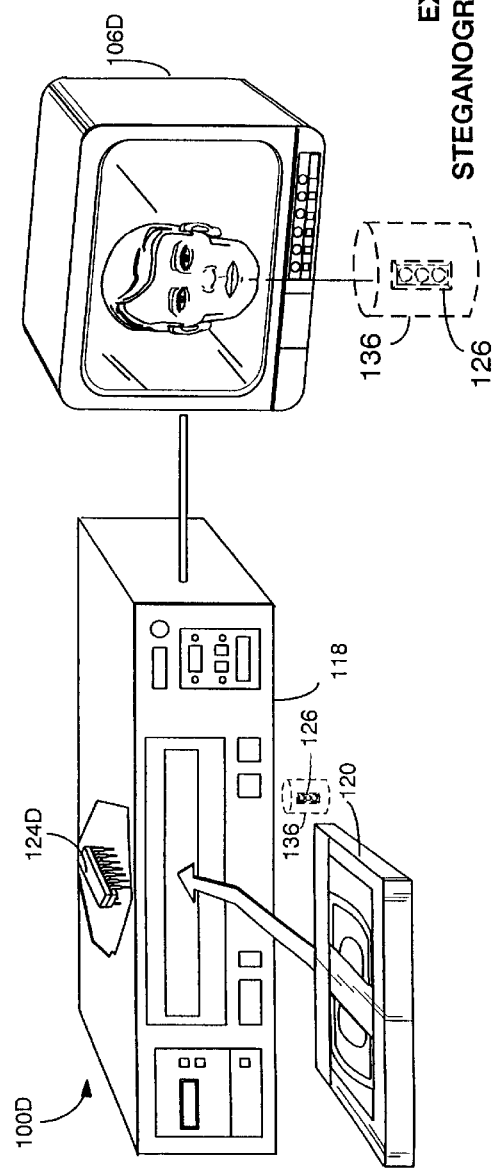

- FIG. 1D shows an example video cassette recorder 118 that can play back video and sound signals recorded on a video cassette tape 120 onto television 106. In FIG. 1D, the video tape 120 may store video and audio signals in analog form, which VCR 118 may read and provide to television 106 in analog form. Rights management component 124D provides digital rights protection based on steganographically encoded controls 126.

Figure 1E:
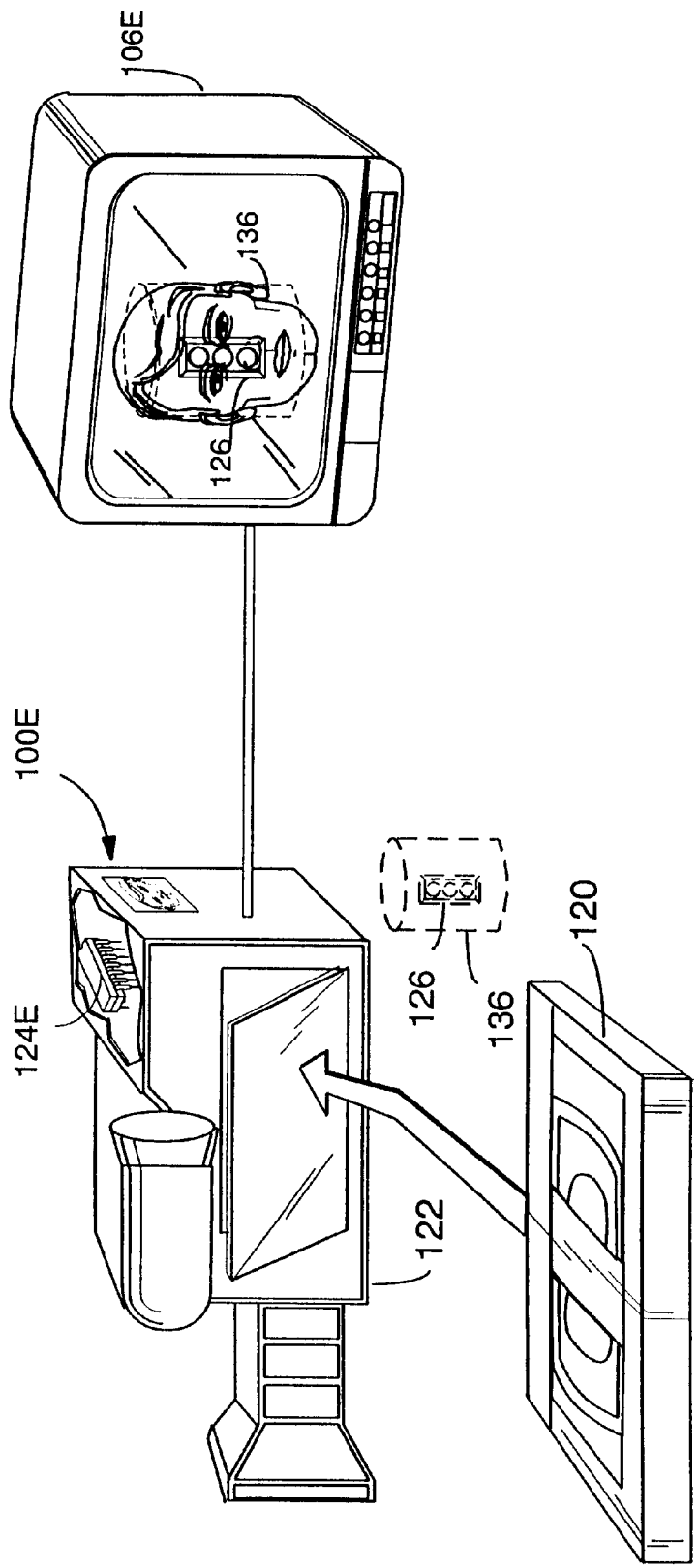

- FIG. 1E shows an example television camera that can capture video images and produce video signals for recording on a video cassette tape 120 and play back on television set 106. The FIG. 1E camcorder 122 may generate analog video and audio signals for storage onto video tape 120, and/or may provide analog signals for processing by television 106. Rights management component 124E provides digital rights protection based on steganographically encoded controls 126.

Example Rights Management Enforcement Techniques

Different rights holders want different types of rights management and control. For example, some rights holders may be completely satisfied with a relatively simple "copy/no copy/one copy" rights management control model, whereas other rights holders may desire a richer, more complex rights management scheme. The present inventions flexibly accommodate a wide variety of electronic rights management techniques—giving rightsholders extreme flexibility and programmability in defining, for example, commerce and rights management models that far exceed the simple "copy/no copy, one copy." Assuming a closed appliance, that is, one lacking at least an occasional connection to a payment method (e.g., Visa, MasterCard, American Express, electronic cash, Automated Clearinghouses (ACHs) and/or a Financial Clearinghouse that serves as the interface for at least one payment method), the following are non-limiting examples of steganographically encoded rights controls and associated consequences that can be accommodated by the present invention:

- Limiting use of a given property to a specified number of times this property can be used on a given appliance;
- Prohibiting digital to analog and analog to digital conversions;
- Ensuring that one analog or digital appliance will communicate the protected property only to another appliance that is also VDE enabled and capable of enforcing the controls associated with that property;
- Time-based rental models in which a consumer may "perform" or "play" the property an unlimited number of times in a given interval (assuming the appliance has a built-in secure time clock, can operatively connect itself to such a clock, or otherwise receive time from a reliable source);
- Enforcing an expiration date after which the property cannot be performed (also assuming access to a reliable time source);
- Associating different control sets with each of several properties on a single physical media. In one example, a "trailer" might have unlimited copying and use associated while a digital film property may have an associated control set that prevents any copying;
- Associating multiple control sets with a given property regardless of media and whether the appliance is closed or has an occasionally connected communications "backchannel."

An even more flexible and diverse array of rights controls and associated consequences are enabled by the present inventions if at least one appliance is connected to some form of communications "backchannel" between the appliance and some form of payment method. This backchannel may be a telephone call, the use of a modem, a computer data network, such as the Internet, a communications channel from a settop box to the head end or some other point on a cable TV distribution system, or a hybrid arrangement involving high bandwidth distribution of analog properties with a slower return channel, a phone line and modem—just to name a few examples. Non-limiting examples of such more rights controls and associated consequences enabled by the present invention include the following:

- Associating with a given property in analog format new, independently delivered controls obtained from a rightsholder or other authorized source;
- A broad range of usage-based pricing models, including pay-per-view or pay-per-use;
- Creating permissions enabling excerpting of properties in analog formats, maintaining persistent control over those excerpts, and charging for those excerpts;

Pay-per-use models in which a customer pays a specified price for each use of the property and/or different unit prices depending on the number of uses. In one example, the customer might pay $3.99 for the first viewing and $2.99 for each subsequent viewing; and, Controls that prevent an analog property being converted to digital format and then being transmitted or communicated except in a container with controls and/or with a pointer to a source of controls, that apply in a digital environment.

FIGS. 5A–5D show some examples of how rights management component 124 can enforce steganographically encoded digital rights management controls.

In the FIG. 5A example, rights management component 124 controls an on/off switch 140 based on steganographically encoded electronic controls 126. Component 124 turns switch 140 on (for example, to allow the analog television signal to pass to television set 106) when electronic controls 126 permit, and otherwise opens (turns off) switch 140 to prevent the analog signal from reaching the output.

In a more secure example, the incoming analog signal is scrambled, and the FIG. 5A on/off switch 140 is replaced by a FIG. 5B descrambler 142 of conventional design. The descrambler 142 descrambles the analog input signal to provide a descrambled output under control of rights management component 124. Rights management component 124 allows descrambler 142 to descramble the analog signal only under conditions specified by electronic controls 126 that the component 124 obtains from the analog input signal. Scrambling the analog signal gives the rights management component 124 a relatively secure way of enforcing electronic controls 126—since the rights management component can prevent the descrambler from operating unless conditions set by the controls are satisfied. The rights management function and the descrambling function may be integrated into a single component in which the descramble and decrypt functions of the rights management component are essentially serving the same function, but may still be distinct to account for specialized approaches to descrambling that may not be sufficiently strong or interoperable with other environments to use generally. If they are separate components, the data path between them should be protected (for example, by ensuring that both components are in a tamper resistant enclosure, or using secure authentication and key exchange to send the descrambling sequence to the descrambler).

Figure 5C:
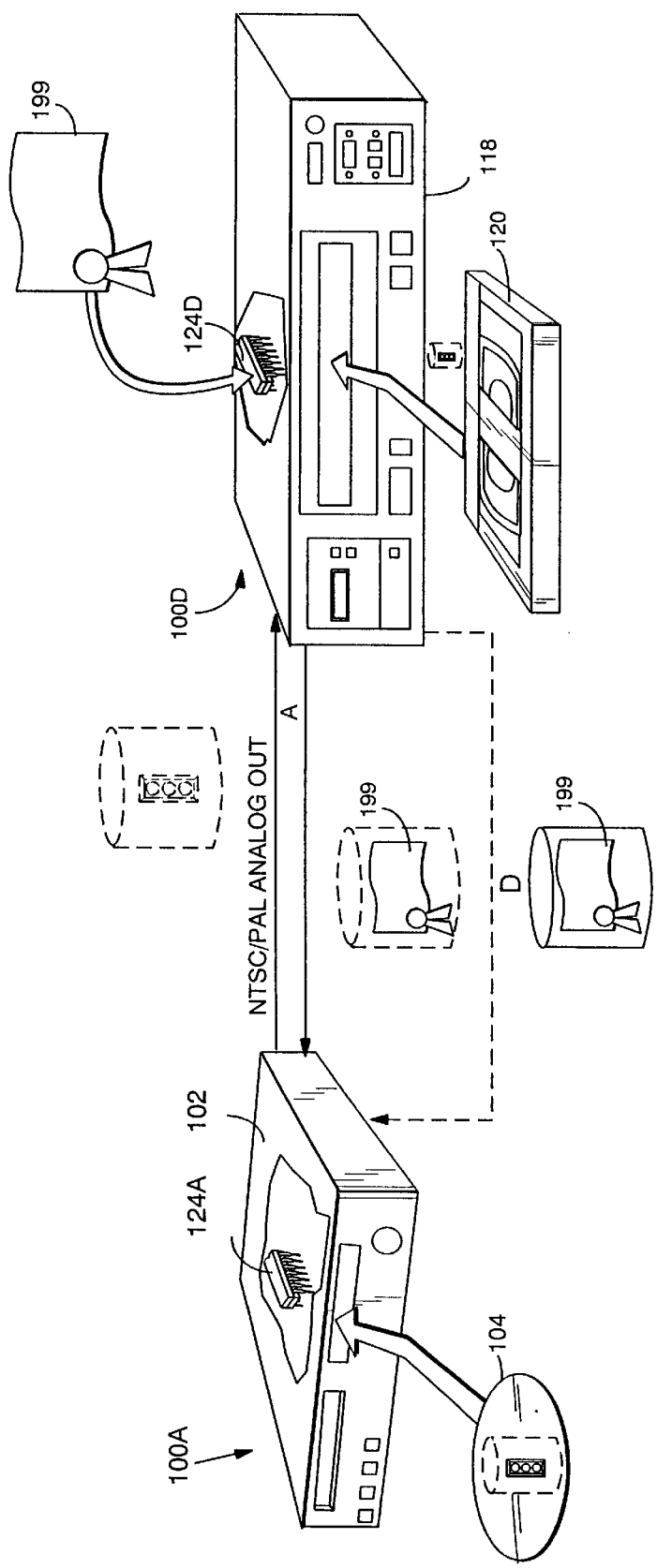

FIG. 5C shows how digital certificates may be used to enforce steganographically encoded electronic controls 126. In this example, appliance 100A outputs content to another appliance 110D only if appliance 100D has a rights management component 124D that can enforce the electronic controls 126. In this example, there may be a "handshake" between the content supplying appliance 100A and the content receiving appliance 100D sufficient to ensure the content supplying appliance that the content receiving appliance will enforce the electronic controls 126. For example, the supplying appliance 100A's rights management component 124A may require the receiving appliance 100D's rights management component 124D to present a digital certificate 199 attesting to the fact that the receiving appliance 100D has a rights management component 124 fully capable of securely enforcing electronic controls 126. Receiving appliance 110D could present this digital certificate 199 by steganographically encoding it within an analog signal it provides to the supplying appliance over an analog signal channel for example (the analog signal channel could be the same one the supplying appliance will use to deliver the steganographically encoded content). If a digital channel is available, the handshake can be over a digital link between the two appliances using, for example, secure authentication techniques disclosed in Ginter et al. and/or for example in Schneier, *Applied Cryptography* (2d Ed. Wiley 1996) at page 52 et seq.

Figure 5D:
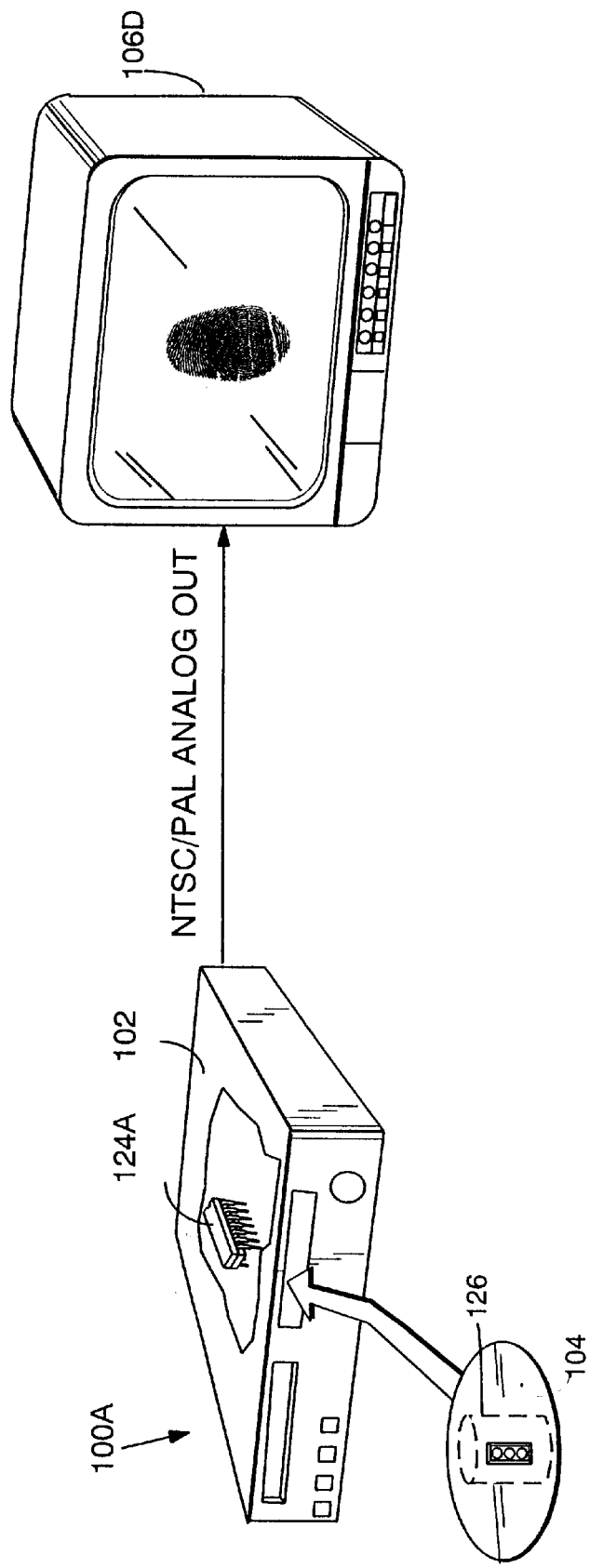

FIG. 5D shows that rights management component 124A can enforce electronic controls 126 by marking the content through "fingerprinting" and/or "watermarking" prior to releasing the content to a device that doesn't have a rights management component 124. See Ginter et al. patent specification, FIGS. 58A–58C. Such fingerprinting could involve using steganographic techniques to fingerprint the content. For example, a movie delivered using "conventional" containers as disclosed in Ginter et al. could use steganographically encoded containers "on the way" to the display device. Furthermore, it could include the identity of the user, etc. as well as the control information appropriate for the device. Another case could be text sent to a printer, using different steganographic encoding techniques such as line and/or character shifting.

End to End Protection

Figure 5E:
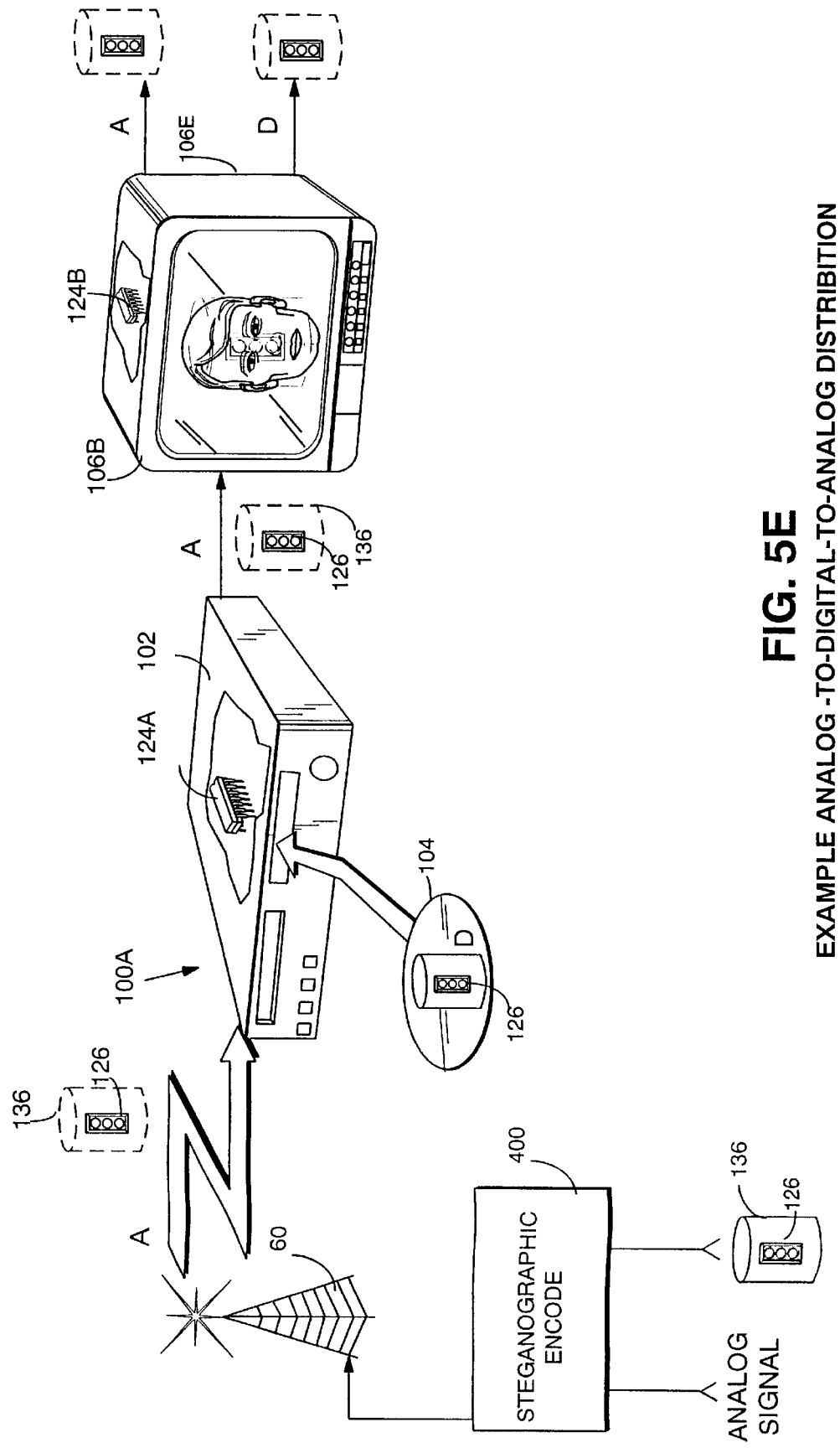
FIGS. 5E–5F show example "end to end" protected distribution systems provided in accordance with the invention.
Figure 5F:
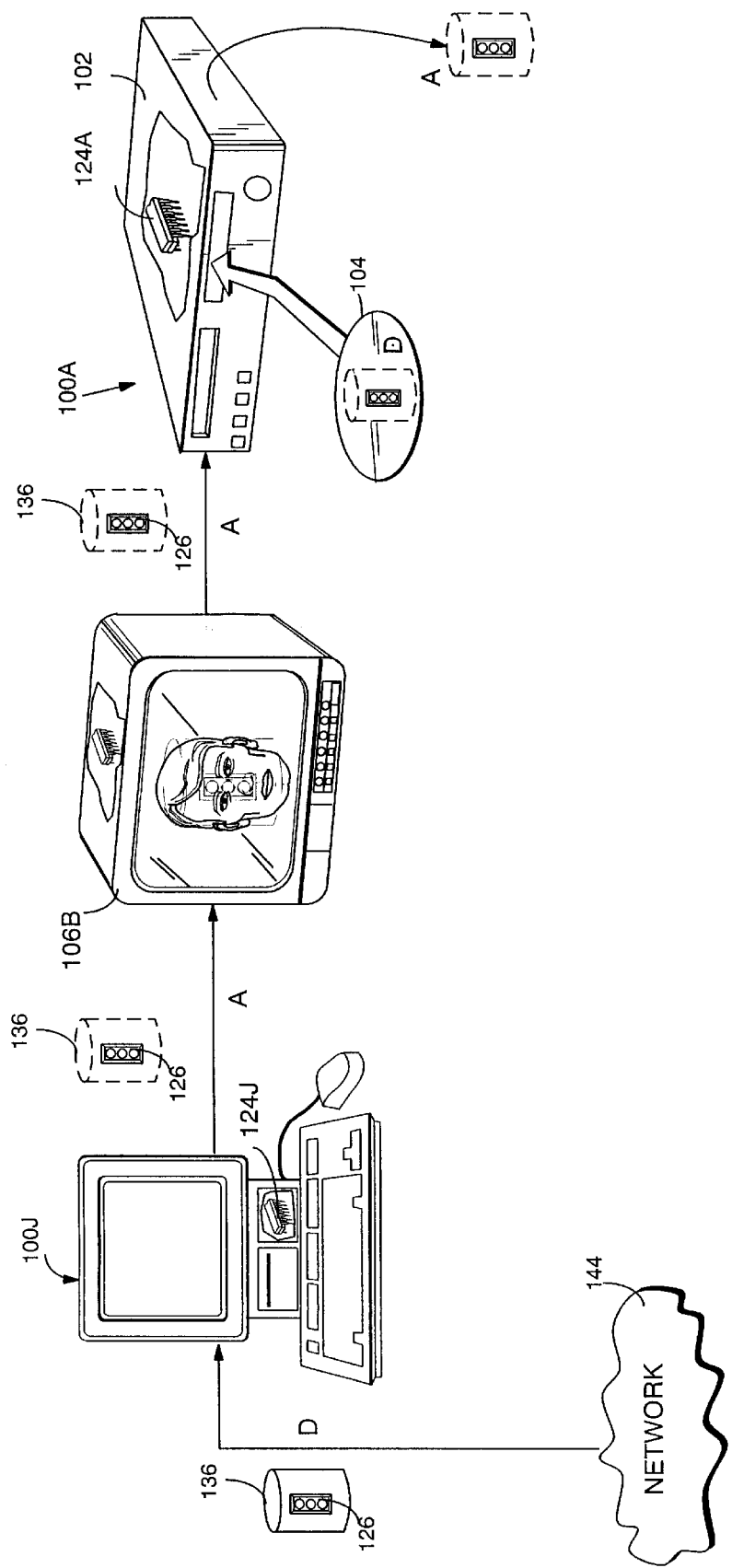

FIGS. 5E–5F illustrate how the persistent association with content provided by steganographically encoded electronic rights management control information 126 provides "end to end" protection within an arbitrary information signal distribution system—irrespective of the processes the information signal is subjected to as it travels to its final destination.

FIG. 5E shows an example of how the present inventions can be used to maintain end-to-end rights management protection over content initially distributed in an analog signal format. FIG. 5F shows an example of how the present invention can be used to maintain end-to-end rights management protection over content initially distributed in digital form.

In the FIG. 5E example, an analog signal transmission site (e.g., a radio or television broadcaster) transmits an analog signal A steganographically encoded with an organizational structure 136 including electronic controls 126. This analog signal A may be received by an electronic appliance 100A having a rights management component 124A as described above. Appliance 100A may, for example, convert the signal into digital and/or digitized format, and store the digitized version of the signal onto a digital storage medium 104. Electronic appliance 100A may play back the recorded digitized signal, convert the signal back to analog form, and deliver the analog signal A to a further electronic appliance 106B. In this example, electronic appliance 106B also has a rights management component 124B.

The steganographic techniques provided by the present invention ensure that the electronic controls 126 persist in the signal A delivered from appliance 100A to appliance 106B—and from appliance 106B to still other appliances. Because of the substantial indelibility characteristics of the steganographically encoded control information 126, this information persists in the signal as stored on recording medium 104, in copies of the recorded signal produced by replaying the medium, and in further downstream versions of the signal.

This persistence will, for example, survive conversion from analog to digital format (e.g., sampling or "digitizing"), storage, and subsequent conversion from digital to analog format. For example, because the steganographically encoded control information 126 is substantially indelibly, substantially inextricably intertwined and integrated with the information signal A, the digitized version of the information signal that appliance 100A records on medium 104 will also contain the steganographically encoded control information 126. Similarly, when appliance 100A plays back the recording from medium 104, it will reproduce information signal A along with the steganographically encoded control information 126. The steganographically encoded control information 126 thus persists irrespective of digitization (or other processing) of signal A. In some cases, lossy compression techniques used on the data may remove high frequency noise—thereby potentially damaging the steganographic channel. When these lossy compression techniques are used or may be encountered, the steganographic encoding function should be matched to the compression algorithm(s) using conventional signal analysis techniques to avoid this consequence.

Similarly, appliance 106B may output further copies or versions of signal A in analog form and/or digital form. Because of its inherently persistent characteristics, the steganographically encoded control information 126 will be present in all subsequent versions of the signal outputted by appliance 106B—be they in analog format, digital format, or any other useful format.

Degrading a digital signal carrying control information is fatal—the rights management system typically may no longer function properly if even a single bit is altered. To avoid this, the preferred embodiment provides redundancy (repeating pointers and the organizational structures and/or any control information incorporated into the organizational structures), and also uses conventional error correction coding such as, for example, Reed-Solomon (or similar) error correcting codes. Additionally, because the steganographically encoded control information 126 is substantially inextricably intertwined with the desired content carried by information signal A, any process that degrades the steganographically encoded control information 126 will also tend to degrade the information signal's desired content. Although the steganographically encoded information may degrade (along with the content) in multi-generation "copies" of the signal, degraded copies may not be commercially significant since the information content of the signal will be similarly degraded due to the substantially inextricable intertwining between the steganographically encoded control information 126 and the content carried by signal A. The refresh circuit shown in FIG. 14 with appropriate error correcting capabilities is one way to prevent the steganographically encoded information from being degraded even if the rest of the information the signal carries becomes degraded.

The FIG. 5F example shows content being initially distributed in digital form over a network to an electronic appliance 100J such as a personal computer. Personal computer 100J may convert the digitally delivered content to an analog signal A for distribution to other appliances 106B, 100A. Personal computer appliance 100J may include a rights management component 124J that ensures, based on controls 126, that appliance 100J does not release a version of the content associated with controls 126 that is not protected by the controls. In this example, rights management component 124J is capable of steganographically encoding the analog signal A with the control information 126 (e.g., it may perform the processes shown in FIG. 7A below). Rights management component 124J enforces controls 126, at least in part, by ensuring that any analog version of the content associated with controls 126 is steganographically encoded with those controls. Further "downstream" appliances 106B, 100A may each include their own rights management component 124 for use in interacting with steganographically encoded controls 126.

Example Control Information

FIG. 6 shows that a particular information signal 70 may be encoded with many different containers 136 and associated rights management control sets 126. For example, different portions of an information signal 70 may be associated with different control information 126. In this example of a movie 270:

a first "trailer" 272 may be associated with control information 126(1), a second trailer 274 may be associated with control information 126(2), a title section 276 may be associated with control information 126(3), the first five minutes of the movie may be associated with control information 126(4), and the rest of the movie may be associated with control information 126(5).

Control information portions 126(1), 126(2), 126(3), 126(4) and 126(5) may all be different. For example, control information 126(1) may permit the user to copy trailer 272, whereas control information 126(4) may prohibit the user from copying the first five minutes 278 of the film.

As shown in FIG. 6, multiple, identical copies of control information 126(5) may be steganographically encoded onto the information signal 70. For example, control information 126(5) could be encoded once per minute onto the rest of movie 280. This redundancy allows a media player 102 or other electronic appliance 100 to rapidly obtain a copy of the control information 126(5) no matter where the user begins watching or playing the movie 270, and also helps ensure that transmission errors will not prevent the rights management component 124 from recovering at least one "good" copy of the organizational structure.

Example Steganographic Encoding and Decoding Processes

FIGS. 7A and 7B show example overall steganographic encoding and decoding processes, respectively. The FIG. 7A process may be used to steganographically encode digital control information onto an analog signal, and FIG. 7B performs the inverse operation of steganographically decoding the control information from the analog signal. Generally, the FIG. 7A process may be performed at a supply point, and the FIG. 7B process may be performed at a usage point. An electronic appliance 100 can be both a supply point and a usage point, and so it may perform both the FIG. 7A process and the FIG. 7B process.

Referring to FIG. 7A, the analog information signal 70 inputted to the steganographic encoding process may be any sort of information signal such as, for example, the analog signal shown in Graph A1. A conventional analog-to-digital conversion block 402 may be used, if necessary, to convert this analog input signal to a digitized signal (see Graph A2). A spectral transform block 404 may then be used to transform the digitized information from the time domain to the frequency domain. Spectral transform block 404 may be any conventional transformation such as, for example, a Fast Fourier Transform (FFT) or a Walsh Transform. An example of the resulting spectral information is shown in the A3 graph.

A steganographic encode block 406 may be used to steganographically encode digital control information 126, in clear text form and/or after encryption by a conventional digital encryption block 414 based on an encryption key Keys Steganographic information can be combined with a pseudo-random data stream (e.g. exclusive-or'd into the output of a DES engine)—in effect shuffling around the noise in the signal rather than replacing noise with the signal, per se. When protection is desired, the values in the pseudo-random stream can be protected by encryption (e.g. the key that initializes the DES engine should be protected). When the steganographic channel is "public" (e.g., unencrypted), the stream should be readily reproducible (e.g. by using one of a preset collection of values shared by every device). A small portion (a "public header"—see Ginter et al.) is always detectable using a shared preset value (that does not need to be protected, distinguishing it from the private header keys), may be provided to ensure that the rights management technology can be activated properly. Since the rights management component 124 at the receiving side needs to know how to descramble the signal, there normally will be an indication in the "public header" that names a key that will be used to unlock the private header (and so on, as described, for example, in Ginter et al.). Some publicly available, agreed upon preset values may be used to extract the "public header" information from the steganographically encoded channel.

Steganographic encode block 406 may be any conventional steganographic encoding arrangement capable of steganographically encoding a digital signal onto information signal 70. Steganographic encode step 406 may be based on a key $K_c$—allowing the same basic steganographic encoding and decoding transformations to be used by a wide variety of different appliances while still maintaining individuality and secrecy through the use of different steganographic keys.

In one example, the steganographic encoding step 406 may introduce the (encrypted) digital control information into the high frequency spectrum portion of the spectrally transformed information signal 70. The spectrally transformed signal with steganographic encoding is shown in the FIG. 7A Graph A4, and is shown in more detail in FIG. 8. As FIG. 8 shows, the steganographic encoding may affect the higher order frequency components of the spectrally transformed signal (see dotted perturbations in the fourth, fifth, sixth, seventh and eighth order components in FIG. 8). The steganographic encoding may add to and/or subtract from the amplitudes of these higher order components. The effect of introducing high frequency steganographically encoded signal components may be to mask the steganographic encoding within the random high frequency noise inherently provided within information signal 70—thereby providing substantial invisibility and substantial indelibility.

The amount of amplitude modification performed by steganographic encode step 406 may be limited in this example to ensure that the resulting steganographically encoded signal does not exceed the available channel bandwidth. See, for example,

- J. Millen, "Covert Channel Capacity," *IEEE Symposium on Security and Privacy* (1987).
- R. Browne, "An Entropy Conservation Law for Testing the Completeness of Covert Channel Analysis," *Fairfax* 94, pp 270–281 (1994).
- Moskovitz et al., "The Channel Capacity of a Certain Noisy Timing Channel,", *IEEE Trans. on Information Theory* v IT-38 no. 4, pp. 1330–43, (1992).
- Venkatraman, et al., "Capacity Estimation and Auditability of Network Covert Channels,", *Oakland* 95, pp. 186–298.

The following equations show the relationship between total bandwidth, bandwidth available for steganographic encoding, and the data rate of the steganographically encoded signal:

$$S = \int_{ta}^{tb} B(t)dt \quad (1)$$

$$\cong \sum_{i=a}^{b} B(i)\Delta t \quad (1A)$$

where $\Delta t = t_{n+1} - t_n$ and
B is a function of time in bits/second.

In the above expressions, the function S corresponds to an area under a curve resulting from the product of B (bandwidth) and t (time). The parameter delta t refers to the "granularity" of the analog-to-digital conversion (i.e., 1/sampling rate).

FIG. 9 shows an example plot of information signal bandwidth versus time. The total bandwidth available is limited by the bandwidth of the transmission channel—including the bandwidth of the storage medium (if any) used to deliver the signal, and the bandwidth of the reproduction equipment. Since the total bandwidth depends on the inherent characteristics of the transmission channel used to communicate information signal 70, it is typically a fixed constant. FIG. 9 shows that the bandwidth actually used by the information signal 70 typically varies with time. For example, although somewhat counterintuitive, the more complex an image, the more noise is typically available for "shuffling around" to create a steganographic channel. Of course, this isn't always true—a highly intricate geometric pattern may have very little noise available for encoding, and a simple picture of a cloud may have a great deal of noise available.

Steganographic encode block 406 can use an encoding rate and characteristic that ensures the steganographically encoded signal bandwidth doesn't exceed the total bandwidth available in the communication channel. Typically, the amount of bandwidth available for steganographic encoding may be on the order of on the average of 0.1% of the total transmission channel bandwidth—but as mentioned above, this bandwidth available for steganographic encoding may be unequally distributed with respect to time within the information signal stream 70 and may depend on the content of the information signal.

In this example, steganographic encode block 406 analyzes the content (e.g., by performing statistical weighted averaging), and provides a responsive variable steganographic encoding rate. For example, steganographic encoding block 406 can use a high data rate during example time periods "II" and "IV" in which the information signal 70 has characteristics that allow high steganographic rate encoding without the resulting signal exceeding the available overall channel bandwidth. Encoding block 406 can use a low data rate during time periods "I" and "III" in which the information signal 70 has characteristics that do not allow high data rate steganographic encoding without exceeding available overall channel bandwidth. Steganographic encoding block 406 may use any number of different variable rates to accommodate different relationships between information signal 70 characteristics and available channel bandwidth.

Referring again to FIG. 7A, the steganographically encoded spectral information outputted by steganographic encode block 406 may be subjected to an inverse spectral transform 408. Inverse spectral transform 408 in this example may perform the inverse of the transform performed by step 404—outputting a version of the digitized time domain signal shown in Graph A2 but now bearing the steganographically encoded information (Graph A5). The digital control information steganographically encoded by block 406 may be substantially indelible and substantially invisible with respect to the Graph A5 signal—that is, it may be very difficult to eliminate the steganographically encoded information and it may also be very difficult to discern it.

This signal may be further scrambled and/or encrypted (e.g., based on a scrambling and/or encryption key Key$_d$) before being converted to analog form (shown in Graph A6) by a conventional digital-to-analog conversion block 412 (if necessary). Signal scrambling may be independent of steganographically encoded control information. For example, a good way to support existing devices is to not scramble the signal, and to use legislative means to ensure that each new device manufactured is equipped with rights management technology. Scrambling/encrypting of content, can be used to enforce use of rights management. If legislative means can enforce the use of rights management technology, encryption or scrambling of content may not be necessary (although a decision to provide cryptographic protection for the control information is independent of this factor and must be evaluated in light of protecting the rights management system). Rights holders can choose an enticement technique(s) based on their business model(s). The benefit of scrambling is that it provides technical means for enforcing rights management. The benefit of unscrambled content is support of hundreds of millions of devices in the installed base—with the promise that new devices (potentially including computers) will enforce the control information even though they don't "have to" from a technical perspective.

The resulting steganographically encoded information signal 70 may then be transmitted over an insecure communications channel. Digital-to-analog conversion step 412 may be omitted if a digital communications channel (e.g., an optical disk, a digital satellite link, etc.) is available to deliver the signal.

FIG. 7B shows an example inverse process for recovering digital control information 126 from the steganographically encoded information signal 70. In this recovery example, the steganographically encoded analog signal is converted to a digitized signal (if necessary) by an analog-to-digital conversion step 402' and decrypted/descrambled (if necessary) by a decryption/descrambling block 422' to yield a facsimile of the inverse spectral transform block 408 output shown in FIG. 7A. In this FIG. 7B example, the analog-to-digital conversion block 402' is the inverse operation of FIG. 7A, block 412, and the decrypt/descramble block 422' is the inverse of the FIG. 7A scramble/encrypt block 410.

The resulting digitized signal provided by FIG. 7B block 422' is spectrally transformed by step 404' (this may be the same spectral transform used in FIG. 7A, block 404) to yield a steganographically encoded spectral signal A3. Steganographic decode block 424 may perform the inverse operation of the FIG. 7A steganographic encode block 406 based on the same steganographic key Key$_c$ (if a key-based steganographic encoding/decoding transformation is used). The output of steganographic decode block 424 may be decrypted by block 426 (the inverse of FIG. 7A encrypt block 414 based on key Key$_s$) to provide recovered digital control information 126. The resulting control information 126 may be used for performing electronic rights management functions Required keys may be delivered in containers and/or using the key distribution techniques and device initialization approaches disclosed in Ginter et al., for example.

Example Control Information Arrangements

Figure 10A:
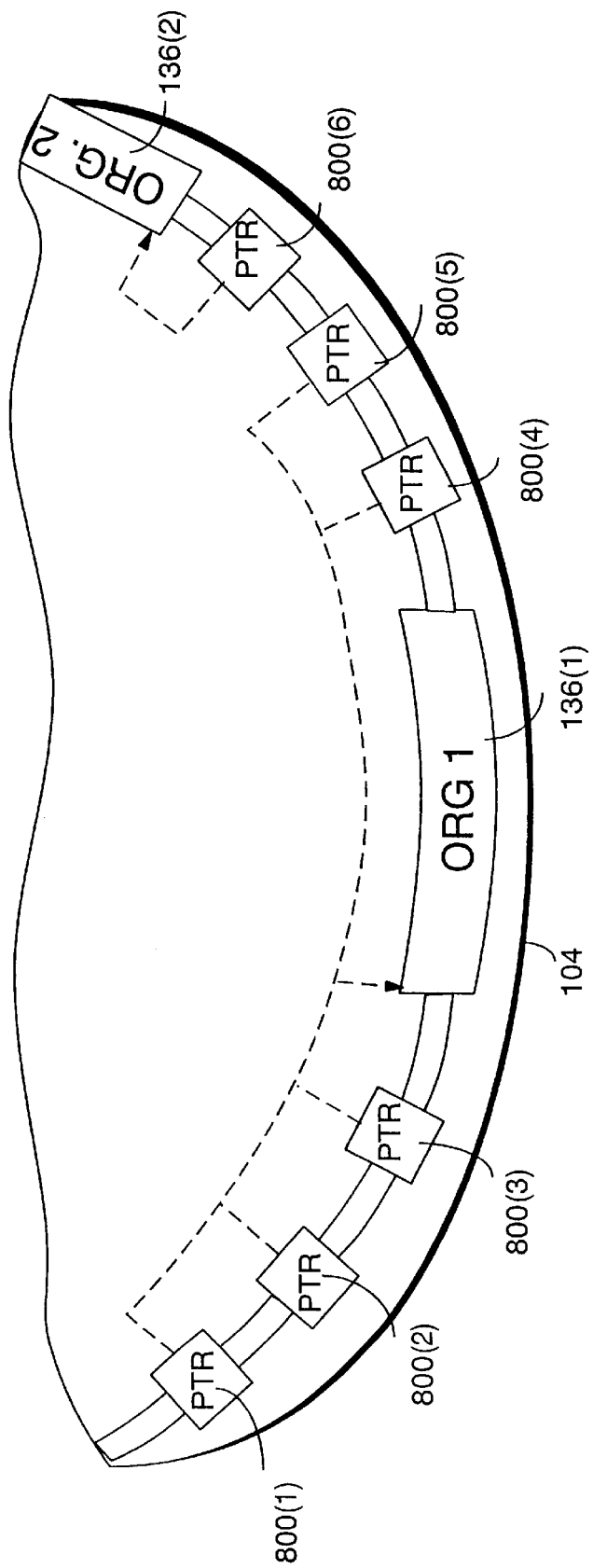

In a further example shown in FIGS. 10 and 10A, steganographic encode block 406 may encode control information organizational structures such as secure containers (see Ginter et al., FIGS. 17–26B and associated text) during times when the content bandwidth is low relative to the total available bandwidth (see FIG. 10 regions II and IV), and may not attempt to encode such organizational structures during times when the content bandwidth is high relative to the total available bandwidth (see FIG. 10, regions I, III). In this way, steganographic encode block 406 may maximize the total bandwidth use without causing the steganographically encoded signal to exceed available bandwidth. As an optimization for certain applications, steganographic encode block 406 may encode "pointers" or other directional information into the information signal 70 during times when the content is such that it doesn't allow high data rate steganographic encoding of organizational structures 136. Multiple pointers and multiple "pointed to" locations can also help provide redundancy.

This particular FIG. 10 example involving steganographic encoding of pointers 800 may be especially suited for content delivery or presentation on random access storage media such as optical disks. Using such random access media, a content handling device may be able to rapidly "seek" to the place where an organizational structure is stored at a higher recorded bandwidth and then read the organizational structure at this higher bandwidth (See FIG. 10A). For these example arrangements, steganographic encode block 406 in this example encodes, during periods when the content is such that it is not possible to steganographically encode organizational structures, pointers 800 that direct the content handling device to one or more places where the organizational structure appears in the content stream. In one example, pointers 800 might encode the location(s) on a storage medium (e.g., an optical disk 104—see FIG. 10A) at which the closest organizational structure is stored.

An optical disk player 102 with random access capability may "seek" to the place at which the closest organizational structure 136 is stored on the disk 104, and rapidly read the organizational structure off of the disk in less time than might be required to read an organizational structure that steganographic encode block 406 encodes at a lower data rate during times when the content bandwidth occupies most of the available channel bandwidth. In such arrangements, the process of reading a pointer 800, "seeking" to a position on the medium specified by the pointer, and then reading an organization structure 136 steganographically encoded at a high data rate may provide overall faster access times than if the organizational structure was itself encoded at a lower data rate within the parts of the information signal stream used in this example to encode only pointers.

FIG. 11 shows an example organizational structure 136 suitable for steganographic encoding similar to that shown in FIG. 17 of the co-pending Ginter et al. application. In the case of container 136 with controls for an analog property, the organizational structure may include one or more permissions records 136d providing control sets 136e providing electronic controls especially for an analog device(s). The permissions record 136d may also provide a reference 136f at least one location or other external source for additional controls. This reference may be to an Internet "Uniform Resource Locator" (URL), for example. The organizational structure 136 may optionally include a content block 136g providing digital content subject to the controls. In this example, organizational structure 136 is encased in a protective "wrapper" 136x provided by the steganographic technique used to encode the organizational structure 136, digital encryption techniques, and/or a combination of the steganography and encryption. This protective wrapper 136x is used to ensure that the organizational structure 136 cannot be tampered with and maintains its integrity. Wrapper 136x may also provide a degree of confidentiality if required.

Detailed Example Electronic Appliance Architecture

FIG. 12 shows an example detailed internal architecture for an example electronic appliance 100 such as optical disk player 102. In this specific example, rights management component 124 may be a tamper-resistant integrated circuit including internal microprocessor 200, flash memory 202 and cryptographic engine 204 (see Ginter et al. FIGS. 9–15B and associated text for a more detailed internal view of an example tamper-resistant rights management component 124 and a "protected processing environment" 138 it provides).

A main system bus 206 may couple rights management component 124 to a main system microprocessor 208 and various system components such as, for example, a CD-ROM decoder 210, a control and audio block 212, a video decoder 214, a digital output protection block 216, and a communications system 218. In this example, main microprocessor 208 controls the overall operations of appliance 100, with rights management component 124 performing security-related functions such as rights management and steganographic decoding.

In the FIG. 12 example appliance 102, an optical pickup 220 reads information from optical disk 104 and provides it to RF amplifier 222. RF amplifier 222 provides its output to digital signal processor (DSP) 224, which processes the output in a conventional manner and also controls the orientation of the optical disk 104 relative to optical pickup 220 via a driver 226. DSP 224 coordinates with a conventional CD-ROM decoder 210 to provide decoded digitized video and audio information. Decoder 210 operates in conjunction with a buffer memory 228, and may also cooperate with cryptographic engine 204 to ensure that any encrypted video information is decrypted appropriately.

The video output of CD-ROM decoder 210 may be decompressed by MPEG-2 video decoder 214 and applied via an NTSC and/or PAL encoder 230 to television 106. (In another example, the output could be in a non-interlaced format such as RGB rather than in interlaced formats such as NTSC and PAL.) Meanwhile, control and audio block 212 (which may operate in conjunction with its own buffer memory 232) may receive digitized audio information recorded on optical disk 204 via DSP 224 and CD-ROM decoder 210. Control and audio block 212 may provide this audio output to audio processing block 234 for output to loudspeakers 116. Control and audio block 212 may also provide an interface to the user via an infrared sensor 236 (for a remote control, for example), front-panel user controls 238 and/or an LED display 240.

In this example, security microprocessor 200 within rights management component 124 receives the digitized video and/or audio that DSP 224 reads from optical disk 104 via pickup 220 and RF amp 222. Security microprocessor 200 steganographically decodes this digitized analog information signal to recover the digital control information 126 encoded onto the information signal. Security microprocessor 200 also performs rights management functions based on the digital control information 126 it recovers. In addition, if desired security microprocessor may remove the steganographic encoding from a received digitized analog signal (since it shares a secret such as the steganographic encoding key $Key_c$ with the steganographic encoding point, it can remove the steganographic encoding) and/or steganographically encode a signal with received, augmented and/or new rights management control information.

In this example, microprocessor 200 may selectively control cryptography engine 204 to decrypt encrypted content provided by optical disk 104—thus enforcing the rights management activities provided in accordance with electronic controls 126. Security component 124 may also control digital output protection block 216 in accordance with rights management control information 126—thus, selectively permitting digital appliance 100 to output content in digital form. Rights management component 124 may take other steps (e.g., watermarking and/or fingerprinting information before releasing it) to provide a degree of copy protection and/or quality degradation to prevent or discourage someone from creating an unlimited number of high quality copies of the content of optical disk 104. Rules contained in the control information can also govern how other parts of the system behave. For example, the control information could specify that no sound can be played unless the content is paid for. Another property may specify that certain copy protection schemes should be turned on in the NTSC encoder. Still another might disable the digital outputs of the device altogether, or unless an additional fee is paid.

Rights management component 124 (protected processing environment 138) may, in this particular example, communicate over a network 144 (such as, for example, the Internet or other data communications path) with other rights management related entities, such as, for example, clearinghouses and repositories. This "back channel" allows rights management component 124 to, for example, report usage and payment information and/or to retrieve additional rights management control information 126 to augment or supplement the control information it steganographically decodes.

Example Control Steps

FIG. 13 shows example control steps that may be performed by protected processing environment 138 (e.g., security microprocessor 200) to provide electronic digital rights protection. The FIG. 13 read/play routine 300 begins with protected processing environment 138 applying rules 126—in effect, setting the initial state in which rights management can occur (FIG. 13, block 302). Protected processing environment 138 then reads the output of CD-ROM decoder 310 (FIG. 13, block 304) and obtains steganographically encoded data from the output stream (FIG. 13, block 306). If protected processing environment 138 encounters the beginning of the control information organizational structure ("yes" exit to decision block 308), the protected processing environment performs an initialization step (FIG. 13, block 310) to begin receiving new control information 126 and then returns to block 302 to again apply current control information (FIG. 13, block 302). If, on the other hand, protected processing environment 138 encounters a continuation of an organizational structure ("yes" exit to decision block 312, FIG. 13), the protected processing environment stores the organizational structure information it has received (FIG. 13, block 314) and turns again to the apply rules step (FIG. 13, block 302).

If protected processing environment 138 encounters a pointer ("yes" exit to decision block 318), then the protected processing environment determines whether it already has received the corresponding organizational structure pointed to by the received pointer (FIG. 13, decision block 320). The protected processing environment 138 retrieves the organizational structure if it does not already have it (FIG. 13, block 322)—for example, by controlling DSP 224 to seek to the corresponding location on optical disk 104 indicated by the pointer, and by reading the organizational structure from the disk beginning at that disk location (FIG. 13, block 322).

If protected processing environment 138 has received no organizational structures or pointers ("no" exits to each of decision blocks 308, 312, 318), then the protected processing environment may determine whether there is any bandwidth available to carry control information. For example, some types of content stored on optical disk 104 may take up substantially all available channel bandwidths so that no bandwidth remains for steganographic encoding. If there is no available bandwidth for steganographic encoding ("no" exit to decision block 324), then the protected processing environment 138 may return to the "apply rules" block 302 and repeat steps 304–324 to wait until bandwidth is available for steganographic encoding. On the other hand, if there is bandwidth available and still no steganographically encoded information has appeared ("yes" exit to decision block 324, FIG. 13), protected processing environment 138 performs an error handling routine that processes the exception (FIG. 13, block 326) and determines whether the exception is critical (decision block 328). In some cases, protected processing environment 138 will continue to allow the appliance 100 to process the content, finding the error to be non-critical ("no" exit to decision block 328). An example of this would be a timer that permits playing for a period of time. In other cases (e.g., if the error conditions indicate that optical disk 104 has been tampered with), protected processing environment 138 may halt processing and return an error condition ("yes" exit to decision block 328, bubble 329).

FIG. 13A shows example steps that may be performed by the FIG. 13 "apply rules" routine 302. In this example, protected processing environment 138 may determine if it has received a complete organizational structure on which to base rights management for the rights being read from optical disk 104 (FIG. 13A, decision block 330). If the protected processing environment 138 has not received a complete organizational structure ("no" exit to decision block 330), it may disable content processing until it receives a complete organizational structure (FIG. 13A, block 332). If protected processing environment 138 has a complete organizational structure ("yes" exit to decision block 330), it determines whether it has the current organizational structure (decision block 334). If the current organizational structure is present ("yes" exit to decision block 334), the protected processing environment 138 then processes the current operation with respect to the control information embodied in the organizational structure (FIG. 13A, block 336). If the protected processing environment 138 does not have the current organizational structure ("no" exit to decision block 334), it determines whether it has an organizational structure that has the same identification as the current organizational structure (FIG. 13A, decision block 338). The protected processing environment 138 may use that matching organizational structure as a default ("yes" exit to decision block 338, block 340). Otherwise, protected processing environment 138 disables content operations until it receives a current organizational structure ("no" exit to decision block 338, block 342).

As mentioned above, protected processing environment 138 may also perform any or all of the FIG. 7A steganographic encoding steps, and may also or alternatively remove the steganographic encoding from a signal by using a shared secret to generate a steganographic encoding stream and then subtracting that stream from the signal. Such techniques may be useful, for example, to allow protected processing environment 138 to encode new control information or to change the encoded control information. For example, the steganographically encoded control information might provide a chain of handling and control that authorizes certain protected processing environments to change some elements and add new elements to the control information 126. Protected processing environment 138 could:

- steganographically decode the signal using shared secrets to obtain the control information;
- modify the control information to the extent authorized by the control information;
- remove the steganographic encoding from the signal based on the shared secret; and
- steganographically encode the signal with the modified control information.

Example Refresh Capability

FIG. 14 shows another example electronic appliance arrangement including a "refresh" capability involving both steganographic decoding and steganographic encoding. In this example, electronic appliance 100 includes a steganographic decoding block 424 as described above plus an additional steganographic encoding block 406. The appliance 100 may obtain the digital control information from the content signal, and then may "refresh" the extracted information (e.g., using coding techniques, such as, for example, Reed-Solomon decoding based on Reed-Solomon codes applied to the signal by the steganographic encoding process) to correct errors and otherwise accurately recover the digital control information. The error-corrected digital control information outputted by refresh decoder 900 may be applied to a steganographic encoding circuit 406 which steganographically encodes the content signal with the refreshed control information.

The FIG. 14 refresh operation could, for example, be performed on a selective basis based on the encoded digital control information itself. For example, the control information might authorize appliance 100 to redistribute the content signal only under certain conditions—one of which is to ensure that a refreshed steganographic encoding of the same (or modified) digital control information is provided within the redistributed content signal.

EXAMPLES

Figure 15A:
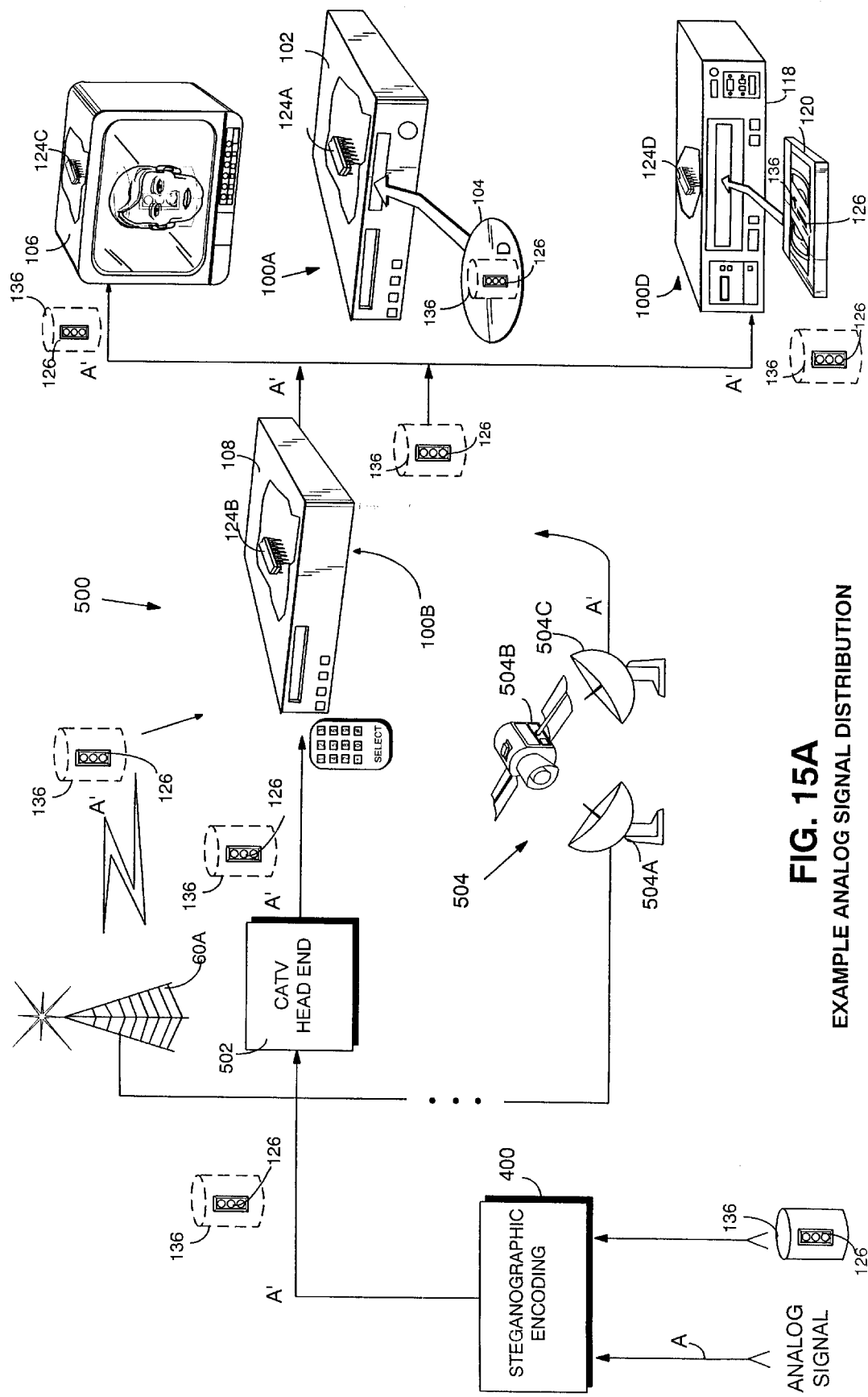

FIG. 15A shows an example analog signal distribution arrangement 500 provided in accordance with this invention. Within arrangement 500, a steganographic encode block 400 encodes an analog information signal A with rights management control information 126 and associated organizational structure(s) 136. The steganographically encoded information signal A' is distributed by various mechanisms to user electronic appliances 100. For example, the encoded signal A' may be broadcast wirelessly over the air by a broadcaster 60A, distributed over a cable television network by a cable television head end 502, and/or distributed via a satellite communications network 504. Encoded signal A' may, during the process of being distributed, be converted from analog to digital form and back again. For example, the satellite uplink 504A may digitize signal A' before transmitting it to the satellite 504b, and the satellite downlink 504c may convert the signal back to analog before providing it to user appliances 100. As explained above, the steganographically encoded control information 126 persists within the signal A' despite conversions between analog and digital formats.

In this example, an example set top box user appliance 108 may receive the distributed steganographically encoded analog signal A'. Set top box 108 may include a rights management component 124 as described above, and may perform rights management operations and/or processes in response to and based on steganographically encoded control information 126.

Set top box 108 in this example may output the steganographically encoded analog signal (or a facsimile of it) to additional user electronic appliances such as, for example, a television set 106, a digital optical recording device (e.g., DVD-R) 102, and/or a video tape recorder 118. Each of these additional appliances 106, 102, 118 may include a rights management component 124 that performs electronic rights management based on the steganographically encoded control information 126. Any recordings made by recording devices 102, 118 may also be steganographically encoded.

Figure 15B:
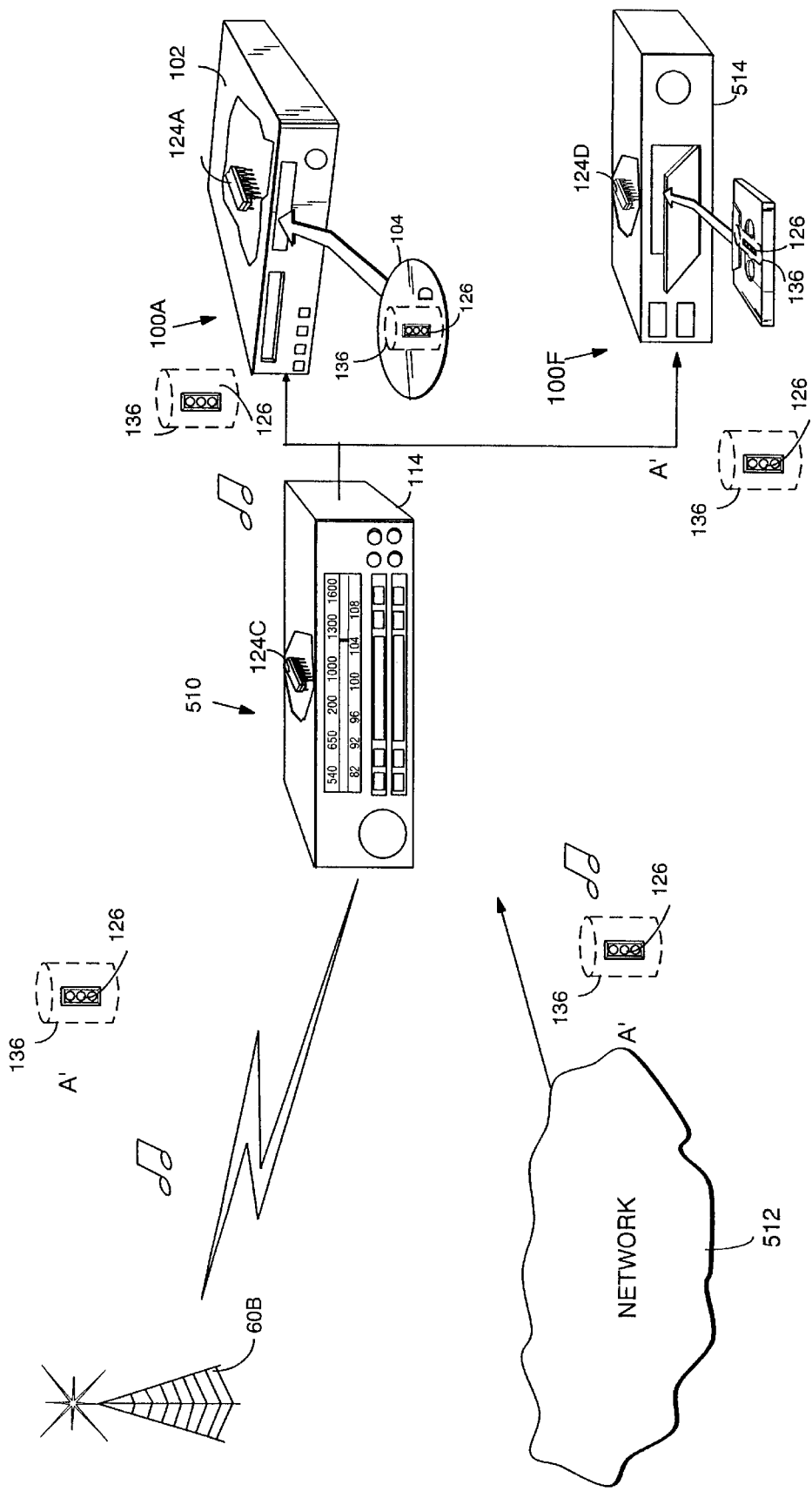

FIG. 15B shows another example analog signal distribution arrangement 510. In this example, a radio broadcaster 60B broadcasts an analog radio signal A' that is steganographically encoded with associated rights management control information 126 and associated organizational structure(s) 136. A wire network 512 such as a cable television system may similarly distribute the same or different steganographically encoded analog radio signal A'. Broadcaster 60B and/or network 512 may deliver the steganographically encoded radio signal A' to a user receiving appliance 100C such as a FM radio receiver 114. In this example, radio receiver 114 has a rights management component 124 that processes and automatically manages rights based on steganographically encoded controls 126. In this example, radio receiver 114 may (if permitted by controls 126) output steganographically encoded analog signal A' to additional appliances such as, for example, a digital recorder 102 and/or an analog recorder 514. In this example, each of appliances 100A, 100B has a rights management component 124 that electronically manages rights based on the steganographically encoded controls 126. Because the steganographically encoded controls 126 persist, recording devices 102, 514 record the steganographically encoded controls 126 in any recordings they make of signal A'. In one non-limiting example, when rights control information is encoded in steganographic sound recordings that are broadcast via radio or some other method, an airplay audit service can sample stations in a given market and identify particular properties being broadcast from "object identifier" information contained in the steganographically encoded VDE container.

Figure 15C:
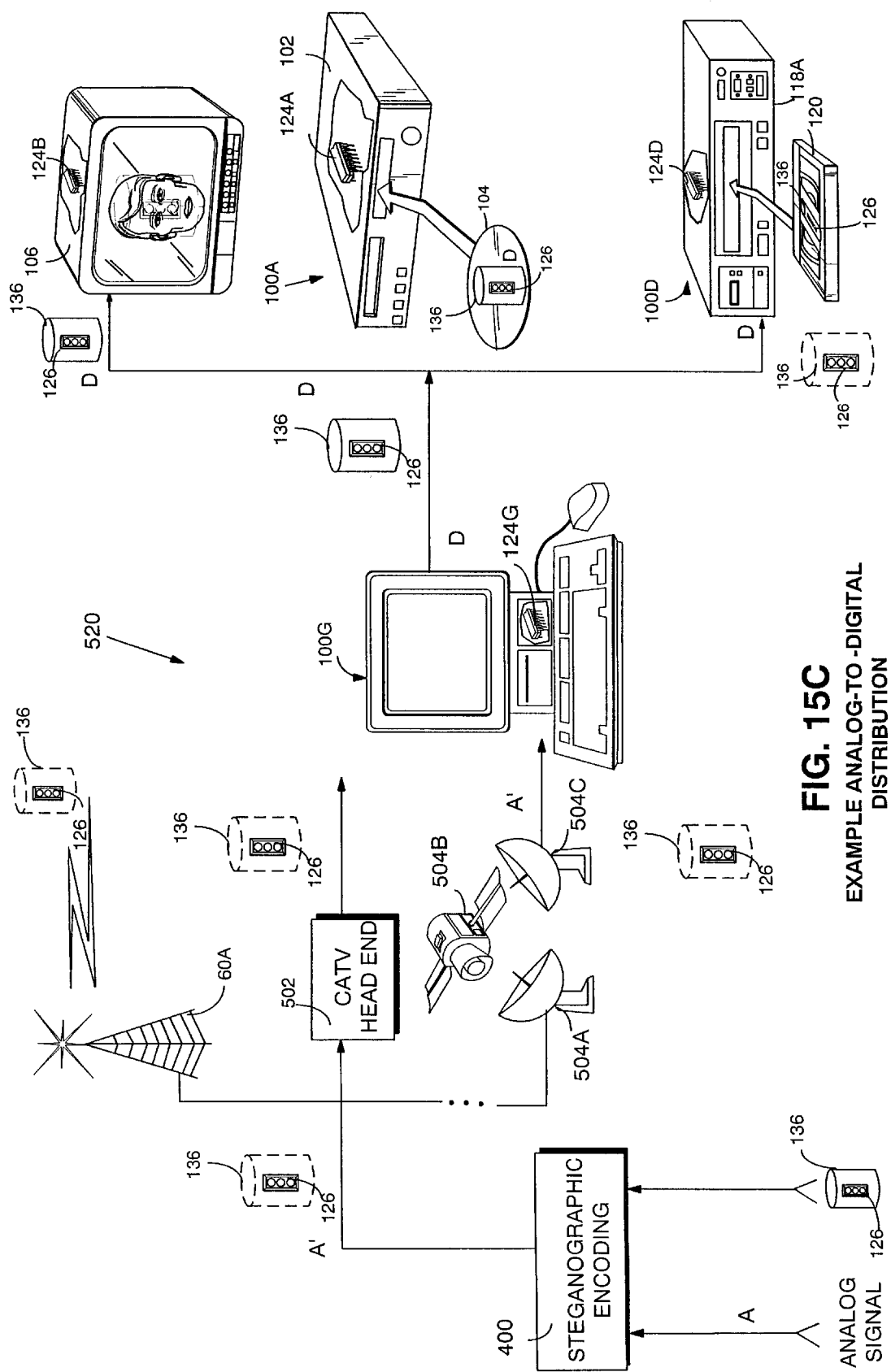

FIG. 15C shows an example signal distribution arrangement 520 in which the steganographically encoded analog signal A' is initially distributed in the same manner as shown in FIG. 15A, and is then converted by an electronic appliance 100G such as a personal computer, for example, into a digital signal D. In this example, appliance 100G includes a rights management component 124 that manages rights based on steganographically encoded controls 126. Appliance 100G may convert received analog signal A' into digital form for distribution to and processing by digital appliances such as a digital high definition television 106B, a digital optical disk recorder 102, and/or a digital tape recorder 118a. In one example, the steganographically encoded control information 126 persists within the digitized signal D. In another example, appliance 100G removes the steganographic encoding from received analog signal A' and outputs a digital signal D that is "clean" and free of steganographic encoding—but is otherwise protected so that it remains persistently associated with the now-digital control information 126 (which appliance 100G may distribute, for example, within secure electronic containers 136 and digital, encrypted form. In one specific example, appliance 100G may package the received, digitized content from analog signal A' within the same digital electronic container 136 that also contains associated control information that appliance 100G steganographically decodes from analog signal A'. In another specific example, appliance 100G may distribute controls 126 independently of the digital signal D—but under circumstances in which the rights management components 124 within each of digital appliances 106B, 102 and 118A all securely associate the control information with the now-digital content.

Figure 15D:
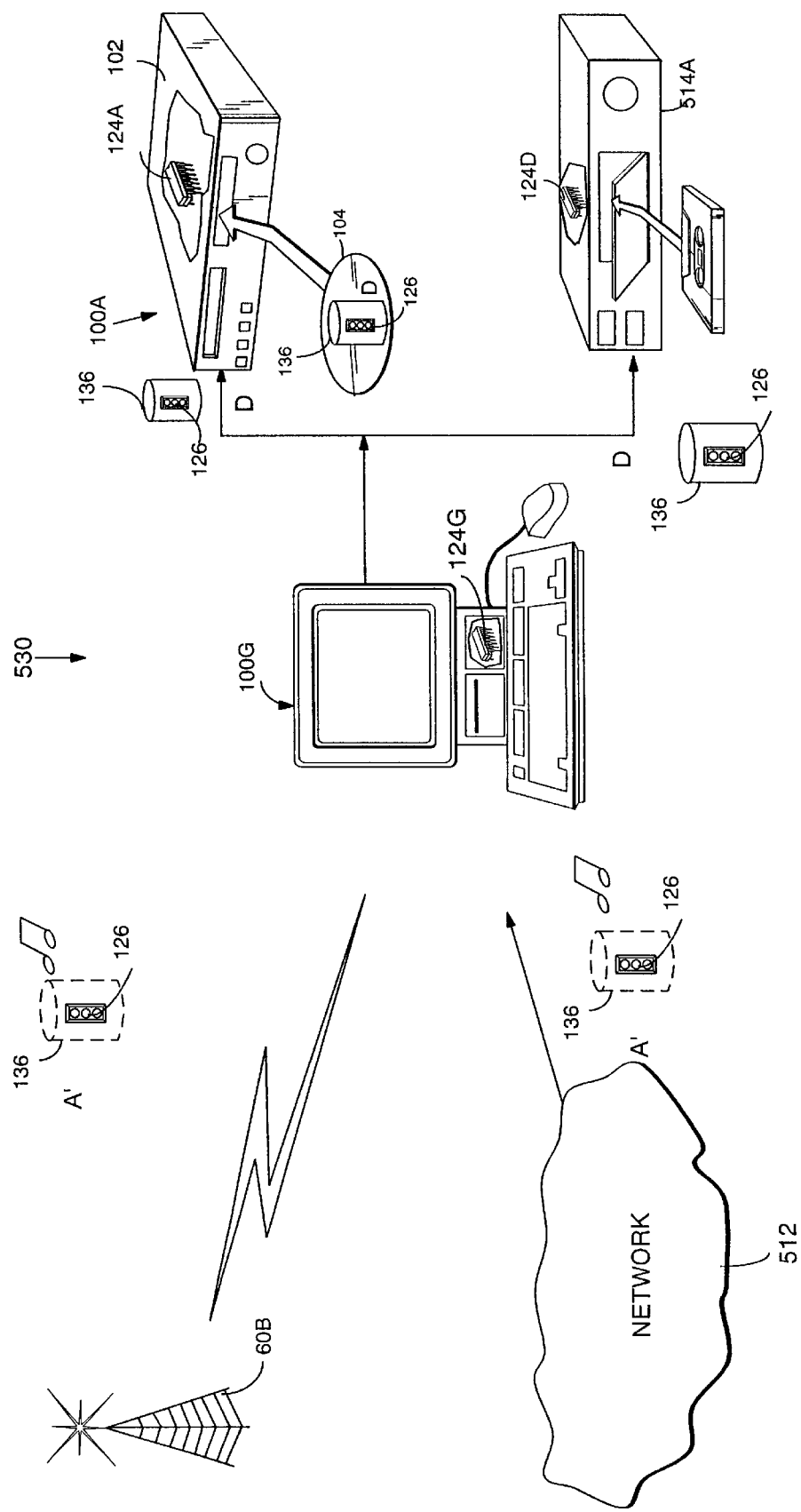

FIG. 15D shows a similar distribution arrangement 530 for analog radio or other audio signals. In this example, appliance 100G may include a digital radio receiver that receives analog radio signal A' and converts it into a digital information signal for distribution to digital recorders 102, 514A. As discussed above, appliance 100G may distribute the digitized analog signal A' with steganographic encoding to appliances 102, 514A—each of which includes a rights management component 124 that may recover the steganographically-encoded control information 126 and perform rights management functions based thereon. In another particular example, appliance 100G may remove the steganographic encoding from the content before distributing it in digital form—and user other techniques (such as those described in the above-referenced Ginter et al. patent specification) to provide a secure association between the now-digital content and the digital control information 126.

Figure 15E:
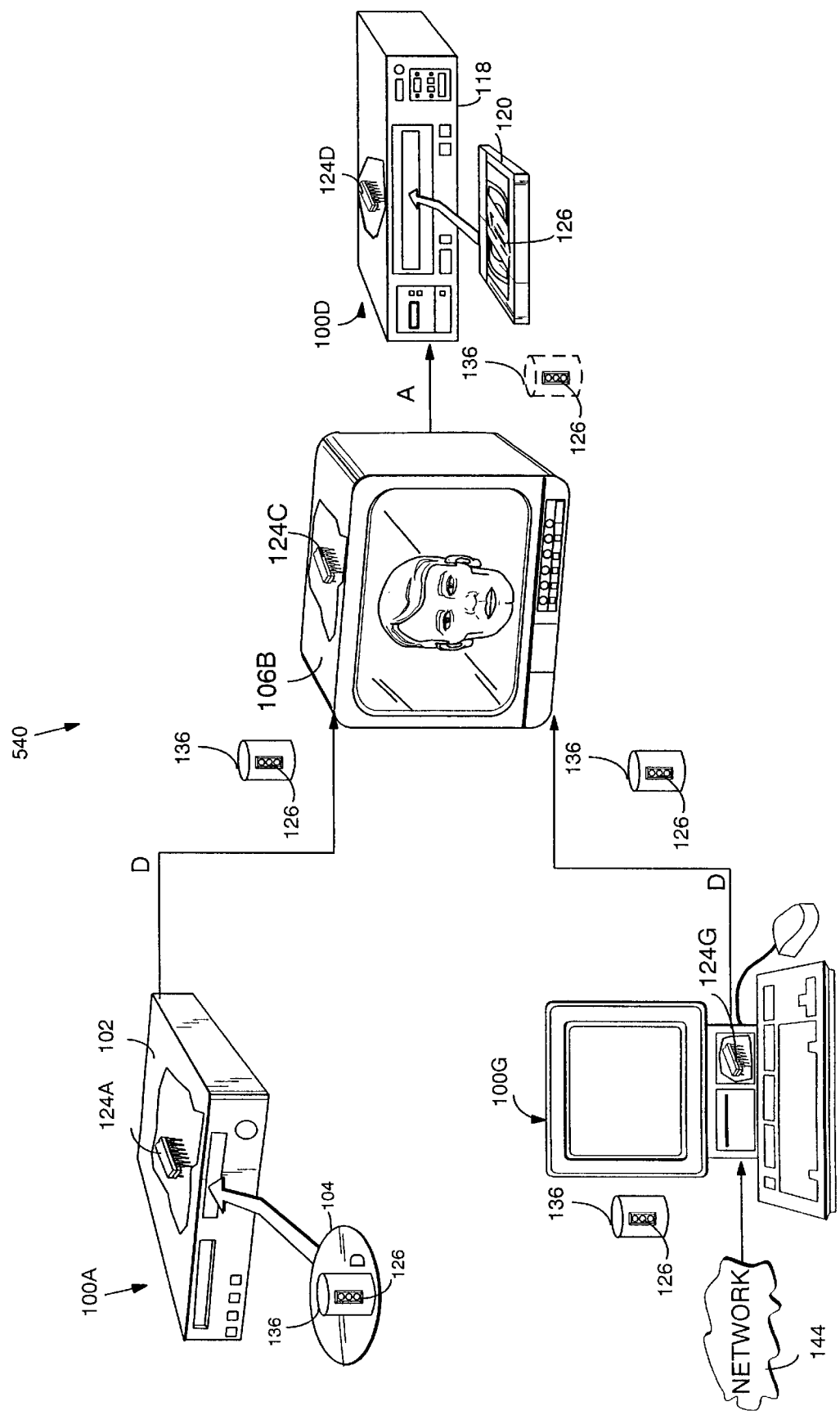

FIG. 15E shows yet another example distribution arrangement 540 in which digital appliances 102, 100G distribute information in digital form to a digital television 106B. For example, appliance 102 may provide digital video signals D to digital television 106B by playing them back form DVD 104. DVD player 102 may provide controls 126 within electronic digital containers 136 to digital television 106B. Digital television 106B may include a rights management component 124C that manages rights in the digital content based on digitally-provided control information 126. Similarly, computer 100G may receive digital content and associated control information 126 from a digital network 144, and provide digital video signals D and associated controls 126 to digital television 106B.

In this example, digital television 106B includes an analog output that may provide analog television signals to additional devices, such as, for example, an analog video cassette recorder 118. In this example, the rights management component 124C within digital television 106B may steganographically encode the analog television signal A with controls 126 and associated organizational structure(s) 136 before releasing the analog signal to the outside world.

Figure 15F:
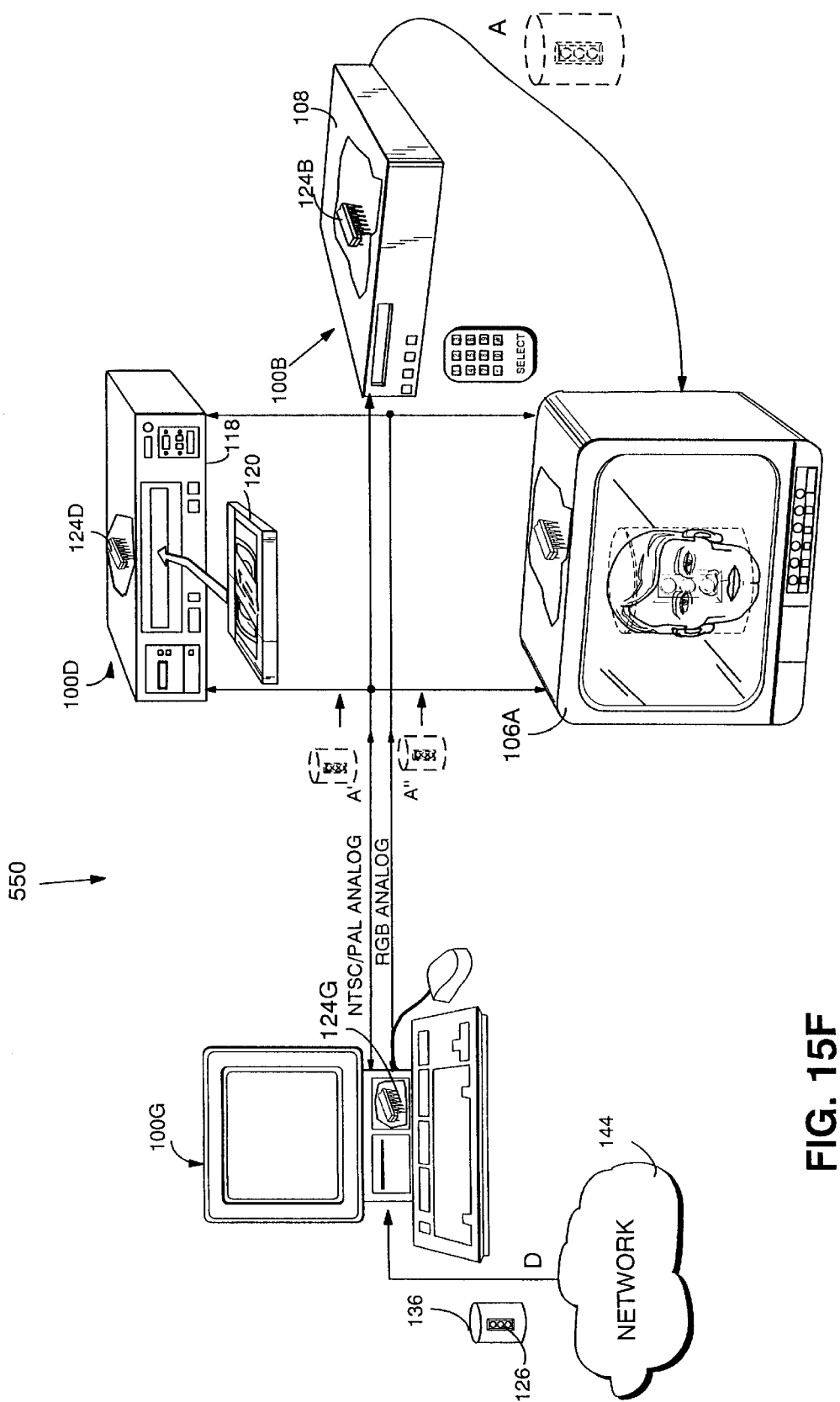

FIG. 15F shows a further example arrangement 550 in which a digital appliance 100G such as a personal computer receives digital video signal D and converts it into various analog television signal formats (e.g., NTSC/PAL and/or RGB) for output to analog devices such as an analog VCR 118, an analog set top box 108 and/or an analog television set 106A. In this example, a rights management component 124G within digital appliance 100G steganographically encodes the received digital controls 126 onto the analog signal A', A" before releasing the analog signal to the additional appliances 118, 106A, 108.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rights management method comprising:

(a) receiving an information signal;

(b) steganographically decoding the received information signal to recover digital rights management control information packaged within at least one secure digital container; and (c) performing at least one rights management operation based at least in part on the recovered digital rights management control information.

2. A method as in claim 1 wherein the decoding step (b) includes the step of steganographically decoding information representing at least one permissions record.

3. A method as in claim 1 further including the step of decrypting contents of the digital container for use in performing step (c).

4. A method as in claim 1 wherein the information signal carries further information in addition to the steganographically encoded information, and the performing step (b) comprises the step of managing at least one right in respect of the further information.

5. A method as in claim 1 wherein the decoding step (b) includes the step of analyzing the information signal using a spectral transform.

6. A method as in claim 1 wherein the decoding step (b) includes the step of analyzing the information signal using a key-based steganographic decoder.

7. A method as in claim 1 wherein the decoding step (b) includes the step of steganographically decoding a pointer that points to another portion of the information signal.

8. A method as in claim 1 wherein the steganographically encoded container includes at least one organization structure, and the decoding step (b) comprises steganographically decoding the organizational structure.

9. An electronic appliance comprising:

decoding means for steganographically decoding a signal to provide control information packaged within at least one secure digital container; and rights management means coupled to the decoding means for performing at least one rights management operation based at least in part on the control information.

10. An appliance as in claim 9 wherein the rights management means includes means for means for selectively blocking the signal.

11. An appliance as in claim 9 wherein the rights management means includes means for selectively descrambling the signal.

12. An appliance as in claim 9 wherein the rights management means includes means for authenticating a further appliance before delivering the signal to said further appliance.

13. An appliance as in claim 9 wherein the rights management means includes means for requiring that a further appliance present an appropriate digital certificate before delivering the signal to said further appliance.

14. An appliance as in claim 9 wherein the right management means includes means for fingerprinting the signal based at least in part on the control information.

15. An appliance as in claim 9 wherein the right management means includes means for further steganographically encoding the signal based at least in part on the control information.

16. An electronic appliance comprising:

a steganographic decoder that steganographically decode a signal to provide control information packaged within at least one secure digital container; and rights management component coupled to the decoder, the rights management component performing at least one rights management operation based at least in part on the control information.

17. An appliance as in claim 16 wherein the rights management component includes or controls a signal blocking circuit that selectively blocks the signal.

18. An appliance as in claim 16 wherein the rights management component includes or controls a signal descrambler.

19. An appliance as in claim 16 wherein the rights management component includes an authenticating circuit for authenticating a further appliance before delivering the signal to said further appliance.

20. An appliance as in claim 16 wherein the rights management component includes a circuit for requiring that a further appliance present an appropriate digital certificate before delivering the signal to said further appliance.

21. An appliance as in claim 16 wherein the rights management component includes a circuit for fingerprinting the signal based at least in part on the control information.

22. An appliance as in claim 16 wherein the rights management component includes a circuit for further steganographically encoding the signal based at least in part on the control information.

23. A rights management method comprising:

(a) receiving a signal comprising governed information and a first rule steganographically incorporated into said signal;

(b) steganographically decoding said signal to recover said first rule; and (c) at a first apparatus, performing at least one operation on said governed information, said operation governed, at least in part, by said first rule, said at least one operation comprising at least:

identifying at least one attribute of a user or viewer of said governed information, and allowing said user or viewer to gain access to said information based on said identification.

24. A method as in claim 23, in which:

said at least one attribute comprises the identity of said user or viewer.

25. A method as in claim 23, in which:

said at least one attribute comprises the age of said user or viewer.

26. A method as in claim 23, in which:

said first rule is received in an encrypted form; and said decoding step (b) further comprises decrypting said rule.

27. A method as in claim 23, further comprising:

(d) applying a watermark or fingerprint to at least a portion of said governed information, said application occurring at least in part under the control of at least one rule; and (e) releasing said watermarked or fingerprinted governed information to a second apparatus.

28. A method as in claim 27, in which:

said watermark or fingerprint includes information at least in part identifying said first apparatus or a user of said first apparatus.

29. A method as in claim 27, further comprising:

prior to said releasing step (e), said first apparatus receiving a certificate from said second apparatus.

30. A method as in claim 29, in which:

said certificate specifies at least one attribute of said second apparatus.

31. A method as in claim 30, further comprising:

said first apparatus checking said digital certificate to determine whether said information should be released to said second apparatus.

32. A method as in claim 31, in which:

said determination is based on whether said digital certificate indicates that said second apparatus includes specified rights management functionality.

33. A method as in claim 23, in which:

said governed information is received in an encrypted or scrambled form; and said gaining access at least in part comprises decrypting or unscrambling said information.

34. A method as in claim 23, in which:

said steps (b) and (c) are securely performed, said secure performance occurring at least in part on a secure processing unit.

35. A method as in claim 23, further comprising:

following said step (b), creating a signal comprising at least a portion of said governed information and a steganographically encoded second rule, said second rule differing in at least one aspect from said first rule.

36. A method as in claim 23, further comprising:

(d) under control of said first rule, making a copy of at least a portion of said governed information; and (e) transferring said copy to a second apparatus, said transferred copy not including said first rule.

37. A method as in claim 23, in which:

said received signal further includes steganographically encoded error correction information;

said method further comprising:
- at said first apparatus, steganographically decoding said signal to retrieve said error correction information;
- at said first apparatus, using said error correction information to determine whether the received version of said first rule contains errors;
- at said first apparatus, using said error correction information to correct errors in said first rule; and
- at said first apparatus, generating a signal comprising at least a portion of said governed information and said corrected first rule, said signal not including said erroneous version of said first rule.

38. A method as in claim 37, further comprising:

transmitting said generated signal from said first apparatus to a second apparatus.

39. A rights management method comprising:

(a) at a first apparatus, receiving a signal comprising governed information and at first rule steganographically incorporated into said signal;

(b) at said first apparatus, steganographically decoding said signal to recover said first rule; and (c) at said first apparatus, performing at least one operation on at least a portion of said governed information, said operation governed, at least in part, by said first rule, said at least one operation comprising at least:
- determining whether said governed information has been accessed or used more than a specified number of times, and
- allowing access or use of said governed information if said number of accesses or uses is less than or equal to said specified number, or
- blocking access or use if said number of accesses or uses is greater than said specified number.

40. A method as in claim 39, in which:

said first rule is received in an encrypted form; and said decoding step (b) further comprises decrypting said first rule.

41. A method as in claim 39, further comprising:

(d) applying a watermark or fingerprint to at least a portion of said governed information, said application occurring at least in part under the control of at least one rule; and (e) releasing said watermarked or fingerprinted governed information to a second apparatus.

42. A method as in claim 41, in which:

said watermark or fingerprint includes information at least in part identifying said first apparatus or a user of said first apparatus.

43. A method as in claim 39, further comprising:

(d) at said first apparatus, receiving a certificate from said second apparatus; and (e) releasing at least a portion of said governed information to a second apparatus.

44. A method as in claim 43, in which:

said certificate specifies at least one attribute of said second apparatus.

45. A method as in claim 44, further comprising:

said first apparatus checking said digital certificate to determine whether said information should be released to said second apparatus.

46. A method as in claim 45, in which:

said determination is based on whether said digital certificate indicates that said second apparatus includes specified rights management functionality.

47. A method as in claim 39, further comprising:

following said step (b), at said first apparatus, creating a signal comprising at least a portion of said governed information and a steganographically encoded second rule, said second rule differing in at least one aspect from said first rule.

48. A method as in claim 39, further comprising:

(d) under control of said first rule, making a copy of at least a portion of said governed information; and (e) transferring said copy to a second apparatus, said transferred copy not including said first rule.

49. A method as in claim 39, in which:

said received signal further includes steganographically encoded error correction information;

said method further comprising:
- at said first apparatus, steganographically decoding said signal to retrieve said error correction information;
- at said first apparatus, using said error correction information to determine whether the received version of said first rule contains errors;
- at said first apparatus, using said error correction information to correct errors in said first rule; and
- at said first apparatus, generating a signal comprising at least a portion of said governed information and said corrected first rule, said signal not including said erroneous version of said first rule.

50. A method as in claim 49, further comprising:

transmitting said generated signal from said first apparatus to a second apparatus.

51. A rights management method, comprising:

(a) at a first apparatus, receiving a signal comprising governed information and a first rule steganographically incorporated into said signal, said first rule specifying a time;

(b) at said first apparatus, steganographically decoding said signal to recover said first rule;

(c) at said first apparatus, attempting to access said governed information;

(d) at said first apparatus, checking to determine if said time has been reached or exceeded; and (e) at said first apparatus, allowing said access to complete if said time has not been reached or exceeded, but blocking said access if said time has not been reached.

52. A method as in claim 51, in which:

said first rule is received in an encrypted form; and said decoding step (b) further comprises decrypting said first rule.

53. A method as in claim 51, further comprising:

(f) at said first apparatus, applying a watermark or fingerprint to at least a portion of said governed information, said application occurring at least in part under the control of at least one rule; and (g) releasing said watermarked or fingerprinted governed information to a second apparatus.

54. A method as in claim 53, in which:

said watermark or fingerprint includes information at least in part identifying said first apparatus or a user of said first apparatus.

55. A method as in claim 53, further comprising:

prior to said releasing step (g), said first apparatus receiving a certificate from said second apparatus.

56. A method as in claim 55, in which:

said certificate specifies at least one attribute of said second apparatus.

57. A method as in claim 56, further comprising:

said first apparatus checking said digital certificate to determine whether said information should be released to said second apparatus.

58. A method as in claim 57, in which:

said determination is based on whether said digital certificate indicates that said second apparatus includes specified rights management functionality.

59. A method as in claim 51, in which:

said governed information is received in an encrypted or scrambled form; and said completion of said access at least in part comprises decrypting or unscrambling said governed information.

60. A method as in claim 51, in which:

said steps (b)–(e) are securely performed, said secure performance occurring at least in part on a secure processing unit.

61. A method as in claim 51, further comprising:

following said step (b), at said first apparatus, creating a signal comprising at least a portion of said governed information and a steganographically encoded second rule, said second rule differing in at least one aspect from said first rule.

62. A method as in claim 51, further comprising:

(f) under control of said first rule, making a copy of at least a portion of said governed information; and (g) transferring said copy to a second apparatus, said transferred copy not including said first rule.

63. A method as in claim 51, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said first rule; and at said first apparatus, generating a signal comprising said first governed information and said corrected first rule, said signal not including said erroneous version of said first rule.

64. A method as in claim 63, further comprising:

transmitting said generated signal from said first apparatus to a second apparatus.

65. A rights management method operating at least in part on a first apparatus, said first apparatus including a communications port and means for accessing information on a removable memory device, said method comprising:

(a) at said first apparatus, receiving a removable memory device containing a signal, said signal comprising governed information and a first rule steganographically incorporated into said signal, (b) at said first apparatus, steganographically decoding said signal to recover said first rule;

(c) at said first apparatus, using said communications port to initiate communication with a second apparatus remote from said first apparatus;

(d) at said first apparatus, receiving at least a second rule from said second apparatus;

(e) at said first apparatus, using said first rule or said second rule to govern at least one aspect of access to or use of said governed information.

66. A method as in claim 65, in which:

said first rule is received in an encrypted form; and said decoding step (b) further comprises decrypting said first rule.

67. A method as in claim 66, in which:

said second rule is received in an encrypted form, and said method further comprises:

decrypting said second rule prior to using said second rule.

68. A method as in claim 65, further comprising:

(f) applying a watermark or fingerprint to at least a portion of said governed information, said application occurring at least in part under the control of at least one rule; and (g) releasing said watermarked or fingerprinted governed information to a second apparatus.

69. A method as in claim 68, in which:

said watermark or fingerprint includes information at least in part identifying said first apparatus or a user of said first apparatus.

70. A method as in claim 65, further comprising:

(f) at said first apparatus, receiving a certificate from said third apparatus; and (g) releasing at least a portion of said governed information to said third apparatus.

71. A method as in claim 70, in which:

said certificate specifies at least one attribute of said third apparatus.

72. A method as in claim 71, further comprising:

said first apparatus checking said digital certificate to determine whether said information should be released to said third apparatus.

73. A method as in claim 72, in which:

said determination is based on whether said digital certificate indicates that said third apparatus includes specified rights management functionality.

74. A method as in claim 65, in which:

said governed information is received in an encrypted or scrambled form; and said at least one aspect of access to or use of said governed information at least in part comprises decrypting or unscrambling said governed information.

75. A method as in claim 65, in which:

said steps (b) through (e) are securely performed, said secure performance occurring at least in part on a secure processing unit.

76. A method as in claim 65, further comprising:

following said step (b), creating a signal comprising at least a portion of said governed information and said second rule, steganographically encoded.

77. A method as in claim 65, further comprising:

(f) under control of said first rule or said second rule, making a copy of at least a portion of said governed information; and (g) transferring said copy to a remote apparatus, said transferred copy not including said first rule or said second rule.

78. A method as in claim 65, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said first rule; and at said first apparatus, generating a signal comprising at least a portion of said governed information and said corrected first rule, said signal not including said erroneous version of said first rule.

79. A method as in claim 78, further comprising:

transmitting said generated signal from said first apparatus to said second apparatus.

80. A rights management method operating at least in part on a first apparatus, said first apparatus including a communications port and means for accessing information on a removable memory device, said method comprising:

(a) at said first apparatus, receiving a removable memory device containing a signal, said signal comprising
governed information and
a first rule steganographically incorporated into said signal, said first rule requiring that payment be made at a remote site in return for use of or access to at least a portion of said governed information;

(b) at said first apparatus, steganographically decoding said signal to recover said first rule;

(c) at said first apparatus, initiating at least one access to or use of at least a portion of said governed information;

(d) at said first apparatus, initiating communication, through said communications port, with a second apparatus remote from said first apparatus;

(e) providing information from said first apparatus to said second apparatus, said information comprising or enabling payment for said at least one access or use.

81. A method as in claim 80, in which:

said first rule is received in an encrypted form; and said decoding step (b) further comprises decrypting said rule.

82. A method as in claim 80, further comprising:

(f) applying a watermark or fingerprint to at least a portion of said governed information, said application occurring at least in part under the control of at least one rule; and (g) releasing said watermarked or fingerprinted governed information to a second apparatus.

83. A method as in claim 82, in which:

said watermark or fingerprint includes information at least in part identifying said first apparatus or a user of said first apparatus.

84. A method as in claim 80, further comprising:

(f) at said first apparatus, receiving a certificate from said second apparatus; and (g) releasing at least a portion of said governed information to a second apparatus.

85. A method as in claim 84, in which:

said certificate specifies at least one attribute of said second apparatus.

86. A method as in claim 85, further comprising:

said first apparatus checking said digital certificate to determine whether said information should be released to said second apparatus.

87. A method as in claim 86, in which:

said determination is based on whether said digital certificate indicates that said second apparatus includes specified rights management functionality.

88. A method as in claim 80, in which:

said governed information is received in an encrypted or scrambled form; said method further comprising:
following said providing step (e), decrypting or unscrambling at least a portion of said governed information.

89. A method as in claim 80, in which:

said steps (b) through (e) are securely performed, said secure performance occurring at least in part on a secure processing unit.

90. A method as in claim 80, further comprising:

following said step (e), at said first apparatus, creating a signal comprising at least a portion of said governed information and a steganographically encoded second rule, said second rule differing in at least one aspect from said first rule.

91. A method as in claim 80, further comprising:

(f) at said first apparatus, under control of said first rule, making a copy of at least a portion of said governed information; and (g) transferring said copy to a third apparatus, said transferred copy not including said first rule.

92. A method as in claim 80, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said first rule; and at said first apparatus, generating a signal comprising at least a portion of said governed information and said corrected first rule, said signal not including said erroneous version of said first rule.

93. A method as in claim 92, further comprising:

transmitting said generated signal from said first apparatus to a third apparatus.

94. A rights management method comprising:

(a) at a first apparatus, receiving a signal comprising governed information and a first rule steganographically incorporated into said signal;

(b) at said first apparatus, steganographically decoding said signal to recover said first rule; and (c) at said first apparatus, performing at least one operation on said governed information, said operation governed, at least in part, by said first rule, said at least one operation comprising at least:
  requiring a payment prior to releasing said information for access by a user or viewer;

(d) applying a watermark or fingerprint to at least a portion of said governed information, said application occurring at least in part under the control of at least one rule; and (e) releasing said watermarked or fingerprinted governed information to a second apparatus.

95. A method as in claim 94, in which:

said rule is received in an encrypted form; and said decoding step (b) further comprises decrypting said rule.

96. A method as in claim 94, in which:

said watermark or fingerprint includes information at least in part identifying said first apparatus or a user of said first apparatus.

97. A method as in claim 94, further comprising:

prior to said releasing step (e):
  at said first apparatus, receiving a certificate from said second apparatus; and
  releasing at least a portion of said governed information to a second apparatus.

98. A method as in claim 97, in which:

said certificate specifies at least one attribute of said second apparatus.

99. A method as in claim 98, further comprising:

said first apparatus checking said digital certificate to determine whether said information should be released to said second apparatus.

100. A method as in claim 99, in which:

said determination is based on whether said digital certificate indicates that said second apparatus includes specified rights management functionality.

101. A method as in claim 94, in which:

said governed information is received in an encrypted or scrambled form; and said releasing said governed information at least in part comprises decrypting or unscrambling said governed information.

102. A method as in claim 94, in which:

said steps (b) and (c) are securely performed, said secure performance occurring at least in part on a secure processing unit.

103. A method as in claim 94, further comprising:

said step (d) further comprising steganographically encoding a second rule into said governed information, said second rule differing in at least one aspect from said first rule.

104. A method as in claim 94, in which:

said watermarked or fingerprinted governed information released in said step (e) does not include said first rule steganographically encoded in said information.

105. A method as in claim 94, in which:

said received signal further includes steganographically encoded error correction information;

said method further comprising:
  at said first apparatus, steganographically decoding said signal to retrieve said error correction information;
  at said first apparatus, using said error correction information to determine whether the received version of said first rule contains errors;
  at said first apparatus, using said error correction information to correct errors in said first rule; and
  at said first apparatus, generating a corrected signal comprising at least a portion of said governed information and said corrected first rule, said signal not including said erroneous version of said first rule.

106. A method as in claim 105, in which:

said applying step (d) further comprises applying said watermark or fingerprint to said corrected signal; and said information released in said releasing step (e) said corrected signal.

107. A rights management method comprising:

(a) at a first apparatus, receiving a signal comprising governed information and an organizational structure incorporated into said signal, said organizational structure including a first rule governing at least one aspect of access to or use of said governed information;

said organizational structure comprising a secure container containing said first rule;

(b) at said first apparatus, steganographically decoding said signal to recover said organizational structure;

(c) at said first apparatus, accessing said first rule; and (d) at said first apparatus, using said first rule to govern at least one aspect of access to or use of said governed information.

108. A method as in claim 107, in which:

said secure container further contains identification information identifying said governed information.

109. A method as in claim 107, in which:

said receiving step (a) further comprises receiving said secure container in an encrypted form; and said method further comprises decrypting said secure container.

110. A method as in claim 109, in which:

said secure container further contains a permissions record.

111. A method as in claim 110, in which:

said permissions record contains or references said first rule.

112. A method as in claim 109, in which:

said first rule controls, at least in part, use of an analog file on a device designed to render, display or play said analog file.

113. A method as in claim 108, in which:

said governed information is contained within said secure container.

114. A method as in claim 107, in which:

said organizational structure is received in an encrypted form, said decoding step (b) further comprising decrypting said organizational structure.

115. A method as in claim 107, further comprising:

(e) applying a watermark or fingerprint to at least a portion of said governed information, said application occurring at least in part under the control of at least one rule; and (f) releasing said watermarked or fingerprinted governed information to a second apparatus.

116. A method as in claim 115, in which:

said watermark or fingerprint includes information at least in part identifying said first apparatus or a user of said first apparatus.

117. A method as in claim 107, further comprising:

(e) at said first apparatus, receiving a certificate from a second apparatus, (f) releasing said governed information to a second apparatus, said releasing step being based, at least in part, on information contained in said certificate.

118. A method as in claim 117, in which:

said certificate specifies at least one attribute of said second apparatus.

119. A method as in claim 118, further comprising:

said first apparatus checking said digital certificate to determine whether said information should be released to said second apparatus.

120. A method as in claim 119, in which:

said determination is based on whether said digital certificate indicates that said second apparatus includes specified rights management functionality.

121. A method as in claim 107, in which:

said governed information is received in an encrypted or scrambled form; and said at least one aspect of access to or use of said governed information at least in part comprises decrypting or unscrambling said governed information.

122. A method as in claim 107, in which:

said steps (b) through (d) are securely performed, said secure performance occurring at least in part on a secure processing unit.

123. A method as in claim 107, further comprising:

following said step (b), at said first apparatus, creating a signal comprising at least a portion of said governed information and a steganographically encoded second rule, said second rule differing in at least one aspect from said first rule.

124. A method as in claim 107, further comprising:

(e) under control of said first rule, making a copy of at least a portion of said governed information; and (f) transferring said copy to a second apparatus, said transferred copy not including said first rule.

125. A method as in claim 107, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said first rule; and at said first apparatus, generating a corrected signal comprising at least a portion of said governed information and said corrected first rule, said signal not including said erroneous version of said first rule.

126. A method as in claim 125, further comprising:

transmitting said corrected signal from said first apparatus to a second apparatus.

127. A rights management method, comprising:

(a) at a first apparatus, receiving a signal comprising governed information and at least a first and a second rule steganographically incorporated into said signal, (b) at said first apparatus, determining whether to use said first rule or said second rule to govern at least one operation on said governed information;

said determination based, at least in part, on information regarding the nature or identification of said first apparatus; and (c) at said first apparatus, using said first rule or said second rule to govern said at least one operation.

128. A method as in claim 127, in which:

said first and second rules are received in an encrypted form; and said decoding step (b) further comprises decrypting said rules.

129. A method as in claim 127, further comprising:

(d) applying a watermark or fingerprint to at least a portion of said governed information, said application occurring at least in part under the control of at least one rule; and (e) releasing said watermarked or fingerprinted governed information to a second apparatus.

130. A method as in claim 129, in which:

said watermark or fingerprint includes information at least in part identifying said first apparatus or a user of said first apparatus.

131. A method as in claim 127, further comprising:

(d) at said first apparatus, receiving a certificate from said second apparatus; and (e) releasing at least a portion of said governed information to a second apparatus.

132. A method as in claim 131, in which:

said certificate specifies at least one attribute of said second apparatus.

133. A method as in claim 132, further comprising:

said first apparatus checking said digital certificate to determine whether said information should be released to said second apparatus.

134. A method as in claim 133, in which:

said determination is based on whether said digital certificate indicates that said second apparatus includes specified rights management functionality.

135. A method as in claim 127, in which:

said governed information is received in an encrypted or scrambled form; and said at least one operation at least in part comprises decrypting or unscrambling said governed information.

136. A method as in claim 127, in which:

said steps (b) and (c) are securely performed, said secure performance occurring at least in part on a secure processing unit.

137. A method as in claim 127, further comprising:
following said step (c), at said first apparatus, creating a signal comprising at least a portion of said governed information and a steganographically encoded third rule, said second rule differing in at least one aspect from said first rule and from said second rule.

138. A method as in claim 127, further comprising:
(d) under control of said first rule, making a copy of at least a portion of said governed information; and
(e) transferring said copy to a second apparatus, said transferred copy not including said first rule or said second rule.

139. A method as in claim 127, in which:
said received signal further includes steganographically encoded error correction information;
said method further comprising:
  at said first apparatus, steganographically decoding said signal to retrieve said error correction information;
  at said first apparatus, using said error correction information to determine whether the received version of said first rule and said second rule contain errors;
  at said first apparatus, using said error correction information to correct errors in said first rule and/or said second rule; and
  at said first apparatus, generating a corrected signal comprising at least a portion of said governed information and said corrected first rule and/or corrected second rule, said signal not including said erroneous version of said first and/or second rule.

140. A method as in claim 139, further comprising:
transmitting said corrected signal from said first apparatus to a second apparatus.

141. A rights management method operating at least in part on a first apparatus, said first apparatus including a communications port, means for accessing information on a removable memory device, and steganographic encoding circuitry said method comprising:
(a) at said first apparatus, receiving a removable memory device containing a signal, said signal comprising governed information and
a first rule steganographically incorporated into said signal, said first rule requiring that payment be made at a remote site in return for use of or access to at least a portion of said governed information;
(b) at said first apparatus, steganographically decoding said signal to recover said first rule;
(c) at said first apparatus, initiating at least one access to or use of at least a portion of said governed information;
(d) at said first apparatus, making an analog copy of at least a portion of said governed information; and
(e) at said first apparatus, steganographically incorporating at least one rule into said analog copy, said rule governing at least one aspect of access to or use of said analog copy.

142. A method as in claim 141, in which:
said rule is received in an encrypted form; and
said decoding step (b) further comprises decrypting said rule.

143. A method as in claim 141, further comprising:
(f) applying a watermark or fingerprint to at least a portion of said analog copy, said application occurring at least in part under the control of at least one rule; and
(g) releasing said watermarked or fingerprinted governed information to a second apparatus.

144. A method as in claim 143, in which:
said watermark or fingerprint includes information at least in part identifying said first apparatus or a user of said first apparatus.

145. A method as in claim 141, further comprising:
(f) at said first apparatus, receiving a certificate from said second apparatus; and
(g) releasing at least a portion of said governed information to a second apparatus.

146. A method as in claim 145, in which:
said certificate specifies at least one attribute of said second apparatus.

147. A method as in claim 146, further comprising:
said first apparatus checking said digital certificate to determine whether said information should be released to said second apparatus.

148. A method as in claim 147, in which:
said determination is based on whether said digital certificate indicates that said second apparatus includes specified rights management functionality.

149. A method as in claim 141, in which:
said governed information is received in an encrypted or scrambled form; and
said at access to or use of said governed information specified in said step (c) at least in part comprises decrypting or unscrambling said governed information.

150. A method as in claim 141, in which:
said steps (b) through (e) are securely performed, said secure performance occurring at least in part on a secure processing unit.

151. A method as in claim 141, in which:
said rule steganographically incorporated in said step (e) comprises a second rule, said second rule differing in at least one aspect from said first rule.

152. A method as in claim 141, further comprising:
(f) transferring said analog copy to a second apparatus, said transferred copy not including said first rule.

153. A method as in claim 141, in which:
said received signal further includes steganographically encoded error correction information;
said method further comprising:
  at said first apparatus, steganographically decoding said signal to retrieve said error correction information;
  at said first apparatus, using said error correction information to determine whether the received version of said first rule contains errors;
  at said first apparatus, using said error correction information to correct errors in said first rule; and
  said rule steganographically incorporated in said step (e) comprising said corrected first rule.

154. A method as in claim 153, further comprising:
(f) transmitting said analog copy from said first apparatus to a second apparatus.

155. A steganographic encoding method comprising:
(a) receiving information;
(b) transforming said information into a signal;
(c) selecting a first and a second location in said signal for the incorporation of steganographically encoded information, said selection being governed at least in part by an analysis of the bandwidth available at such location for such encoding;
(d) steganographically encoding a first rule in said first location, said first rule at least in part governing at least one aspect of use of at least a portion of said information;

(e) steganographically encoding a second rule in said second location, said second rule at least in part governing at least one aspect of use of at least a portion of said information.

156. A method as in claim 155, further comprising:
prior to said steganographically encoding step (d), encrypting said first rule; and
prior to said steganographically encoding step (e), encrypting said second rule.

157. A method as in claim 155, further comprising:
prior to said steganographically encoding step (d), incorporating said first rule into a secure container.

158. A method as in claim 155, in which:
said first rule at least in part governs at least one aspect of use of a first portion of said information; and
said second rule at least in part governs at least one aspect of use of a second portion of said information, said second portion being different from said first portion.

159. A method as in claim 155, in which:
said transforming step (b) further comprises encrypting or scrambling said information; and
said at least one aspect of access to or use of said information governed by said first rule at least in part comprises decrypting or unscrambling said governed information;
at said first apparatus, using said error correction information to determine whether the received version of said first rule contains errors;
at said first apparatus, using said error correction information to correct errors in said first rule; and
at said first apparatus, generating a signal comprising at least a portion of said governed information and said corrected first rule, said signal not including said erroneous version of said first rule.

160. A rights management method operating at least in part on a first apparatus, said method comprising:
(a) receiving a signal comprising
governed information and
an organizational structure incorporated into said signal, said organizational structure including a pointer to a first rule governing at least one aspect of access to or use of said governed information;
(b) steganographically decoding said signal to recover said organizational structure;
(c) accessing said pointer;
(d) using said pointer to locate said first rule; and
(e) using said first rule to govern at least one aspect of access to or use of said governed information.

161. A method as in claim 160, in which:
said organizational structure comprises a secure container containing said pointer.

162. A method as in claim 161, in which:
said secure container further contains identification information identifying said governed information.

163. A method as in claim 161, in which:
said first apparatus includes a communications port; and
said locating step (d) further comprises
using said communications port to initiate communication with a second apparatus remote from said first apparatus; and
locating said first rule at said second apparatus.

164. A method as in claim 163, in which:
said receiving step (a) further comprises receiving said signal from said second apparatus, through said communications port.

165. A method as in claim 163, in which:
said receiving step (a) further comprises receiving said signal from a source other than said second apparatus.

166. A method as in claim 162, in which:
said receiving step (a) further comprises receiving said secure container in an encrypted form; and
said method further comprises decrypting said secure container.

167. A method as in claim 162, in which:
said secure container further contains a permissions record.

168. A method as in claim 167, in which:
said permissions record contains or references said pointer.

169. A method as in claim 162, in which:
said first rule controls, at least in part, use of an analog file on a device designed to render, display or play said analog file.

170. A method as in claim 160, in which:
said pointer constitutes a URL.

171. A method as in claim 161, in which:
said secure container contains said governed information.

172. A method as in claim 160, in which:
said organizational structure is received in an encrypted form,
said decoding step (b) further comprising decrypting said organizational structure.

173. A method as in claim 160, further comprising:
(f) applying a watermark or fingerprint to at least a portion of said governed information, said application occurring at least in part under the control of at least one rule; and
(g) releasing said watermarked or fingerprinted governed information to a second apparatus.

174. A method as in claim 173, in which:
said watermark or fingerprint includes information at least in part identifying said first apparatus or a user of said first apparatus.

175. A method as in claim 160, further comprising:
(f) at said first apparatus, receiving a certificate from said second apparatus; and
(g) releasing at least a portion of said governed information to a second apparatus.

176. A method as in claim 175, in which:
said certificate specifies at least one attribute of said second apparatus.

177. A method as in claim 176, further comprising:
said first apparatus checking said digital certificate to determine whether said information should be released to said second apparatus.

178. A method as in claim 177, in which:
said determination is based on whether said digital certificate indicates that said second apparatus includes specified rights management functionality.

179. A method as in claim 160, in which:
said governed information is received in an encrypted or scrambled form; and
said at least one aspect of access to or use of said governed information specified in said step (e) at least in part comprises decrypting or unscrambling said governed information.

180. A method as in claim 160, in which:
said steps (b) through (e) are securely performed, said secure performance occurring at least in part on a secure processing unit.

181. A method as in claim 160, further comprising:

following said step (e), at said first apparatus, creating a signal comprising at least a portion of said governed information and a steganographically encoded pointer to a second rule, said second rule differing in at least one aspect from said first rule.

182. A method as in claim 160, further comprising:

(f) under control of said first rule, making a copy of at least a portion of said governed information; and (g) transferring said copy to a second apparatus, said transferred copy not including said pointer.

183. A method as in claim 160, in which:

said received signal further includes steganographically encoded error correction information;

said method further comprising:

at said first apparatus, steganographically decoding said signal to retrieve said error correction information;

at said first apparatus, using said error correction information to determine whether the received version of said pointer contains errors;

at said first apparatus, using said error correction information to correct errors in said pointer; and at said first apparatus, generating a corrected signal comprising at least a portion of said governed information and said corrected pointer, said signal not including said erroneous version of said pointer.

184. A method as in claim 183, further comprising:

transmitting said corrected signal from said first apparatus to a second apparatus.

185. A rights management method operating at least in part on a first apparatus, said first apparatus including a communications port, said method comprising:

(a) at said first apparatus, receiving a signal, said signal comprising governed information and a first rule steganographically incorporated into said signal, said first rule controlling whether said governed information may be transmitted through said communications port;

(b) at said first apparatus, steganographically decoding said signal to recover said at least one rule;

(c) at said first apparatus attempting to initiate a transfer of said governed information through said communications port;

(d) at said first apparatus, invoking said first rule, (e) at said first apparatus determining, based on said first rule, whether said transfer is authorized; and (f) completing said transfer if said transfer is authorized, otherwise aborting said transfer.

186. A method as in claim 185, in which:

said first apparatus includes a removable memory device connected to said communications port; and said transfer comprises a transfer through said communications port to said removable memory device.

187. A method as in claim 185, in which:

said transfer comprises a transfer through said communications port to a second apparatus.

188. A method as in claim 185, in which:

said first rule is received in an encrypted form; and said decoding step (b) further comprises decrypting said first rule.

189. A method as in claim 185, further comprising:

(g) applying a watermark or fingerprint to at least a portion of said governed information prior to said transfer, application occurring at least in part under the control of at least one rule.

190. A method as in claim 189, in which:

said watermark or fingerprint includes information at least in part identifying said first apparatus or a user of said first apparatus.

191. A method as in claim 187, in which:

said determining step (e) is based, at least in part, on whether said second apparatus includes functionality designated by said first rule.

192. A method as in claim 191, in which:

said designated functionality includes at least the ability of said second apparatus to protect said governed information in at least one respect.

193. A method as in claim 192, in which:

said designated functionality further includes the ability of said second apparatus to use said rule to govern at least one operation occurring on said second apparatus, and said method further comprises transferring a copy of said rule from said first apparatus to said second apparatus.

194. A method as in claim 193, in which:

said rule requires that said second apparatus transfer a certificate to said first apparatus.

195. A method as in claim 194, in which:

said rule further requires that said certificate identify said designated functionality.

196. A method as in claim 185, in which:

said governed information is received in an encrypted or scrambled form.

197. A method as in claim 185, in which:

said transfer transfers a copy of said governed information.

198. A method as in claim 185, in which:

said steps (b) through (e) are securely performed, said secure performance occurring at least in part on a secure processing unit.

199. A method as in claim 185, further comprising:

prior to said step (c), at said first apparatus, creating a signal comprising at least a portion of said governed information and a steganographically encoded second rule, said second rule differing in at least one aspect from said first rule;

said governed information referred to in said step (c) constituting said created signal.

200. A method as in claim 185, further comprising:

said governed information transferred in said step (f) does not contain said first rule.

201. A method as in claim 185, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said first rule; and at said first apparatus, generating a corrected signal comprising at least a portion of said governed information and said corrected first rule, said signal not including said erroneous version of said first rule, said corrected signal constituting said governed information referred to in said step (c).

202. A rights management method operating at least in part on a first apparatus, said first apparatus including a communications port and means for accessing information on a removable memory device, said method comprising:

(a) at said first apparatus, receiving a removable memory device containing a signal, said signal comprising governed information and a first rule steganographically incorporated into said signal, said first rule requiring that payment be made at a remote site in return for use of or access to at least a portion of said governed information;

(b) at said first apparatus, steganographically decoding said signal to recover said first rule;

(c) at said first apparatus, initiating at least one access to or use of at least a portion of said governed information;

(d) at said first apparatus, initiating communication, through said communications port, with a second apparatus remote from said first apparatus;

(e) providing payment from said first apparatus to said second apparatus;

(f) checking to determine whether said payment has been provided; and (g) allowing said at least one access to or use of at least a portion of said governed information to complete if said check reveals that said payment has been provided.

203. A method as in claim 202, in which:

said governed information comprises video information and audio information; and said portion of said governed information comprises said audio information, said step (g) further comprising:

allowing access at said first apparatus to said video and audio information if said payment is made and is sufficient for said access, and allowing access to said video information but denying access to said audio information if said payment is either not made or is not sufficient.

204. A method as in claim 202, further comprising:

(h) at said first apparatus, completing said at least one access or use.

205. A method as in claim 204, further comprising:

(i) said second apparatus providing information to said first apparatus, which information enables or authorizes said at least one access or use of said at least a portion of said governed information; and said completing step (h) occurs after said step (i).

206. A method as in claim 204, in which:

said completing step (h) occurs prior to said step (i).

207. A method as in claim 204, further comprising:

(h) said first apparatus storing information related to the number of times said governed information has been accessed or used; and said payment information transmitted in said step (e) is dependent, at least in part, on the number of times said governed information has been accessed or used.

208. A method as in claim 207, in which:

said payment is a first amount for a first access or use of said governed information, and a second amount for a second access or use of said governed information.

209. A method as in claim 208, in which:

said first payment amount is higher than said second payment amount.

210. A method as in claim 202, in which:

said rule is received in an encrypted form; and said decoding step (b) further comprises decrypting said rule.

211. A method as in claim 202, further comprising:

at said first apparatus applying a watermark or fingerprint to at least a portion of said governed information, said application occurring at least in part under the control of at least one rule; and releasing said watermarked or fingerprinted governed information from said first apparatus to a third apparatus.

212. A method as in claim 211, in which:

said watermark or fingerprint includes information at least in part identifying said first apparatus or a user of said first apparatus.

213. A method as in claim 202, further comprising:

at said first apparatus, receiving a certificate from a third apparatus; and releasing at least a portion of said governed information to said third apparatus.

214. A method as in claim 213, in which:

said certificate specifies at least one attribute of said third apparatus.

215. A method as in claim 213, further comprising:

said first apparatus checking said digital certificate to determine whether said information should be released to said third apparatus.

216. A method as in claim 215, in which:

said determination is based on whether said digital certificate indicates that said third apparatus includes specified rights management functionality.

217. A method as in claim 202, in which:

said governed information is received in an encrypted or scrambled form; and further comprising:

following said providing step (e) decrypting or unscrambling at least said portion of said governed information.

218. A method as in claim 202, in which:

said steps (b) through (g) are securely performed, said secure performance occurring at least in part on a secure processing unit.

219. A method as in claim 202, in which:

said at least one access to or use of referred to in said step (g) comprises:

creating a signal comprising at least a portion of said governed information and a steganographically encoded second rule, said second rule differing in at least one aspect from said first rule.

220. A method as in claim 202, in which:

said at least one access to or use of referred to in said step (g) comprises:

under control of said first rule, making a copy of at least a portion of said governed information; and said method further comprises:

(h) transferring said copy to a third apparatus, said transferred copy not including said first rule.

221. A method as in claim 202, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said first rule; and at said first apparatus, generating a corrected signal comprising said governed information and said corrected first rule, said signal not including said erroneous version of said first rule.

222. A method as in claim 202, further comprising:

transmitting said corrected signal from said first apparatus to a third apparatus.

223. A rights management method comprising:

(a) at a first apparatus, receiving a signal comprising governed information and a first rule steganographically incorporated into said signal;

(b) at said first apparatus, steganographically decoding said signal to recover said first rule, said rule acting to prohibit conversion of said governed information from a first format to a second format; and (c) at said first apparatus, performing at least one operation on said governed information, said operation governed, at least in part, by said first rule.

224. A method as in claim 223, in which:

said first format comprises digital encoding, and said second format comprises analog encoding.

225. A method as in claim 223, in which:

said first format comprises analog encoding, and said second format comprises digital encoding.

226. A method as in claim 223, in which:

said rule is received in an encrypted form; and said decoding step (b) further comprises decrypting said first rule.

227. A method as in claim 223, further comprising:

(d) applying a watermark or fingerprint to at least a portion of said governed information, said application occurring at least in part under the control of at least one rule; and (e) releasing said watermarked or fingerprinted governed information to a second apparatus.

228. A method as in claim 227, in which:

said watermark or fingerprint includes information at least in part identifying said first apparatus or a user of said first apparatus.

229. A method as in claim 223, further comprising:

(d) at said first apparatus, receiving a certificate from said second apparatus; and (e) releasing at least a portion of said governed information to a second apparatus.

230. A method as in claim 229, in which:

said certificate specifies at least one attribute of said second apparatus.

231. A method as in claim 230, further comprising:

said first apparatus checking said digital certificate to determine whether said information should be released to said second apparatus.

232. A method as in claim 231, in which:

said determination is based on whether said digital certificate indicates that said second apparatus includes specified rights management functionality.

233. A method as in claim 223, in which:

said governed information is received in an encrypted or scrambled form; and said operation at least in part comprises decrypting or unscrambling said information.

234. A method as in claim 223, in which:

said steps (b) and (c) are securely performed, said secure performance occurring at least in part on a secure processing unit.

235. A method as in claim 223, in which:

said at least one access to or use of referred to in said step (c) includes:

creating a signal comprising at least a portion of said governed information and a steganographically encoded second rule, said second rule differing in at least one aspect from said first rule.

236. A method as in claim 223, in which:

said at least one access to or use of referred to in said step (c) includes:

under control of said first rule, making a copy of at least a portion of said governed information; and said method further comprises:

(d) transferring said copy to a second apparatus, said transferred copy not including said first rule.

237. A method as in claim 223, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said received first rule; and at said first apparatus, generating a corrected signal comprising at least a portion of said governed information and said corrected first rule, said signal not including said erroneous version of said first rule.

238. A method as in claim 237, in which:

said at least one access to or use of referred to in said step (c) includes:

transmitting said corrected signal from said first apparatus to a second apparatus.

239. A rights management method operating at least in part on a first apparatus, comprising:

(a) receiving a signal comprising first governed information, second governed information, and at least a first and a second rule steganographically incorporated into said signal, (b) steganographically decoding said signal to recover at least one of said rules;

(c) using said first rule to govern at least in part govern a first operation on said first governed information; and (d) using said second rule to at least in part govern a second operation on said second governed information.

240. A method as in claim 239, in which:

said first governed information includes a description of at least one aspect of said second information.

241. A method as in claim 240, in which:

said second governed information comprises a movie, and said first governed information comprises a trailer describing said movie.

242. A method as in claim 240, in which:

said second rule is more restrictive than said first rule.

243. A method as in claim 242, in which:

said first rule governs, at least in part, the ability to copy said first governed information; and said second rule governs, at least in part, the ability to copy said second governed information.

244. A method as in claim 243, in which:
said first rule allows unlimited copying of said first governed information; and
said second rule restricts copying of said second governed information.

245. A method as in claim 239, in which:
said first and second rules are received in an encrypted form; and
said decoding step (b) further comprises decrypting said rules.

246. A method as in claim 239, further comprising:
(e) applying a watermark or fingerprint to at least a portion of said governed information, said application occurring at least in part under the control of at least one rule; and
(f) releasing said watermarked or fingerprinted governed information to a second apparatus.

247. A method as in claim 246, in which:
said watermark or fingerprint includes information at least in part identifying said first apparatus or a user of said first apparatus.

248. A method as in claim 239, further comprising:
(e) at said first apparatus, receiving a certificate from said second apparatus; and
(f) releasing at least a portion of said governed information to a second apparatus.

249. A method as in claim 248, in which:
said certificate specifies at least one attribute of said second apparatus.

250. A method as in claim 249, further comprising:
said first apparatus checking said digital certificate to determine whether said information should be released to said second apparatus.

251. A method as in claim 250, in which:
said determination is based on whether said digital certificate indicates that said second apparatus includes specified rights management functionality.

252. A method as in claim 239, in which:
said first governed information is received in an encrypted or scrambled form; and
said first operation at least in part comprises decrypting or unscrambling said first governed information.

253. A method as in claim 239, in which:
said steps (b) through (e) are securely performed, said secure performance occurring at least in part on a secure processing unit.

254. A method as in claim 239, in which:
said first operation includes:
creating a signal comprising at least a portion of said governed information and a steganographically encoded third rule, said third rule differing in at least one aspect from said first rule and from said second rule.

255. A method as in claim 239, in which:
said first operation includes:
under control of said first rule, making a copy of at least a portion of said governed information; and
said method further comprises:
(e) transferring said copy to a second apparatus, said transferred copy not including said first rule.

256. A method as in claim 239, in which:
said received signal further includes steganographically encoded error correction information;
said method further comprising:
at said first apparatus, steganographically decoding said signal to retrieve said error correction information;
at said first apparatus, using said error correction information to determine whether the received version of said first rule and/or said second rule contain errors;
at said first apparatus, using said error correction information to correct errors in said received first rule and/or said received second rule; and
at said first apparatus, generating a corrected signal comprising at least a portion of said governed information and said corrected first rule and/or said corrected second rule, said signal not including said erroneous version of said first rule and/or said erroneous version of said second rule.

257. A method as in claim 256, in which:
said first operation includes:
transmitting said corrected signal from said first apparatus to a second apparatus.

258. A rights management method comprising:
(a) at a first apparatus, receiving a signal comprising
governed information and
a first rule steganographically incorporated into said signal,
said first rule at least controlling the circumstances under which said governed information may be transferred to a second apparatus;
(b) steganographically decoding said signal to recover said first rule; and
(c) performing at least a first operation on said governed information, said first operation governed, at least in part, by said first rule,
said first operation comprising at least:
initiating an attempt to transfer said governed information to a second apparatus;
checking to determine whether said transfer is allowed by said first rule; and
completing said transfer if said transfer is allowed by said first rule, or
failing to transfer said governed information if said transfer is not allowed by said first rule.

259. A method as in claim 258, in which:
said first rule allows transfer of said governed information to a second apparatus if said second apparatus includes functionality designated by said rule.

260. A method as in claim 259, in which:
said designated functionality includes at least the ability of said second apparatus to protect said governed information in at least one respect.

261. A method as in claim 260, in which:
said designated functionality further includes the ability of said second apparatus to use said first rule to govern at least one operation occurring on said second apparatus, and
said method further comprises transferring a copy of said first rule from said first apparatus to said second apparatus.

262. A method as in claim 261, in which:
said first rule requires that said second apparatus transfer a certificate to said first apparatus.

263. A method as in claim 262, in which:
said first rule further requires that said certificate identify said designated functionality.

264. A method as in claim 258, in which:
said first rule is received in an encrypted form; and said decoding step (b) further comprises decrypting said first rule.

265. A method as in claim 258, further comprising:

prior to completion of said transferring step, applying a watermark or fingerprint to at least a portion of said governed information, said application occurring at least in part under the control of at least one rule.

266. A method as in claim 265, in which:

said watermark or fingerprint includes information at least in part identifying said first apparatus or a user of said first apparatus.

267. A method as in claim 258, in which:

said governed information is received in an encrypted or scrambled form.

268. A method as in claim 258, in which:

said steps (b) and (c) are securely performed, said secure performance occurring at least in part on a secure processing unit.

269. A method as in claim 258, in which:

said first operation further includes:
  creating a signal comprising at least a portion of said governed information and a steganographically encoded second rule, said second rule differing in at least one aspect from said first rule;
  said governed information referred to in said initiating step comprising said created signal.

270. A method as in claim 258, in which:

said first operation further includes:
  under control of said first rule, making a copy of at least a portion of said governed information; and
  said governed information referred to in said initiating step comprises said copy, which copy does not include said first rule.

271. A method as in claim 258, in which:

said received signal further includes steganographically encoded error correction information;

said method further comprising:
  at said first apparatus, steganographically decoding said signal to retrieve said error correction information;
  at said first apparatus, using said error correction information to determine whether the received version of said first rule contains errors;
  at said first apparatus, using said error correction information to correct errors in said received first rule; and
  at said first apparatus, generating a corrected signal comprising at least a portion of said governed information and said corrected first rule, said signal not including said erroneous version of said first rule.

272. A method as in claim 271, in which:

said governed information referred to in said step (c) comprises said corrected signal.

273. A steganographic encoding method comprising:

(a) receiving information;

(b) transforming said information into a signal;

(c) selecting a first location in said signal for the incorporation of steganographically encoded information, said selection being governed at least in part by an analysis of the bandwidth available at such location for such encoding;

said first location being selected at least in part because it has a relatively high degree of available bandwidth for such encoding;

(d) steganographically encoding a first rule in said first location, said first rule at least in part governing at least one aspect of use of at least a portion of said information;

(e) selecting a second location in said signal for the incorporation of steganographically encoded information;

(f) analyzing said second location to determine the bandwidth available at said second location for steganographic encoding;

(g) determining that said second location has relatively less bandwidth available for such encoding; and (h) steganographically encoding a pointer to a rule at said second location.

274. A method as in claim 273, in which:

said pointer points to said first rule at said first location.

275. A method as in claim 273, in which:

said analysis in said step (c) is based at least in part on statistically weighted averaging.

276. A method as in claim 273, in which:

said transforming step (b) further comprises encrypting or scrambling said information; and said at least one aspect of access to or use of said governed information governed by said first rule at least in part comprises decrypting or unscrambling said information.

277. A steganographic encoding method comprising:

(a) receiving information;

(b) transforming said information into a signal;

(c) commencing the steganographical encoding of a first rule beginning at a first location in said signal, said first rule at least in part governing at least one aspect of use of at least a portion of said information;

(d) following said commencement, steganographically encoding said first rule in said signal at a variable rate, said variable rate being determined, at least in part, by an analysis of the bandwidth available for said encoding;

(e) commencing the steganographical encoding of a second rule beginning at a second location in said signal, said second rule at least in part governing at least one aspect of use of at least a portion of said information;

(f) following said commencement step (e), steganographically encoding said second rule in said signal at a variable rate, said variable rate being determined, at least in part, by an analysis of the bandwidth available for said encoding.

278. A method as in claim 277, further comprising:

prior to said commencing step (c), incorporating said first rule into a first secure container;

said steganographic encoding of said first rule comprising steganographically encoding said first secure container.

279. A method as in claim 278, further comprising:

prior to said commencing step (e), incorporating said second rule into a second secure container;

said steganographic encoding of said second rule comprising steganographically encoding said second secure container.

280. A method as in claim 279, further comprising:

prior to said commencing step (c), encrypting said first secure container; and prior to said commencing step (e), encrypting said second secure container.

281. A method as in claim 277, further comprising:

prior to said commencing step (c), encrypting said first rule; and prior to said commencing step (e), encrypting said second rule.

282. A method as in claim 277, in which:

said transforming step (b) further comprises encrypting or scrambling said information; and said at least one aspect of access to or use of said governed information governed by said first rule at least in part comprises decrypting or unscrambling said information.

283. A method comprising the following steps:

(a) receiving information;

(b) transforming said information into a signal;

(c) selecting a first location in said signal for the incorporation of steganographic encoding, said selection being governed at least in part by an analysis of the bandwidth available at such location for such encoding;

said first location being selected at least in part because it has a relatively high degree of available bandwidth for such encoding;

(d) steganographically encoding a first rule in said first location, said first rule at least in part governing at least one aspect of use of at least a portion of said information;

(e) selecting a second location in said signal for the incorporation of steganographically encoding;

(f) analyzing said second location to determine the bandwidth available at said second location for steganographic encoding;

(g) determining that said second location has relatively less bandwidth available for such encoding; and (h) steganographically encoding a pointer to said first rule at said second location;

(i) storing said signal, including said steganographically encoded information, on a portable memory;

(j) inserting said portable memory into a first appliance;

(k) said first apparatus reading from said second location prior to reading from said first location;

(l) following reading from said second location, said first apparatus following said pointer in order to read from said first location;

(m) said first apparatus retrieving said first rule from said first location; and (n) said first apparatus using said first rule to govern at least one aspect of access to or use of said information.

284. A method as in claim 283, further comprising:

prior to said steganographically encoding step (c), incorporating said first rule into a first secure container, said steganographic encoding step (c) comprising steganographically encoding said first secure container into said signal; and said retrieving step (m) further comprising accessing said first rule from said first secure container.

285. A method as in claim 284, further comprising:

prior to said steganographically encoding step (h), incorporating said pointer into a second secure container, said steganographic encoding step (h) comprising steganographically encoding said second secure container into said signal; and said reading step (k) further comprising accessing said pointer from said first secure container.

286. A method as in claim 285, further comprising:

encrypting said first secure container and said second secure container prior to steganographically encoding said first secure container and said second secure container into said signal;

said reading step (k) further comprising decrypting said second secure container; and said retrieving step (m) further comprising decrypting said first secure container.

287. A method as in claim 283, further comprising:

prior to said steganographically encoding step (c), encrypting said first rule; and said retrieving step (m) further comprising decrypting said first rule.

288. A method as in claim 284, further comprising:

prior to said steganographically encoding step (h), encrypting said pointer; and said reading step (k) further comprising decrypting said pointer.

289. A method as in claim 283, further comprising:

following said step (m), said first apparatus making a use of at least a portion of said signal, said first apparatus removing said steganographic encoding from said used portion prior to said use.

290. A method as in claim 283, in which:

said first apparatus comprises an optical disk player; and said portable memory comprises an optical disk.

291. A method as in claim 283, in which:

said first rule governs the right to access at least a portion of said information; and said using step (n) comprises said first apparatus determining whether said first rule allows an access to at least a portion of said information;

said first apparatus allowing said access if said first rule allows said access and denying said access if said first rule does not allow said access.

292. A method as in claim 283, in which:

said transforming step (b) further comprises encrypting or scrambling said information; and said at least one aspect of access to or use of said information in said governing step (n) at least in part comprises decrypting or unscrambling said information.

293. A method as in claim 283, in which:

said step (n) is securely performed, said secure performance occurring at least in part on a secure processing unit.

294. A method as in claim 283, in which:

said governing step (n) includes:

creating a signal comprising at least a portion of said governed information and a steganographically encoded second rule, said second rule differing in at least one aspect from said first rule.

295. A method as in claim 283, in which:

said governing step (n) includes:

under control of said first rule, making a copy of at least a portion of said governed information; and said method further comprises:

(o) transferring said copy to a second apparatus, said transferred copy not including said first rule.

296. A method as in claim 283, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said received first rule; and at said first apparatus, generating a corrected signal comprising at least a portion of said governed information and said corrected first rule, said signal not including said erroneous version of said first rule.

297. A method as in claim 296, in which:

said governing step (n) includes:
transmitting said corrected signal from said first apparatus to a second apparatus.

298. A method comprising the following steps:

(a) receiving information;

(b) transforming said information into a signal;

(c) steganographically encoding a first rule at a first location in said signal, said first rule at least in part governing at least one aspect of use of at least a portion of said information;

(d) following said step (c), selecting a second location in said signal, said second location being selected at least in part based on its offset from said first location;

(e) steganographically encoding said first rule in said second location;

(f) repeating said location selection and steganographic encoding steps at least two additional times, in each case selecting the location for said steganographic encoding being based at least in part on an offset from at least one previously selected location;

(g) storing said signal, including said steganographically encoded information, on a portable memory;

(h) inserting said portable memory into a first apparatus;

(i) said first apparatus beginning reading from said portable memory at a point between said locations;

(j) said first apparatus continuing to read until one of said locations is encountered;

(k) said first apparatus retrieving said first rule from said encountered location; and (l) said first apparatus using said first rule to govern at least one aspect of use of said information.

299. A method as in claim 298, further comprising:

prior to said steganographically encoding step (c), incorporating said first rule into a first secure container;

said steganographic encoding steps (c), (e) and (f) comprising steganographically encoding copies of said first secure container into said signal; and said retrieving step (k) further comprising accessing said first rule from said first secure container.

300. A method as in claim 299, further comprising:

prior to said steganographically encoding step (c), encrypting said first secure container;

said steganographic encoding steps (c), (e) and (f) comprising steganographically encoding said encrypted first secure container into said signal;

said retrieving step (k) further comprising decrypting said first secure container.

301. A method as in claim 299, further comprising:

prior to said steganographically encoding step (c), encrypting said first rule;

said steganographic encoding steps (c), (e) and (f) comprising steganographically encoding said encrypted first rule into said signal; and said retrieving step (k) further comprising decrypting said first rule.

302. A method as in claim 298, further comprising:

following said step (k), said first apparatus making a use of at least a portion of said signal, said first apparatus removing said steganographic encoding from said used portion prior to said use.

303. A method as in claim 298, in which:

said first apparatus comprises an optical disk player; and said portable memory comprises an optical disk.

304. A method as in claim 298, in which:

said first rule governs the right to access at least a portion of said information; and said using step (l) comprises said appliance determining whether said first rule allows an access to at least a portion of said information;

said first apparatus allowing said access if said first rule allows said access and denying said access if said first rule does not allow said access.

305. A method as in claim 298, in which:

said transforming step (b) further comprises encrypting or scrambling said information; and said at least one aspect of use of said information in said governing step (l) at least in part comprises decrypting or unscrambling said information.

306. A method as in claim 298, in which:

said step (j) is securely performed, said secure performance occurring at least in part on a secure processing unit.

307. A method as in claim 298, in which:

said governing step (l) includes:
creating a signal comprising at least a portion of said governed information and a steganographically encoded second rule, said second rule differing in at least one aspect from said first rule.

308. A method as in claim 298, in which:

said governing step (l) includes:
under control of said first rule, making a copy of at least a portion of said governed information; and
said method further comprises:

(n) transferring said copy to a second apparatus, said transferred copy not including said first rule.

309. A method as in claim 298, in which:

said received signal further includes steganographically encoded error correction information;

said method further comprising:
at said first apparatus, steganographically decoding said signal to retrieve said error correction information;
at said first apparatus, using said error correction information to determine whether the received version of said first rule contains errors;
at said first apparatus, using said error correction information to correct errors in said received first rule; and
at said first apparatus, generating a corrected signal comprising at least a portion of said governed information and said corrected first rule, said signal not including said erroneous version of said first rule.

310. A method as in claim 309, further comprising:

(n) transmitting said corrected signal from said first apparatus to a second apparatus.

311. A method comprising:

receiving a first signal comprising first information, said first signal being encoded in a first format;

steganographically encoding a first rule in said first signal, said first rule governing at least one aspect of access to or use of said first information;

transforming said first signal into a second signal, said second signal being encoded in a second format, said second signal containing said first information and said steganographically encoded first rule; and at a first apparatus designed to use signals encoded in said second format:

steganographically decoding said second signal to obtain said first rule; and using said first rule to govern at least one aspect of access to or use of said first information at said first apparatus;

said first apparatus including rights management functionality designed to interpret and execute rules, including said first rule.

312. A method as in claim 311, in which:

said first format constitutes digital encoding and said second format constitutes analog encoding.

313. A method as in claim 311, in which:

said first format constitutes analog encoding and said second format constitutes digital encoding.

314. A method as in claim 312, further comprising:

at said first apparatus, attempting to make a copy of at least a portion of said first information.

315. A method as in claim 314, further comprising:

following the commencement of said attempt, said first apparatus using said first rule to at least in part determine whether said copy will be allowed;

said first apparatus proceeding to make said copy if said first rule indicates that said copy is allowed; and said first apparatus failing to complete said copy process if said first rule indicates that said copy is not allowed.

316. A method as in claim 315, in which:

if said copy is made, said copy includes said steganographically encoded first rule.

317. A method as in claim 316, in which:

said step of proceeding to make said copy further comprises translating at least a portion of said second signal from said analog format to said digital format, said copy comprising said signal translated into digital format.

318. A method as in claim 311, further comprising:

said step of using said first rule at said first apparatus including:

creating a signal comprising at least a portion of said governed information and a steganographically encoded second rule, said second rule differing in at least one aspect from said first rule.

319. A method as in claim 311, further comprising:

at said first apparatus, under control of said first rule, making a copy of at least a portion of said governed information; and transferring said copy to a second apparatus, said transferred copy not including said first rule.

320. A method as in claim 311, in which:

said received signal further includes steganographically encoded error correction information;

said method further comprising:

at said first apparatus, steganographically decoding said signal to retrieve said error correction information;

at said first apparatus, using said error correction information to determine whether the received version of said first rule contains errors;

at said first apparatus, using said error correction information to correct errors in said first rule; and at said first apparatus, generating a signal comprising at least a portion of said governed information and said corrected first rule, said signal not including said erroneous version of said first rule.

321. A method as in claim 320, further comprising:

transmitting said generated signal from said first apparatus to a second apparatus.

322. A method comprising:

(a) at a first apparatus, receiving a signal comprising governed information and a first rule steganographically incorporated into said signal;

(b) at said first apparatus, steganographically decoding said signal and recovering said first rule;

(c) at said first apparatus, using said first rule to govern at least one aspect of access to or use of at least a portion of said governed information;

(d) at said first apparatus, making a copy of at least a portion of said governed information; and (e) at said first apparatus, steganographically encoding at least a second rule into said copy, said second rule differing in at least one respect from said first rule.

323. A method as in claim 322, in which:

said steganographic encoding step (e) further comprises steganographically encoding said first rule.

324. A method as in claim 322, in which:

said second rule comprises a modified version of said first rule.

325. A method as in claim 322, further comprising:

(f) transferring said steganographically encoded copy to a second apparatus.

326. A method as in claim 322, further comprising:

at said first apparatus, checking said first rule to determine whether said steps (d) and (e) are allowed by said first rule; and proceeding with said steps (d) and (e) only if said steps are allowed by said first rule.

327. A method as in claim 322, in which:

a user of said first apparatus at least in part specifies at least one aspect of said second rule.

328. A method as in claim 322, in which:

said first rule allows at least one copy of at least a portion of said governed information; and said second rule prohibits the making of any copies.

329. A method comprising:

(a) at a first apparatus, receiving a signal comprising:

governed information and a first rule steganographically incorporated into said signal;

(b) at said first apparatus, steganographically decoding said signal and recovering said first rule;

(c) at said first apparatus, using said first rule to govern at least one aspect of access to or use of at least a portion of said governed information;

(d) at said first apparatus, making a copy of at least a portion of said governed information, said copy not including any steganographically encoded information; and (e) transferring said copy to a second apparatus.

330. A method as in claim 329, further comprising:

at said first apparatus, checking said first rule to determine whether said first rule allows said steps (d) and (e); and proceeding with said steps (d) and (e) only if said first rule allows said steps.

331. A method comprising:
(a) at a first apparatus, receiving a signal comprising:
  governed information;
  a first rule steganographically incorporated into said signal; and
  a copy indicator steganographically incorporated into said signal;
(b) at said first apparatus, steganographically decoding said signal and recovering said first rule and said copy indicator;
(c) at said first apparatus, using said first rule to govern at least one aspect of access to or use of at least a portion of said governed information;
(d) at said first apparatus, making a copy of at least a portion of said governed information;
(e) at said first apparatus, altering said copy indicator to indicate that a copy has been made;
(f) at said first apparatus, steganographically encoding said altered copy indicator and at least one rule into said copied governed information portion; and
(e) transferring said copy, including said steganographic encoding, to a second apparatus.

332. A method as in claim 331, in which:
said copy indicator received in said step (a) indicates that no copy has been made;
said first rule specifies that a copy of said governed information, or a portion thereof, may be made only if said copy indicator indicates that no copy has been made; and
said step (f) includes steganographically encoding a copy of said first rule into said copied governed information portion.

333. A method comprising:
(a) at a first apparatus, receiving a signal comprising first governed information and control information steganographically encoded in said first governed information;
said control information including a first rule and error correction information;
(b) at said first apparatus, steganographically decoding said signal to recover said control information;
(c) at said first apparatus, using said error correction information to analyze said recovered first rule to determine whether said recovered first rule contains errors;
(d) at said first apparatus, using said error correction information to correct at least one error in said first rule; and
(e) at said first apparatus, steganographically encoding said corrected first rule and error correction information in said first governed information.

334. A method as in claim 333, further comprising:
(f) transferring said first governed information, including said steganographically encoded corrected first rule, to a second apparatus.

335. An apparatus comprising:
means for receiving a first signal, said first signal comprising governed information and a steganographically encoded first rule;
means for steganographically decoding said signal to recover said first rule;

means for using said first rule to at least in part govern at least one operation on said governed information;
means for inserting a watermark into at least a portion of said first signal, said watermark including identification information; and
means for transmitting said watermarked signal to a remote apparatus.

336. An apparatus as in claim 335, in which:
said identification information comprises information identifying said apparatus and/or a user of said apparatus.

337. An apparatus as in claim 335, in which:
said means for inserting includes means for steganographically encoding said watermark into said first signal.

338. An apparatus comprising:
means for receiving a first signal, said first signal comprising governed information and a steganographically encoded first rule;
means for steganographically decoding said signal to recover said first rule;
means for using said first rule to at least in part govern at least one operation on said governed information;
means for generating a second signal comprising at least a portion of said first governed information and a steganographically encoded second rule; and
means for transmitting said second signal to a remote apparatus.

339. An apparatus as in claim 338, in which:
said means for receiving comprises an optical disk player; and
said apparatus further comprises a video display.

340. An apparatus as in claim 339, in which said apparatus further comprises:
decryption means for decrypting said first rule; and
means for removing steganographic encoding from said first signal.

341. An apparatus as in claim 340, in which:
said means for steganographically decoding further comprises means for searching through said first governed information until a location is reached containing said steganographically encoded first rule.

342. An apparatus as in claim 338, in which said apparatus further comprises:
means for inserting a watermark or fingerprint into said second signal.

343. An apparatus as in claim 342, in which:
said means for inserting includes:
  means for including identification information in said watermark or fingerprint, and
  means for steganographically encoding said watermark or fingerprint into said second signal.

344. An apparatus comprising:
means for receiving a first signal, said first signal comprising:
  governed information and
  steganographic encoding comprising a first rule and error correction information;
means for steganographically decoding said signal to recover said first rule and said error correction information;
means for using said error correction information to correct at least one error in said received first rule;

means for steganographically encoding said corrected first rule into said first signal, said corrected first rule replacing said originally received erroneous first rule; and means for transmitting said first signal containing said corrected first rule to a remote apparatus.

345. An apparatus comprising:

means for receiving a first signal, said first signal comprising:

governed information and steganographic encoding comprising a first rule and error correction information;

means for steganographically decoding said signal to recover said first rule and said error correction information;

means for using said error correction information to correct at least one error in said received first rule;

means for steganographically encoding said corrected first rule into said first signal, said corrected first rule replacing said originally received erroneous first rule;

means for steganographically encoding a watermark into said first signal, said watermark including identification information; and means for transmitting said first signal containing said corrected first rule to a remote apparatus.

346. An apparatus comprising:

means for receiving a first signal, said first signal comprising governed information and a steganographically encoded first rule;

means for steganographically decoding said signal to recover said first rule;

means for using said first rule to at least in part govern at least one operation on said governed information;

means for making a copy of said governed information;

means for steganographically encoding a copy indicator in said copy of said governed information; and means for transmitting said governed information copy, including said copy indicator, to a remote apparatus.

347. A method as in claim 39, in which:

said governed information is received in an encrypted or scrambled form; and said allowing access or use further comprises decrypting or unscrambling said portion of said governed information.

348. A method as in claim 39, in which:

said steps (b) and (c) are securely performed, said secure performance occurring at least in part on a secure processing unit.

* * * * *

UNITED STATES PATENT AND TRADEMARK OFFICE
CERTIFICATE OF CORRECTION

PATENT NO.    : 5,943,422
DATED         : August 24, 1999
INVENTOR(S)   : Van Wie et al.

It is certified that error appears in the above-identified patent and that said Letters Patent is hereby corrected as shown below:

Column 27,
Line 44, after "includes means for", delete the second occurrence of "means for".
Lines 57-58 and 60-61, "right management means" should read -- rights manangement means --.
Line 65, "decode" should read -- decodes --.

Column 29,
Line 52, "at first rule" should read -- a first rule --.

Column 39,
Line 5, "said second rule" should read -- said third rule --.
Line 21, "received version" should read -- received versions --.
Line 38, after "circuitry", insert a comma.

Column 40,
Line 25, "said at access" should read -- said access --.

Column 43,
Line 43 and 48, after "at said first apparatus", insert a comma.

Column 46,
Line 6, after "at said first apparatus", insert a comma.
Line 36, after "said providing step (e)", insert a comma.

Column 48,
Line 51, after "at least in part", delete "govern".

Signed and Sealed this

Twenty-eighth Day of October, 2003

JAMES E. ROGAN
*Director of the United States Patent and Trademark Office*